(12) United States Patent
Woytowitz et al.

(10) Patent No.: US 9,781,887 B2
(45) Date of Patent: *Oct. 10, 2017

(54) IRRIGATION SYSTEM WITH ET BASED SEASONAL WATERING ADJUSTMENT AND SOIL MOISTURE SENSOR SHUTOFF

(71) Applicant: Hunter Industries, Inc., San Marcos, CA (US)

(72) Inventors: Peter J. Woytowitz, San Diego, CA (US); Jeffery J. Kremicki, Cardiff by the Sea, CA (US); Christopher M. Shearin, Murrieta, CA (US)

(73) Assignee: Hunter Industries, Inc., San Marcos, CA (US)

( * ) Notice: Subject to any disclaimer, the term of this patent is extended or adjusted under 35 U.S.C. 154(b) by 365 days.

This patent is subject to a terminal disclaimer.

(21) Appl. No.: 14/581,222

(22) Filed: Dec. 23, 2014

(65) Prior Publication Data

US 2015/0112494 A1   Apr. 23, 2015

Related U.S. Application Data

(63) Continuation of application No. 14/091,865, filed on Nov. 27, 2013, now Pat. No. 8,924,032, which is a
(Continued)

(51) Int. Cl.
*G05D 11/00* (2006.01)
*G05B 13/00* (2006.01)
(Continued)

(52) U.S. Cl.
CPC .......... *A01G 25/167* (2013.01); *A01G 25/16* (2013.01); *G05B 15/02* (2013.01); *G05D 22/02* (2013.01)

(58) Field of Classification Search
CPC ..................................................... A01G 25/16
(Continued)

(56) References Cited

U.S. PATENT DOCUMENTS 3,721,254 A    3/1973  Rutten
4,176,395 A   11/1979  Evelyn-Veere et al.
(Continued)

FOREIGN PATENT DOCUMENTS

WO    WO 03/085473      10/2003
WO    WO 2008/144563    11/2008

OTHER PUBLICATIONS

Aqua Conserve Products, http://www.aquaconserve.com/products.php, © 2002, Aqua Conservative Systems in 5 pages.
(Continued)

*Primary Examiner* — Suresh Suryawanshi
(74) *Attorney, Agent, or Firm* — Knobbe, Martens, Olson & Bear, LLP

(57) ABSTRACT

An irrigation system includes at least one environmental sensor, such as a solar radiation sensor that is installed on an irrigation site, and a soil moisture sensor that is also installed on the irrigation site. Programming allows an estimated ET value to be calculated based at least in part on the output signal of the environmental sensor. A pre-programmed watering schedule is automatically modified based on the estimated ET value to thereby conserve water while maintaining the health of plants on the irrigation site. The system automatically inhibits irrigation when an output signal of the soil moisture sensor indicates an amount of moisture in the soil is above a predetermined threshold.

20 Claims, 46 Drawing Sheets

Related U.S. Application Data continuation of application No. 12/986,033, filed on Jan. 6, 2011, now Pat. No. 8,606,415.

(51) Int. Cl.
  *A01G 25/16* (2006.01)
  *G05D 22/02* (2006.01)
  *G05B 15/02* (2006.01)

(58) Field of Classification Search
  USPC .......................................................... 700/284
  See application file for complete search history.

(56) References Cited

U.S. PATENT DOCUMENTS

| | | |
|---|---|---|
| 4,180,083 A | 12/1979 | Miyaoka et al. |
| 4,567,563 A | 1/1986 | Hirsch |
| 4,646,224 A | 2/1987 | Ransburg et al. |
| 4,655,076 A | 4/1987 | Weihe et al. |
| 4,693,419 A | 9/1987 | Weintraub et al. |
| 4,722,478 A | 2/1988 | Fletcher et al. |
| 4,755,942 A | 7/1988 | Gardner et al. |
| 4,807,664 A | 2/1989 | Wilson et al. |
| 4,811,221 A | 3/1989 | Sturman et al. |
| 4,876,647 A | 10/1989 | Gardner et al. |
| 4,877,189 A | 10/1989 | Williams |
| 4,922,433 A | 5/1990 | Mark |
| 4,937,732 A | 6/1990 | Brundisini |
| 4,962,522 A | 10/1990 | Marian |
| 5,097,861 A | 3/1992 | Hopkins et al. |
| 5,148,826 A | 9/1992 | Bakhshaei |
| 5,148,985 A | 9/1992 | Bancroft |
| 5,173,855 A | 12/1992 | Nielsen et al. |
| 5,208,855 A | 5/1993 | Marian |
| 5,229,937 A | 7/1993 | Evelyn-Veere |
| 5,251,153 A | 10/1993 | Nielsen et al. |
| 5,293,554 A | 3/1994 | Nicholson |
| 5,337,957 A | 8/1994 | Olson |
| 5,381,331 A | 1/1995 | Mock et al. |
| 5,444,611 A | 8/1995 | Woytowitz et al. |
| 5,479,339 A | 12/1995 | Miller |
| 5,546,974 A | 8/1996 | Bireley |
| 5,694,963 A | 12/1997 | Fredell et al. |
| 5,696,671 A | 12/1997 | Oliver |
| 5,740,038 A | 4/1998 | Hergert |
| 5,829,678 A | 11/1998 | Hunter et al. |
| 5,836,339 A | 11/1998 | Klever et al. |
| 5,870,302 A | 2/1999 | Oliver |
| 5,944,444 A | 8/1999 | Motz et al. |
| 6,016,971 A | 1/2000 | Welch et al. |
| 6,088,621 A | 7/2000 | Woytowitz et al. |
| 6,145,755 A | 11/2000 | Feltz |
| 6,227,220 B1 | 5/2001 | Addink |
| 6,267,298 B1 | 7/2001 | Campbell |
| 6,298,285 B1 | 10/2001 | Addink et al. |
| 6,314,340 B1 | 11/2001 | Mecham et al. |
| 6,452,499 B1 | 9/2002 | Runge et al. |
| 6,453,215 B1 | 9/2002 | Lavole |
| 6,453,216 B1 | 9/2002 | McCabe et al. |
| 6,568,416 B2 | 5/2003 | Tucker et al. |
| 6,570,109 B2 | 5/2003 | Klinefelter et al. |
| 6,600,971 B1 | 7/2003 | Smith et al. |
| 6,721,630 B1 | 4/2004 | Woytowitz |
| 6,782,311 B2 | 8/2004 | Barlow et al. |
| 6,823,239 B2 | 11/2004 | Sieminski |
| 6,842,667 B2 | 1/2005 | Beutler et al. |
| 6,892,113 B1 | 5/2005 | Addink et al. |
| 6,892,114 B1 | 5/2005 | Addink et al. |
| 6,895,987 B2 | 5/2005 | Addink et al. |
| 6,947,811 B2 | 9/2005 | Addink et al. |
| 6,977,351 B1 | 12/2005 | Woytowitz |
| 6,978,794 B2 * | 12/2005 | Dukes ................. A01G 25/167 137/1 |
| 6,993,416 B2 | 1/2006 | Christiansen |
| 7,010,394 B1 | 3/2006 | Runge et al. |
| 7,010,396 B2 | 3/2006 | Ware et al. |
| 7,048,204 B1 | 5/2006 | Addink et al. |
| 7,058,478 B2 | 6/2006 | Alexanian |
| 7,069,115 B1 | 6/2006 | Woytowitz |
| 7,133,749 B2 | 11/2006 | Goldberg |
| 7,146,254 B1 | 12/2006 | Howard |
| 7,168,632 B2 | 1/2007 | Kates |
| 7,203,576 B1 | 4/2007 | Wilson et al. |
| 7,225,058 B1 | 5/2007 | Porter |
| 7,231,298 B2 | 6/2007 | Hnilica-Maxwell |
| 7,245,991 B1 | 7/2007 | Woytowitz |
| 7,261,245 B2 | 8/2007 | Zur |
| 7,289,886 B1 | 10/2007 | Woytowitz |
| 7,403,840 B2 | 7/2008 | Moore et al. |
| 7,412,303 B1 | 8/2008 | Porter et al. |
| 7,430,458 B2 | 9/2008 | Dansereau et al. |
| 7,458,521 B2 | 12/2008 | Ivans |
| 7,477,950 B2 | 1/2009 | DeBourke et al. |
| 7,532,954 B2 | 5/2009 | Evelyn-Veere |
| 7,596,429 B2 | 9/2009 | Cardinal et al. |
| 7,619,322 B2 | 11/2009 | Gardner et al. |
| 7,789,321 B2 | 9/2010 | Hitt |
| 7,805,221 B2 | 9/2010 | Nickerson |
| 7,853,363 B1 | 12/2010 | Porter et al. |
| 7,877,168 B1 | 1/2011 | Porter et al. |
| 7,953,517 B1 | 5/2011 | Porter et al. |
| 7,956,624 B2 | 6/2011 | Beaulieu |
| 8,200,368 B2 * | 6/2012 | Nickerson ............. A01G 25/16 137/78.1 |
| 8,275,309 B2 * | 9/2012 | Woytowitz .......... H04L 25/0282 370/277 |
| 8,301,309 B1 | 10/2012 | Woytowitz et al. |
| 8,321,061 B2 * | 11/2012 | Anderson ............. A01G 25/00 62/115 |
| 8,538,592 B2 | 9/2013 | Alexanian |
| 8,548,632 B1 | 10/2013 | Porter et al. |
| 8,600,569 B2 | 12/2013 | Woytowitz et al. |
| 8,606,415 B1 | 12/2013 | Woytowitz et al. |
| 8,649,907 B2 * | 2/2014 | Ersavas .................... A01G 1/00 700/275 |
| 8,660,705 B2 | 2/2014 | Woytowitz et al. |
| 8,793,024 B1 | 7/2014 | Woytowitz et al. |
| 8,924,032 B2 | 12/2014 | Woytowitz et al. |
| 2001/0054967 A1 | 12/2001 | Vanderah et al. |
| 2002/0002425 A1 | 1/2002 | Dossey et al. |
| 2002/0072829 A1 | 6/2002 | Addink et al. |
| 2003/0093159 A1 | 5/2003 | Sieminski |
| 2003/0109964 A1 | 6/2003 | Addink et al. |
| 2003/0179102 A1 | 9/2003 | Barnes |
| 2003/0182022 A1 | 9/2003 | Addink et al. |
| 2004/0011880 A1 | 1/2004 | Addink et al. |
| 2004/0015270 A1 | 1/2004 | Addink et al. |
| 2004/0030456 A1 | 2/2004 | Barlow et al. |
| 2004/0039489 A1 | 2/2004 | Moore et al. |
| 2004/0181315 A1 | 9/2004 | Cardinal et al. |
| 2004/0206395 A1 | 10/2004 | Addink et al. |
| 2004/0225412 A1 | 11/2004 | Alexanian |
| 2004/0239524 A1 | 12/2004 | Kobayashi |
| 2005/0038529 A1 | 2/2005 | Perez et al. |
| 2005/0038569 A1 | 2/2005 | Howard |
| 2005/0090936 A1 | 4/2005 | Hitt et al. |
| 2005/0125083 A1 | 6/2005 | Kiko |
| 2005/0171646 A1 | 8/2005 | Miller |
| 2005/0199842 A1 | 9/2005 | Parsons et al. |
| 2005/0203669 A1 | 9/2005 | Curren |
| 2005/0211791 A1 | 9/2005 | Clark et al. |
| 2005/0211792 A1 | 9/2005 | Clark et al. |
| 2005/0211793 A1 | 9/2005 | Clark et al. |
| 2005/0211794 A1 | 9/2005 | Clark et al. |
| 2005/0216127 A1 | 9/2005 | Clark et al. |
| 2005/0216128 A1 | 9/2005 | Clark et al. |
| 2005/0216129 A1 | 9/2005 | Clark et al. |
| 2005/0216130 A1 | 9/2005 | Clark et al. |
| 2006/0116792 A1 | 6/2006 | Addink |
| 2006/0122736 A1 | 6/2006 | Alexanian |
| 2006/0161309 A1 | 7/2006 | Moore et al. |
| 2006/0184284 A1 | 8/2006 | Froman et al. |
| 2006/0184285 A1 | 8/2006 | Evelyn-Veere |
| 2007/0016334 A1 | 1/2007 | Smith et al. |

(56) References Cited

U.S. PATENT DOCUMENTS

| | | | |
|---|---|---|---|
| 2007/0055407 | A1 | 3/2007 | Goldberg et al. |
| 2007/0156290 | A1 | 7/2007 | Froman et al. |
| 2007/0237583 | A1 | 10/2007 | Corwon et al. |
| 2007/0282486 | A1 | 12/2007 | Walker et al. |
| 2007/0293990 | A1 | 12/2007 | Alexanain |
| 2008/0091307 | A1 | 4/2008 | Dansereau et al. |
| 2008/0142614 | A1 | 6/2008 | Elezaby |
| 2009/0094097 | A1 | 4/2009 | Gartenswartz |
| 2009/0099701 | A1 | 4/2009 | Li et al. |
| 2009/0138105 | A1 | 5/2009 | Crawford |
| 2009/0177330 | A1 | 7/2009 | Kah, Jr. |
| 2009/0216345 | A1 | 8/2009 | Christfort |
| 2009/0326723 | A1 | 12/2009 | Moore et al. |
| 2010/0030476 | A1* | 2/2010 | Woytowitz ............. A01G 25/16 702/3 |
| 2010/0094472 | A1* | 4/2010 | Woytowitz ........... A01G 25/167 700/284 |
| 2010/0312404 | A1 | 12/2010 | Nickerson |
| 2011/0093123 | A1 | 4/2011 | Alexanian |
| 2011/0224836 | A1 | 9/2011 | Hern et al. |
| 2014/0081471 | A1 | 3/2014 | Woytowitz et al. |
| 2014/0172180 | A1 | 6/2014 | Woytowitz et al. |

OTHER PUBLICATIONS

Allen et al., "Crop Evapotranspiration-Guidelines for Computing Crop Water Requirements—FAQ Irrigation and Drainage," Paper 56, http://hydrotechnic.150m.com/crop_water.html in 60 pages, FAO_Food and Agriculture Organization of the United Nations of Rome, 1998.

Dukes, et al.: "Soil Moisture Sensor Control for Conservation of Landscape Irrigation," Georgia Water Resources Conference, Mar. 27-29, 2007.

East Bay Municipal Utility District (EBMUD), "Irrigation Controllers Timer for the Homeowner," US Environmental Protection Agency (EPA) (EPA 832-K-03-001, Jul. 2003)—http://www.epa.gov/owm/water-efficiency/Irrigation_booklet.pdf.

Hunter Irrigation Products Catalog Aug. 2009, 110 pages, © 2007 Hunter Industries Incorporated.

WeatherTRAK, Smart irrigation. Made simple, http://www.hydropoint.com, © 2004 Hydropoint, Inc., in 1 page.

Rain Bird, Turf Irrigation Equipment 1989 catalog, cover page, pp. 72 and 73.

Residential Landscape Irrigation Study Using Aqua ET Controllers for Aqua Conserve, Denver Water, Denver, CO & City of Sonoma, CA & Valley of the Moon Water District, CA. Jun. 2002, in 5 pages.

Shedd et al., "Evaluation of Evapotranspiration and Soil Moisture-based Irrigation Control on Turfgrass," Proceedings ASCE EWRI World Environmental & Water Resources Congress, May 15-19, 2007, in 21 pages.

SRR Remote Wiring and Installation, Technical Tips, http:///www.hunterindustries.com/resources/technical_bulletin/srr_remote.html © 2004 Hunter Industries Incorporation.

Toro Partners with HydroPoint Data Systems to Develop Weather-Based Irrigation Controllers of Athletic Turf News from Internet—Email address: http://athleticturf.net/athleticturf/article, Jan. 16, 2004.

The ongoing prosecution history of U.S. Appl. No. 11/458,551, filed Jul. 19, 2006, including without limitations Office Action, Amendments, Remarks, and any other potentially relevant documents.

The ongoing prosecution history of U.S. Appl. No. 12/042,301, filed Mar. 4, 2008, including without limitations Office Action, Amendments, Remarks, and any other potentially relevant documents.

U.S. Appl. No. 10/985,425 "Amendment" in response to USPTO Office Action mailed on Aug. 11, 2005 in 9 pages.

U.S. Appl. No. 10/985,425 "Amendment" in response to USPTO Office Action mailed Dec. 6, 2005 in 8 pages.

U.S. Appl. No. 10/985,425 "Brief on Appeal" in response to Board of Appeals and Interferences' Notice of Panel Decision from Pre-Appeal Brief Review mailed Jan. 23, 2007 (appealing from USPTO Office Action mailed Mar. 24, 2006), in 22 pages.

U.S. Appl. No. 10/985,425 "Examiner's Answer" in response to Appellants' Appeal Brief filed Mar. 23, 2007 (appealing from USPTO Office Action mailed on Mar. 24, 2006).

U.S. Appl. No. 10/985,425 "Reply Brief" in response to Examiner's Answer from Board of Appeals and Interferences mailed Jul. 25, 2007.

* cited by examiner

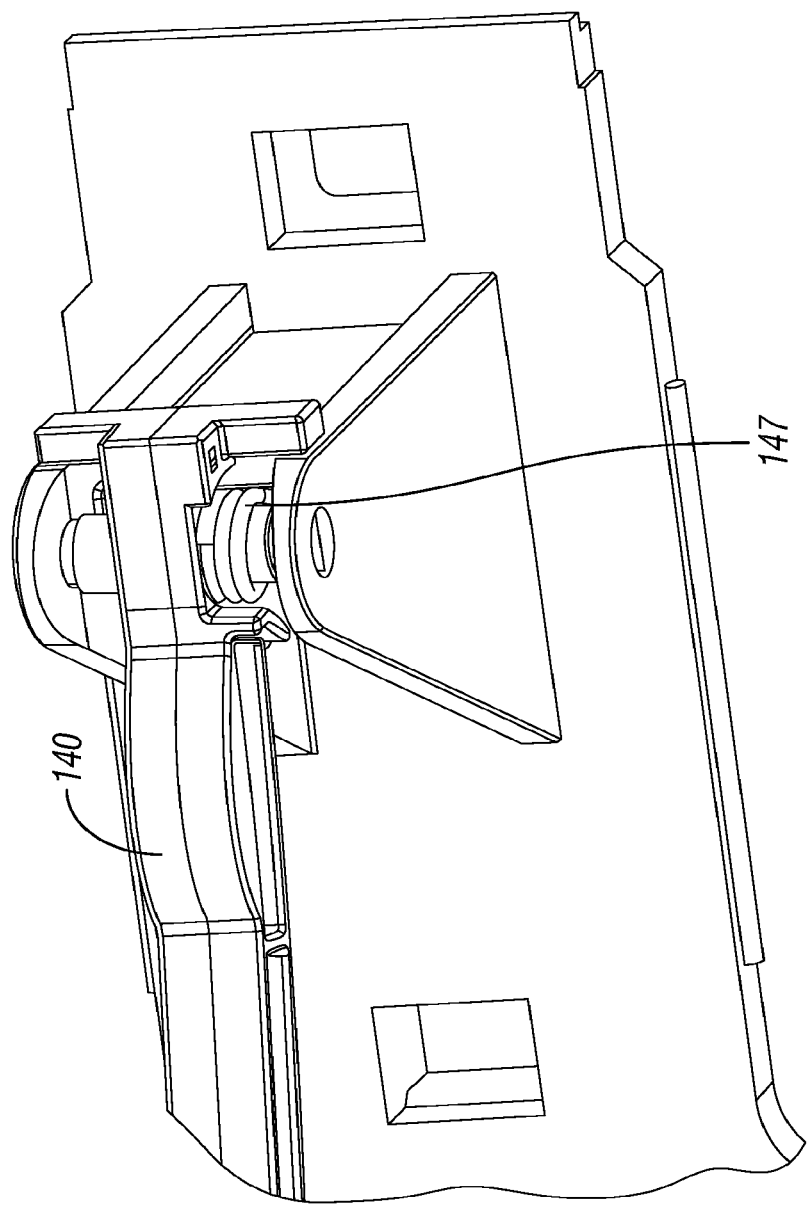

IRRIGATION SYSTEM WITH ET BASED SEASONAL WATERING ADJUSTMENT AND SOIL MOISTURE SENSOR SHUTOFF

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The present invention relates to residential and commercial irrigation systems, and more particularly to irrigation controllers that use evapotranspiration (ET) data in calculating and executing watering schedules.

Description of the Related Art

Electronic irrigation controllers have long been used on residential and commercial sites to water turf and landscaping. They typically comprise a plastic housing that encloses circuitry including a processor that executes a watering program. Watering schedules are typically manually entered or selected by a user with pushbutton and/or rotary controls while observing an LCD display. The processor turns a plurality of solenoid actuated valves ON and OFF with solid-state switches in accordance with the watering schedules that are carried out by the watering program. The valves deliver water to sprinklers connected by subterranean pipes. There is presently a large demand for conventional irrigation controllers that are easy for users to set up in terms of entering and modifying the watering schedules. One example is the Pro C® irrigation controller commercially available from Hunter Industries, Inc., the assignee of the subject application. The user simply enters the start times for a selected watering schedule, assigns a station to one or more schedules, and sets each station to run a predetermined number of minutes to meet the irrigation needs of the site. The problem with conventional irrigation controllers is that they are often set up to provide the maximum amount of irrigation required for the hottest and driest season, and then either left that way for the whole year, or in some cases the watering schedules are modified once or twice per year by the user. The result is that large amounts of water are wasted. Water is a precious natural resource and there is an increasing need to conserve the same.

In one type of prior art irrigation controller the run cycles times for individual stations can be increased or decreased by pushing "more" and "less" watering buttons.

Another conventional irrigation controller of the type that is used in the commercial market typically includes a seasonal adjustment feature. This feature is typically a simple global adjustment implemented by the user that adjusts the overall watering as a percentage of the originally scheduled cycle times. It is common for the seasonal adjustment to vary between a range of about ten percent to about one hundred and fifty percent of the scheduled watering. This is the simplest and most common overall watering adjustment that users of irrigation controllers can effectuate. Users can move the amount of adjustment down to ten to thirty percent in the winter, depending on their local requirements. They may run the system at fifty percent during the spring or fall seasons, and then at one hundred percent for the summer. The ability to seasonally adjust up to one hundred and fifty percent of the scheduled watering accommodates the occasional heat wave when turf and landscaping require significantly increased watering. The seasonal adjustment feature does not produce the optimum watering schedules because it does not take into consideration all of the ET factors such as soil type, plant type, slope, temperature, humidity, solar radiation, wind speed, etc. Instead, the seasonal adjustment feature simply adjusts the watering schedules globally to run a longer or shorter period of time based on the existing watering program. When the seasonal adjustment feature is re-set on a regular basis a substantial amount of water is conserved and while still providing adequate irrigation in a variety of weather conditions. The problem is that most users forget about the seasonal adjustment feature and do not re-set it on a regular basis, so a considerable amount of water is still wasted, or turf and landscaping die.

In the past, irrigation controllers used with turf and landscaping have used ET data to calculate watering schedules based on actual weather conditions. Irrigation controllers that utilize ET data are quite cumbersome to set up and use, and require knowledge of horticulture that is lacking with most end users. The typical ET based irrigation controller requires the user to enter the following types of information: soil type, soil infiltration rates, sprinkler precipitation rate, plant type, slope percentage, root zone depth, and plant maturity. The controller then receives information, either directly or indirectly, from a weather station that monitors weather conditions such as: amount of rainfall, humidity, hours of available sunlight, amount of solar radiation, temperature, and wind speed. The typical ET based irrigation controller then automatically calculates an appropriate watering schedule that may change daily based on the weather conditions and individual plant requirements. These changes typically include the number of minutes each irrigation station operates, the number of times it operates per day (cycles), and the number of days between watering. All of these factors are important in achieving the optimum watering schedules for maximum water conservation while maintaining the health of turf and landscaping.

Another device that can be occasionally found connected to an irrigation controller is a soil moisture sensor. There are many methods used, but most involve sensors containing spaced apart electrodes placed at root zone depth in the soil to sense the moisture levels in the soil and help control irrigation amounts. There is typically a threshold set manually by the user to determine the "wet" and "dry" levels for the soil and plant conditions. However, systems with a stand alone soil moisture sensor typically are used as a shutoff type device, and the sensor does nothing to tell the controller how much or when to irrigate. Typically the homeowner or irrigation professionals must initially set up and then adjust the irrigation periodically during the year to optimize the amount being applied.

While conventional ET based irrigation controllers help to conserve water and maintain plant health over a wide range of weather conditions they are complex and their set up is intimidating to many users. They typically require a locally mounted weather station having a complement of environmental sensors. Such locally mounted weather stations are complex, expensive and require frequent maintenance. Instead of receiving data from a locally mounted weather station, home owners and property owners can arrange for their ET based irrigation controllers to receive weather data collected by a private company on a daily basis and transmitted to the end user wirelessly, via phone lines or over an Internet connection. This reduces the user's up-front costs, and maintenance challenges, but requires an ongoing subscription expense for the life of the ET based irrigation controller. In addition, the user must still have a substantial understanding of horticulture to set up the ET based irrigation controller. For these reasons, most ET based irrigation controllers are set up by irrigation professionals for a fee. These same irrigation professionals must be called back to the property when changes need to be made, because the set up procedures are complex and not intuitive to most users. These challenges are limiting the sale and use of ET based irrigation controllers to a very small minority of irrigation sites. This impairs water conservation efforts that would otherwise occur if ET based irrigation controllers were easier to set up and adjust.

SUMMARY

An irrigation system includes at least one environmental sensor, such as a solar radiation sensor, that is installed on an irrigation site, and a soil moisture sensor that is also installed on the irrigation site. Programming allows an estimated ET value to be calculated based at least in part on the output signal of the environmental sensor. A pre-programmed watering schedule is automatically modified based on the estimated ET value to thereby conserve water while maintaining the health of plants on the irrigation site. The system automatically inhibits irrigation when an output signal of the soil moisture sensor indicates an amount of moisture in the soil is above a predetermined threshold.

BRIEF DESCRIPTION OF THE DRAWINGS

FIG. 13B is a fragmentary perspective view illustrating the spring biased arm of the stand alone weather station of FIG. 12A.

DETAILED DESCRIPTION

Figure 1:
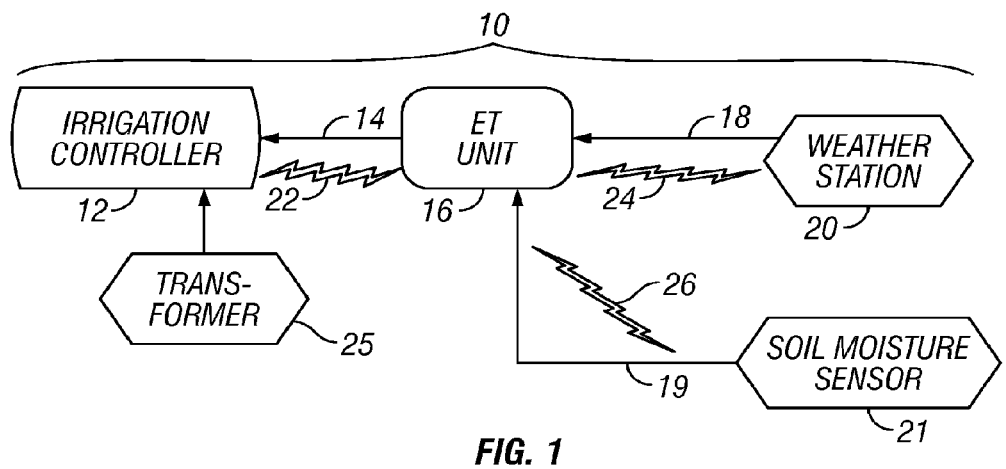
FIG. 1 is a simplified block diagram of an irrigation system in accordance with an embodiment of the present invention.

The entire disclosures of the following U.S. patents and U.S. patent applications are hereby incorporated by reference: U.S. Pat. No. 5,097,861 granted Mar. 24, 1992 of Hopkins et al. entitled IRRIGATION METHOD AND CONTROL SYSTEM; U.S. Pat. No. 5,444,611 granted Aug. 22, 1995 of Peter J. Woytowitz, et al. entitled LAWN AND GARDEN IRRIGATION CONTROLLER; U.S. Pat. No. 5,829,678 granted Nov. 3, 1998 of Richard E. Hunter et al. entitled SELF-CLEANING IRRIGATION REGULATOR VALVE APPARATUS; U.S. Pat. No. 6,088,621 granted Jul. 11, 2000 also of Peter J. Woytowitz et al. entitled PORTABLE APPARATUS FOR RAPID REPROGRAMMING OF IRRIGATION CONTROLLERS; U.S. Pat. No. 6,721,630 granted Apr. 13, 2004 also of Peter J. Woytowitz entitled EXPANDABLE IRRIGATION CONTROLLER WITH OPTIONAL HIGH-DENSITY STATION MODULE; U.S. Pat. No. 5,179,347 granted Jan. 12, 1993 of Alfred J. Hawkins; U.S. Pat. No. 6,842,667 granted Jan. 11, 2005 of Beutler et al. entitled POSITIVE STATION MODULE LOCKING MECHANISM FOR EXPANDABLE IRRIGATION CONTROLLER; U.S. patent application Ser. No. 10/883,283 filed Jun. 30, 2004 also of Peter J. Woytowitz entitled HYBRID MODULAR/DECODER IRRIGATION CONTROLLER, now U.S. Pat. No. 7,069,115 granted Jun. 27, 2007; pending U.S. patent application Ser. No. 10/985,425 filed Nov. 9, 2004 also of Peter J. Woytowitz et al. and entitled EVAPOTRANSPIRATION UNIT CONNECTABLE TO IRRIGATION CONTROLLER; pending U.S. patent application Ser. No. 11/288,831 filed Nov. 29, 2005 of LaMonte D. Porter et al. and entitled EVAPOTRANSPIRATION UNIT FORRE-PROGRAMMING AN IRRIGATION CONTROLLER; U.S. patent application Ser. No. 11/045,527 filed Jan. 28, 2005 also of Peter J. Woytowitz entitled DISTRIBUTED ARCHITECTURE IRRIGATION CONTROLLER, now U.S. Pat. No. 7,245,991 granted Jul. 17, 2007; U.S. Pat. No. 7,289,886 of Peter J. Woytowitz granted Oct. 30, 2007 entitled MODULAR IRRIGATION CONTROLLER WITH SEPARATE FIELD VALVE LINE WIRING TERMINALS; U.S. Pat. No. 7,225,058 of LaMonte D. Porter granted May 29, 2007 entitled MODULAR IRRIGATION CONTROLLER WITH INDIRECTLY POWERED STATION MODULES; pending U.S. patent application Ser. No. 11/458,551 filed Jul. 19, 2006 of LaMonte D. Porter et al. entitled IRRIGATION CONTROLLER WITH INTERCHANGEABLE CONTROL PANEL; pending U.S. patent application Ser. No. 12/042,301 filed Mar. 4, 2008 of Peter J. Woytowitz et al. entitled IRRIGATION CONTROLLER WITH SELECTABLE WATERING RESTRICTIONS; pending U.S. patent application Ser. No. 12/181,894 filed Jul. 29, 2008 of Peter J. Woytowitz et al. entitled IRRIGATION SYSTEM WITH ET BASED SEASONAL WATERING ADJUSTMENT; and pending U.S. patent application Ser. No. 12/251,179 filed Oct. 14, 2008 of Peter J. Woytowitz et al. entitled IRRIGATION SYSTEM WITH SOIL MOISTURE BASED SEASONAL WATERING ADJUSTMENT. The aforementioned U.S. patents and applications are all assigned to Hunter Industries, Inc., the assignee of the subject application, except for the patent granted Jan. 12, 1993 to Hawkins.

The present invention addresses the hesitancy or inability of users to learn the horticultural factors required to set up a conventional ET based irrigation controller. The irrigation system of the present invention has a familiar manner of entering, selecting and modifying its watering schedules, and either built-in or add-on capability to automatically modify its watering schedules based on ET data in order to conserve water and effectively irrigate vegetation throughout the year as weather conditions vary. The user friendly irrigation system of the present invention is capable of achieving, for example, eighty-five percent of the maximum amounts of water that can theoretically be conserved on a given irrigation site, but is still able to be used by most non-professionals. Therefore, a large percentage of users of the irrigation system of the present invention will have a much more beneficial environmental impact than a near perfect solution provided by complex prior art ET based irrigation controllers that might at best be adopted a small percentage of users. Even within the small percentage of users that adopt the full ET device, many of them may not be set up correctly because of the complexities of ET, and may therefore operate inefficiently.

Referring to FIG. 1, in accordance with an embodiment of the present invention, an irrigation system 10 comprises a stand alone irrigation controller 12 connected via cable 14 to a stand alone ET unit 16 that is in turn connected via cable 18 to a stand alone weather station 20 and the stand alone ET unit 16 that is also connected via cable 19 to a stand alone soil moisture sensor 21. The controller 12 and ET unit 16 would typically be mounted in a garage or other protected location, although they can have a waterproof construction that allows them to be mounted out of doors. The soil moisture sensor 21 is typically buried in the ground in the irrigation area to be monitored for soil moisture at a depth determined by the plant root zone depth in the irrigation zone. The weather station 20 is typically mounted on an exterior wall, gutter, post or fence near the garage. The cables 14, 18 and 19 typically include copper wires so that power can be supplied to the ET 16 unit, the soil moisture sensor 21, and the weather station 20 from the irrigation controller 12. Data and commands are sent on other copper wires in the cables. Fiber optic cables can also be utilized for sending data and commands. In the event that wireless communications are used with any of the components, a battery may be used to power the wireless component. The controller 12, ET unit 16, soil moisture sensor 21, and weather station 20 may exchange data and commands via wireless communication links 22, 26 and 24. A transformer 25 that plugs into a standard household 110 volt AC duplex outlet supplies twenty-four volt AC power to the stand alone irrigation controller 12. In its preferred form, the irrigation system 10 employs a hard wired communication link 14 between the stand alone irrigation controller 12 and the stand alone ET unit 16 that are normally mounted adjacent one another, such as on a garage wall, a wireless communication link 26 between the stand alone ET unit 16 and the stand alone soil moisture sensor 21, and a wireless communication link 24 between the stand alone ET unit 16 and the stand alone weather station 20.

Figure 2:
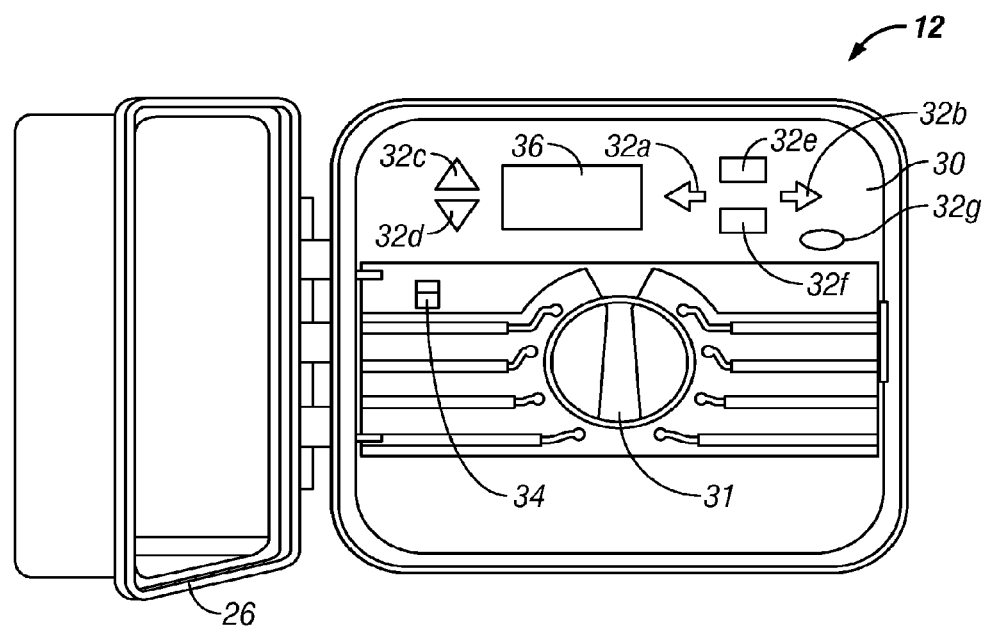
FIG. 2 is a front elevation view of the stand alone irrigation controller of the system of FIG. 1 with its front door open to reveal its removable face pack.
Figure 3:
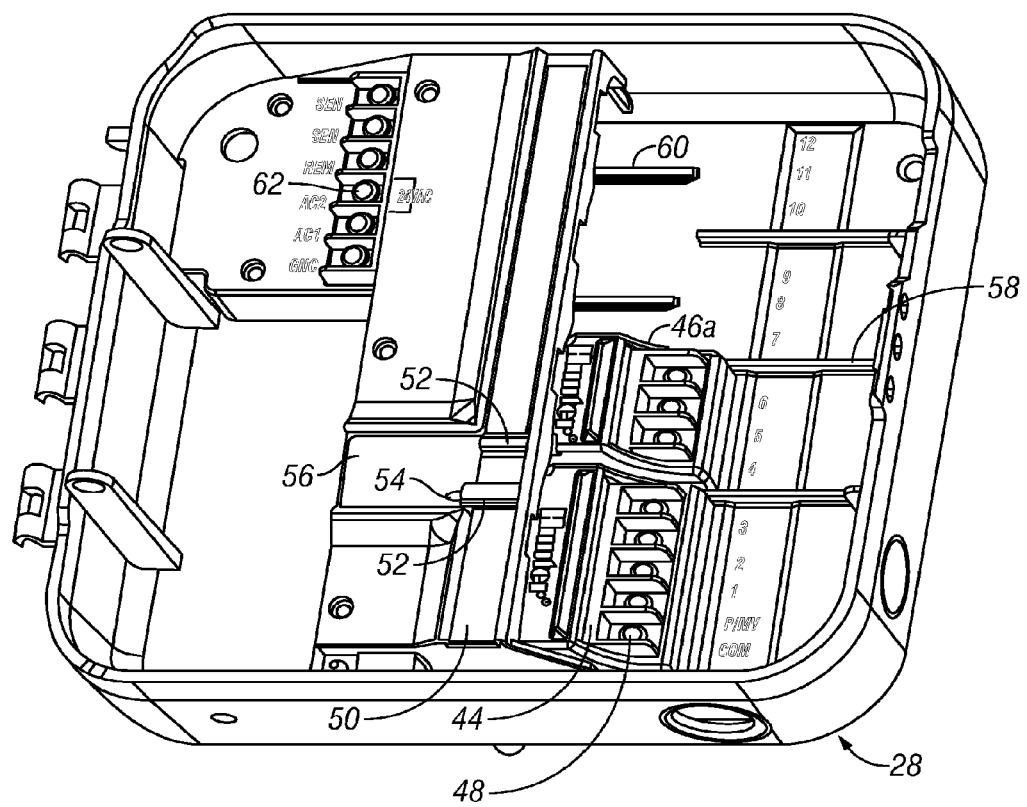
FIG. 3 is an enlarged perspective view of the back panel of the stand alone irrigation controller of FIG. 2 illustrating one base module and one station module plugged into their respective receptacles in the back panel.

Referring to FIG. 2, the stand alone irrigation controller 12 may be the Pro-C modular irrigation controller commercially available from Hunter Industries, Inc. The irrigation controller 12 includes a wall-mountable plastic housing structure in the form of a generally box-shaped front door 26 hinged along one vertical edge to a generally box-shaped back panel 28 (FIG. 3). A generally rectangular face pack 30 (FIG. 2) is removably mounted over the back panel 28 and is normally concealed by the front door 26 when not being accessed for programming. The face pack 30 has an interface in the form of a plurality of manually actuable controls including a rotary knob switch 31 and push button switches 32$a$-32$g$ as well as slide switch 34 which serves as a sensor by-pass switch. Watering schedules consisting of various run and cycle times can be entered by the user by manipulating the rotary knob switch 31 and selected ones of the push button switches 32$a$-32$g$ in conjunction with observing numbers, words and/or graphic symbols indicated on a liquid crystal display (LCD) 36. Push buttons 32$c$ and 32$d$ are used to increase or decrease the seasonal adjust value. The watering schedules can be a complicated set of run time and cycle algorithms, or a portion thereof, such as a simple five minute cycle for a single station. Alternatively, existing pre-programmed watering schedules can be selected, such as selected zones every other day. Any or sub-combination of manually actuable input devices such as rotary switches, dials, push buttons, slide switches, rocker switches, toggle switches, membrane switches, track balls, conventional screens, touch screens, etc. may be used to provide an interface that enables a user to select and/or enter a watering schedule. Still another alternative involves uploading watering schedules through the SMART PORT (Trademark) feature of the irrigation controller 12, more details of which are set forth in the aforementioned U.S. Pat. No. 6,088,621.

Figure 4:
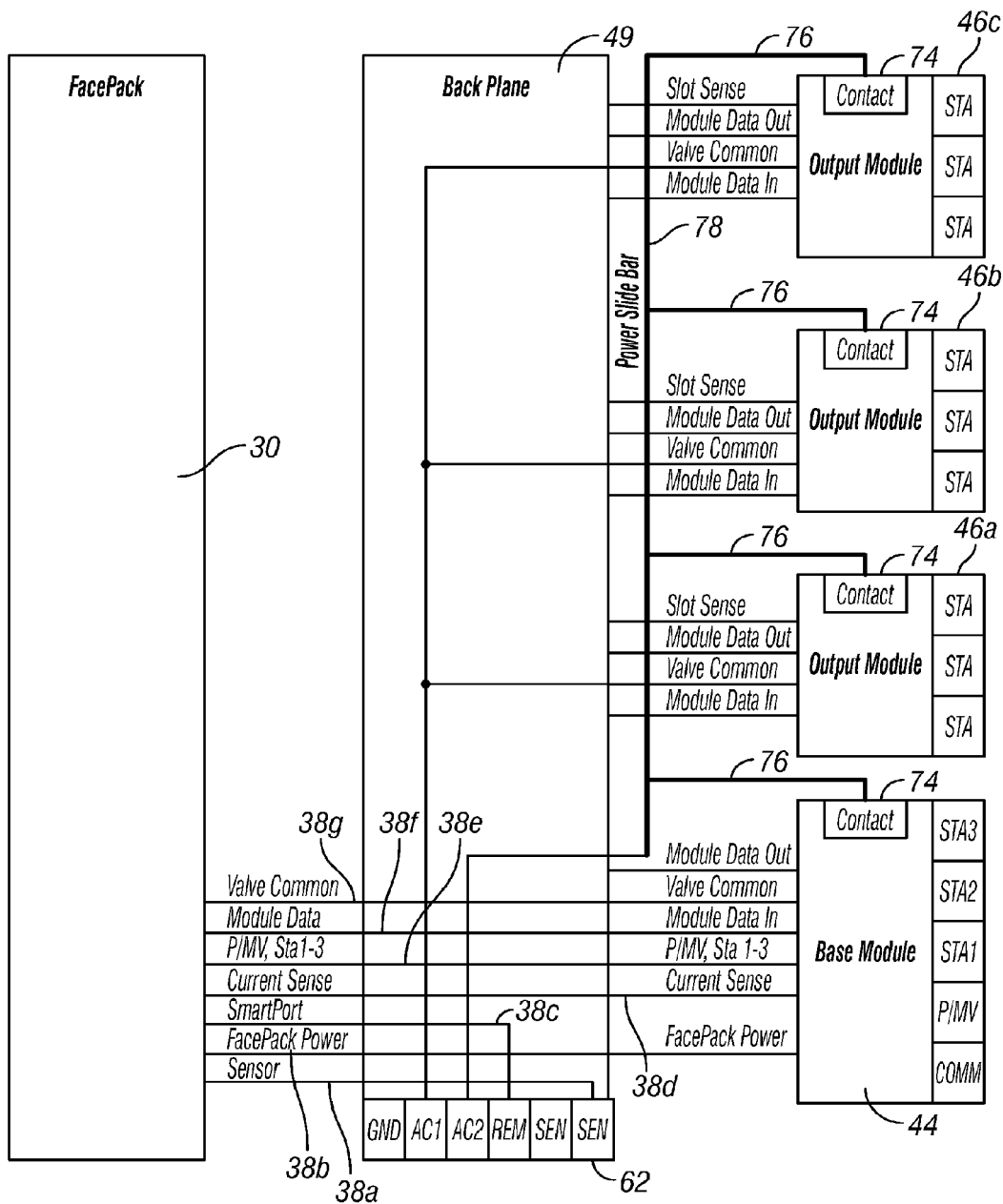
FIG. 4 is a block diagram of the electronic portion of the stand alone irrigation controller of FIG. 2.

The face pack 30 (FIG. 2) encloses and supports a printed circuit board (not illustrated) with a processor for executing and implementing a stored watering program. An electrical connection is made between the face pack 30 and the components in the back panel 28 through a detachable ribbon cable including a plurality of conductors 38$a$-$g$ (FIG. 4). The circuitry inside the face pack 30 can be powered by a battery to allow a person to remove the face pack 30, un-plug the ribbon cable, and walk around the lawn, garden area or golf course while entering watering schedules or altering pre-existing watering schedules.

A processor 40 (FIG. 5) is mounted on the printed circuit board inside the face pack 30. A watering program stored in a memory 42 is executable by the processor 40 to enable the processor to generate commands for selectively turning a plurality of solenoid actuated irrigation valves (not illustrated) ON and OFF in accordance with the selected or entered watering schedule. An example of such an irrigation valve is disclosed in U.S. Pat. No. 5,996,608 granted Dec. 7, 1999 of Richard E. Hunter et al. entitled DIAPHRAGM VALVE WITH FILTER SCREEN AND MOVEABLE WIPER ELEMENT, the entire disclosure of which is hereby incorporated by reference. Said patent is also assigned to Hunter Industries, Inc. Typically the solenoid actuated valves are mounted in subterranean plastic boxes (not illustrated) on the irrigated site.

The processor 40 communicates with removable modules 44 and 46$a$-$c$ (FIG. 3) each containing a circuit that includes a plurality of solid state switches, such as triacs. These switches turn twenty-four volt AC current ON and OFF to open and close corresponding solenoid actuated valves via connected to dedicated field valve wires and a common return line to screw terminals 48 on the modules 44 and 46$a$-$c$.

In FIG. 3, the modules 44 and 46a are shown installed in side-by-side fashion in station module receptacles formed in the back panel 28. The module 44 serves as a base module that can turn a master valve ON and OFF in addition to a plurality of separate station valves. Each module includes an outer generally rectangular plastic housing with a slot at its forward end. A small printed circuit board (not illustrated) within the module housing supports the station module circuit that includes conductive traces that lead to the screw terminals 48 and to V-shaped spring-type electrical contacts (not illustrated) that are accessible via the slot in the forward end of the module housing. These V-shaped electrical contacts register with corresponding flat electrical contacts on the underside of a relatively large printed circuit board 49 (FIG. 4) mounted inside the back panel 28 when the module 44 is slid into its corresponding receptacle. The relatively large printed circuit board 49 is referred to as a "back plane." The base module 44 and station modules 46a-c and the back plane 49 are thus electrically and mechanically connected in releasable fashion through a so-called "card edge" connection scheme when the base module 44 and station modules 46a-c are inserted or plugged into their respective receptacles.

An elongate locking bar 50 (FIG. 3) can be manually slid up and down in FIG. 4 between locked and unlocked positions to secure and un-secure the modules 44 and 46a-c after they have been fully inserted into their respective receptacles. Opposing raised projections 52 formed on the locking bar 50 facilitate sliding the locking bar 50 with a thumb. A pointer 54 extends from one of the raised projections 52 and serves as a position indicator that aligns with LOCKED and UNLOCKED indicia (not illustrated) molded into the upper surface of another plastic support structure 56 mounted inside back panel 28.

The receptacles for the modules such as 44 and 46a-c are partially defined by vertical walls 58 (FIG. 3) formed on the back panel 28. Vertical walls 60 also formed on the back panel 28 to provide support to the modules 44 and 46a-c. An auxiliary terminal strip provides additional screw terminals 62 for connecting remote sensors and accessories. The term "receptacles" should be broadly construed as defined in one or more of the patents and pending applications incorporated by reference above.

Figure 5:
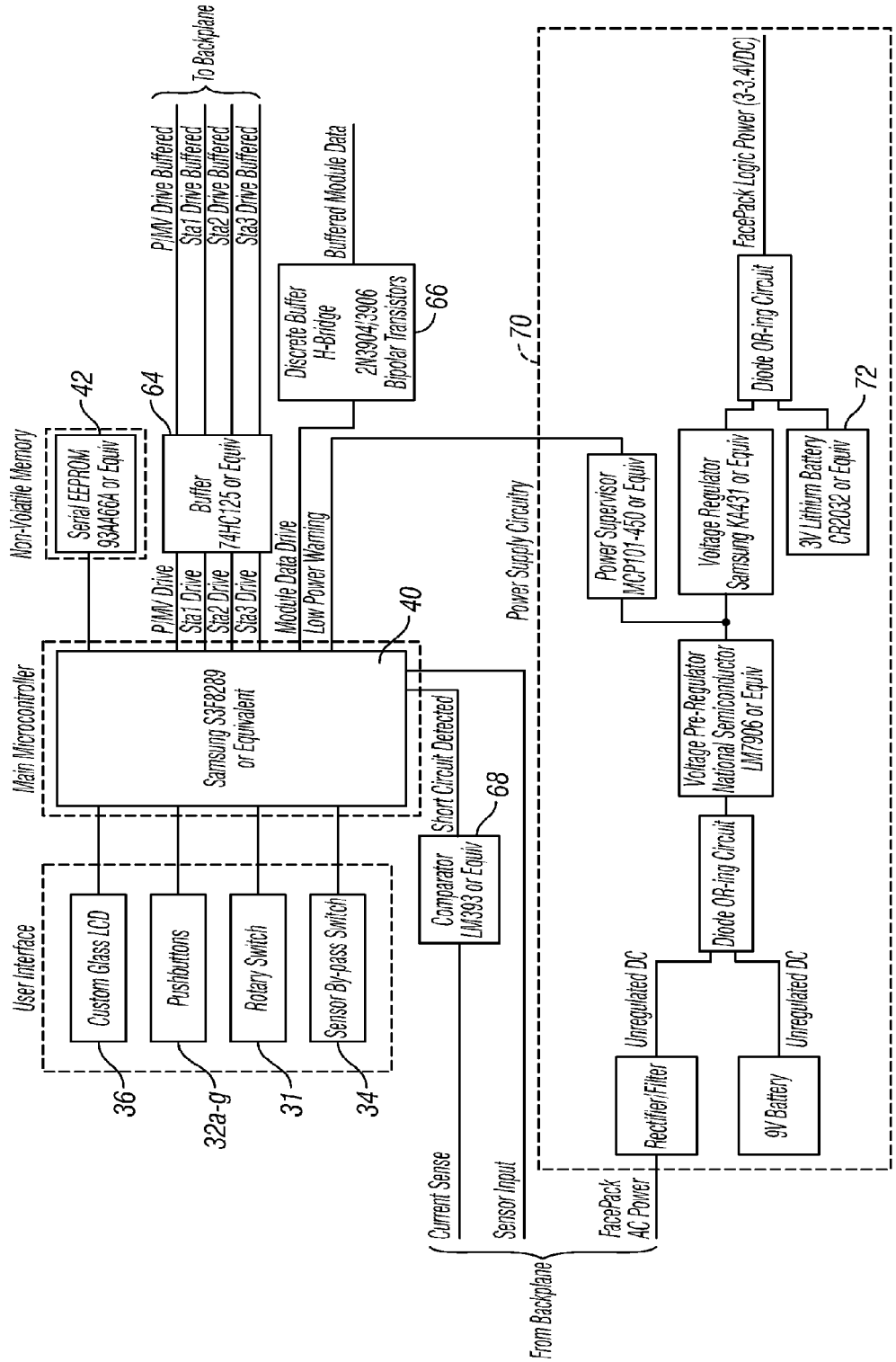
FIG. 5 is a block diagram illustrating further details of the electronic portion of the stand alone irrigation controller of FIG. 2 that resides in the face pack of the controller.

FIGS. 4 and 5 are block diagrams of the electronic portion of the stand alone irrigation controller 12. The electronic components are mounted on printed circuit boards contained within the face pack 30, back panel 28, base module 44 and station modules 46a-c. The processor 40 (FIG. 4) is mounted on the printed circuit board inside the face pack 30 and executes the watering program stored in the memory 42. By way of example, the processor 40 may be a Samsung S3F8289 processor that executes a program stored in the separate memory 42 which can be an industry standard designation Serial EEPROM 93AA6A non-volatile memory device. Alternatively, the processor 40 and memory 42 may be provided in the form of a micro-computer with on-chip memory. The manually actuable controls 31, 32a-32g and 34 and the LCD display 36 of the face pack 30 are connected to the processor 40. The processor 40 sends drive signals through buffer 64 and back plane 49 to the base module 44. By way of example the buffer 64 may be an industry standard designation 74HC125 device. The processor 40 sends data signals to the modules 46a-c through buffer 66. The buffer 66 may be an H-bridge buffer including industry standard 2N3904/3906 discrete bipolar transistors.

The processor 40 (FIG. 4) controls the base module 44 and the station modules 46a-c in accordance with one or more watering schedules. Serial or multiplexed communication is enabled via the back plane 49 to the base module 44 and to each of the output modules 46a-c. Suitable synchronous serial data and asynchronous serial data station module circuits are disclosed in the aforementioned U.S. Pat. No. 6,721,630. The location of each module in terms of which receptacle it is plugged into is sensed using resistors on the back plane 49 and a comparator 68 (FIG. 5) which may be an industry standard LM393 device. The face pack 30 receives twenty-four volt AC power from the transformer 25 through the back plane 49 and, regulates the same via a power supply circuit 70 (FIG. 5). The power supply circuit 70 includes a National Semiconductor LM7906 voltage regulator, a Microchip Technology MCPI0I-450 power supervisor, and a Samsung KA431 voltage regulator. A lithium battery 72 such as an industry standard CR2032 battery is included in the power supply circuit 70 and provides backup power to the micro controller to maintain the internal clock in the event of a power failure. The face pack ribbon cable 38a-g (FIG. 4) that connects the face pack 30 and the back plane 49 can be disconnected, and a nine volt battery (FIG. 5) then supplies power to the face pack 30. This allows a user to remove the face 30 pack from the back panel 28 and enter or modify watering schedules as he or she walks around the irrigation site.

The modules 44 and 46a-c have contacts 74 (FIG. 4) on the top sides of their outer plastic housings. When the modules are first plugged into their receptacles, only a communication path is established with the processor 40 via the back plane 49. At this time the locking bar 50 (FIG. 3) is in its UNLOCKED position. Thereafter, when the locking bar is slid to its LOCKED position finger-like contacts 76 (FIG. 4) on the underside of the locking bar 50 register with the contacts 74 on the tops of the modules 44 and 46a-c to supply twenty-four volt AC power to the modules that is switched ON and OFF to the valves that are connected to the modules. The finger-like contacts 76 are connected to a common conductor 78 carried by the locking bar 50. When the locking bar 50 is slid to its LOCKED position projections and tabs that extend from the locking bar 50 and the modules are aligned to prevent withdrawal of the modules. See the aforementioned U.S. Pat. No. 7,225,058 for further details.

Figure 6:
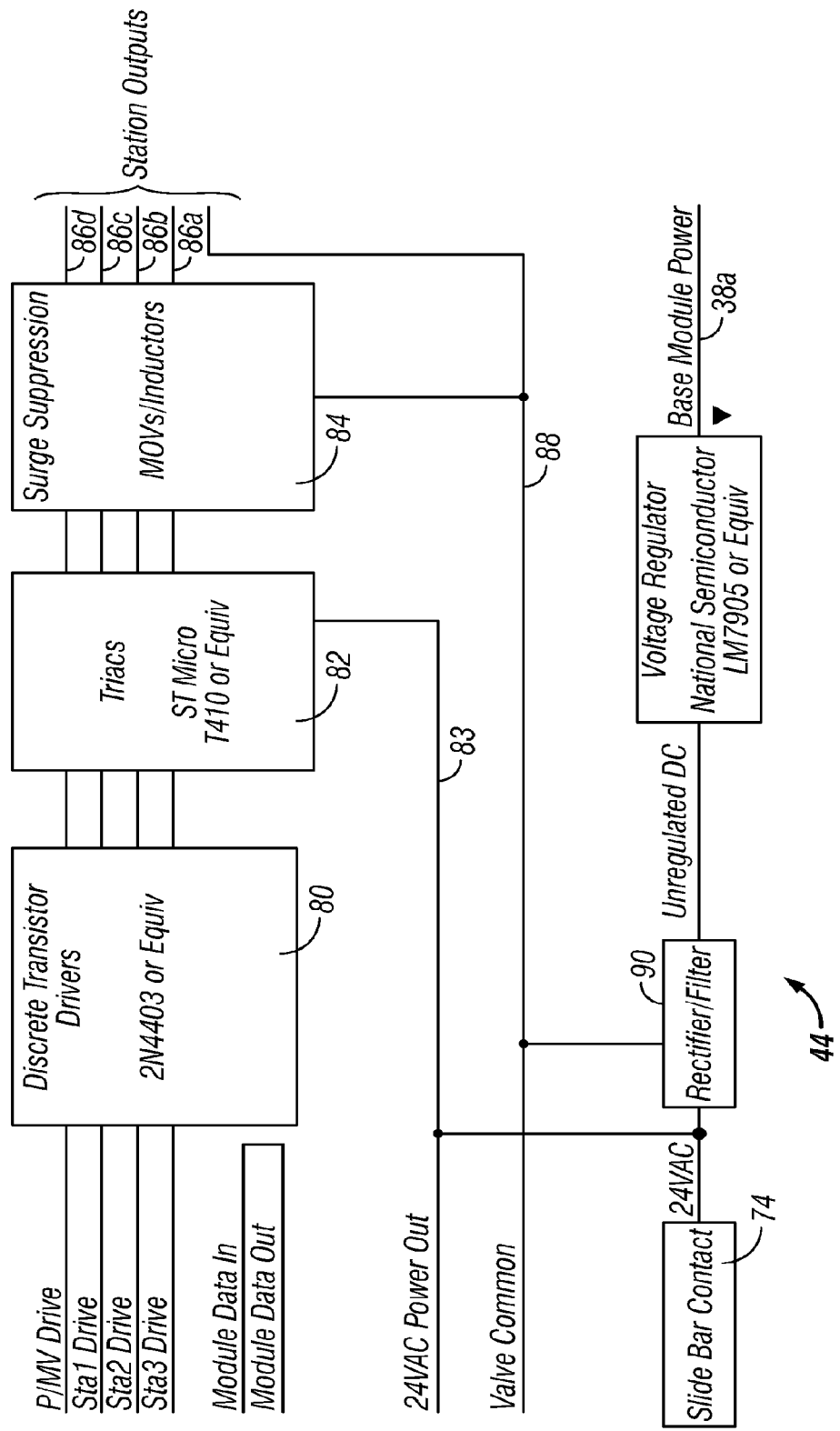
FIG. 6 is a block diagram illustrating further details of the electronic portion of the stand alone irrigation controller of FIG. 2 that resides in the base module.

FIG. 6 is a block diagram illustrating details of the electronic circuit of the base module 44. The base module circuit includes transistor drivers 80 and triacs 82 for switching the twenty-four volt AC signal ON and OFF to different solenoid actuated valves. By way of example, the transistor drivers 80 may be industry standard 2N4403 transistors and the triacs may be ST Microelectronics (Trademark) T410 triacs. The twenty-four volt AC signal is supplied to the triacs 82 via contact 74 and line 83. The twenty-four volt AC signal from each of the triacs 82 is routed through an inductor/MOV network 84 for surge suppression to four field valve lines 86a-d, each of which can be connected to a corresponding solenoid actuated valve. The valves are each connected to a valve common return line 88. The twenty-four volt AC signal is also supplied to a rectifier/filter circuit 90. The unregulated DC signal from the rectifier/filter circuit 90 is supplied to a National Semiconductor LM7905 voltage regulator 92 which supplies five volt DC power to the face pack 30 via a conductor 38c (FIG. 4) in the ribbon cable.

Figure 7:
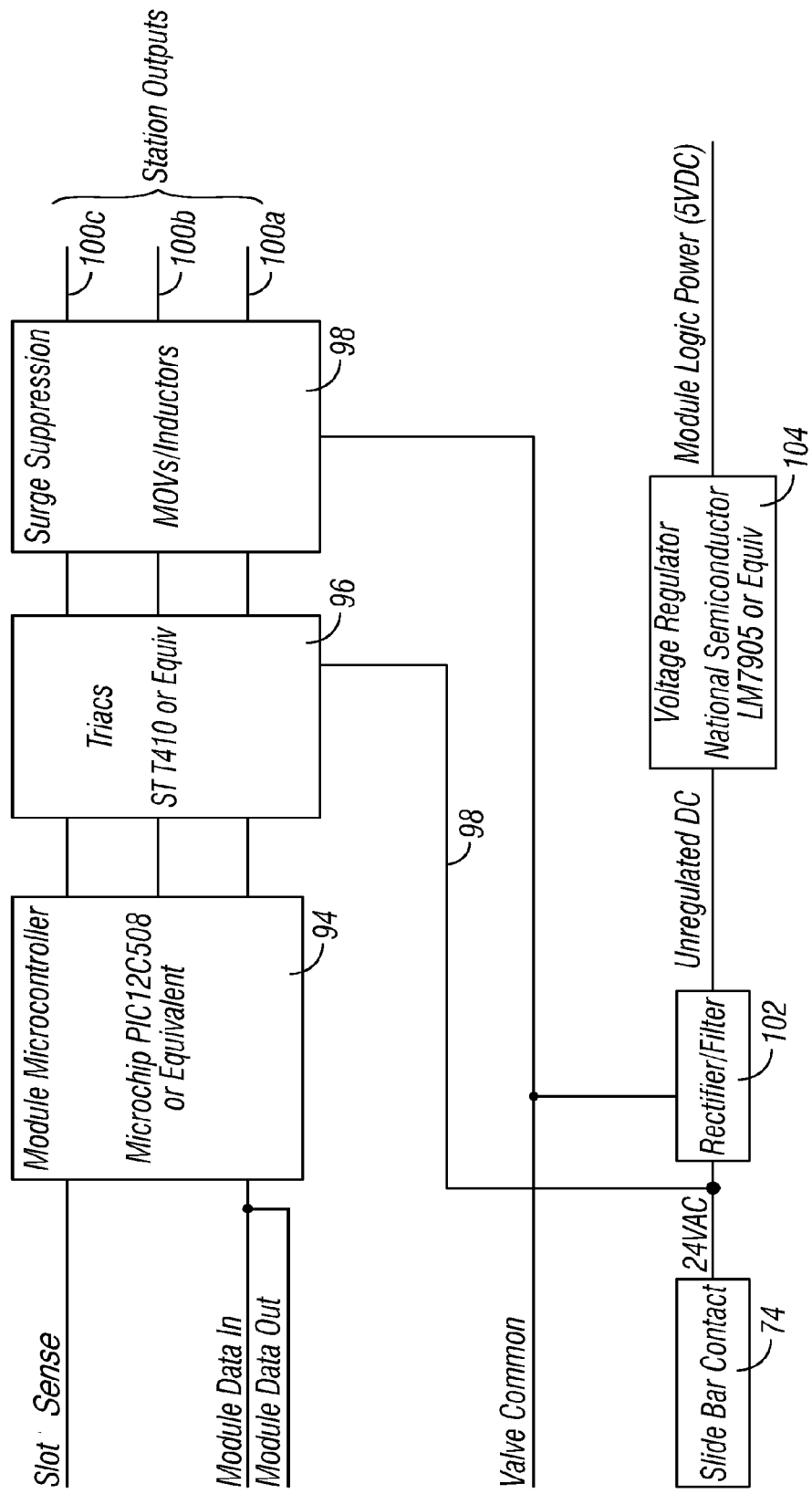
FIG. 7 is a block diagram illustrating further details of the electronic portion of the stand alone irrigation controller of FIG. 2 that resides in each of the station modules.

FIG. 7 is a block diagram illustrating details of the electronic circuit in each of the station modules 46a-c. The station module circuit includes a microcontroller such as the Microchip (Trademark) PIC 12C508 processor 94. The station module circuit further includes triacs 96 for switching the twenty-four volt AC signal ON and OFF to three different solenoid actuated valves. The twenty-four volt AC signal is supplied to the triacs 96 via contact 74 and line 98. The twenty-four volt AC signal from each of the triacs 94 is routed through an inductor/MOV network 98 including Epcos Inc. S10K35 MOV's for surge suppression to three field valve lines 100*a-c*, each of which can be connected to a corresponding solenoid actuated valve. The valves are each connected to the valve common return line 88. The twenty-four volt AC signal is also supplied to a rectifier/filter circuit 90. The unregulated DC signal "from the rectifier/filter circuit 102 is supplied to a National Semiconductor LM7905 voltage regulator 104 which supplies five volt DC power to the microcontroller through a conductor (not illustrated).

Figure 8A:
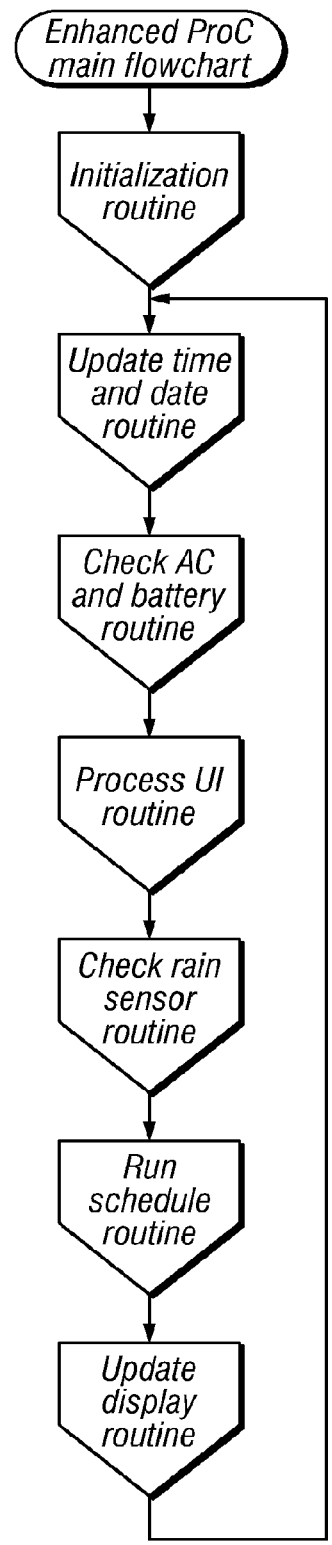
FIGS. 8A-8W are detailed flow diagrams illustrating the operation of the stand alone irrigation controller of FIG. 2.
Figure 8B:
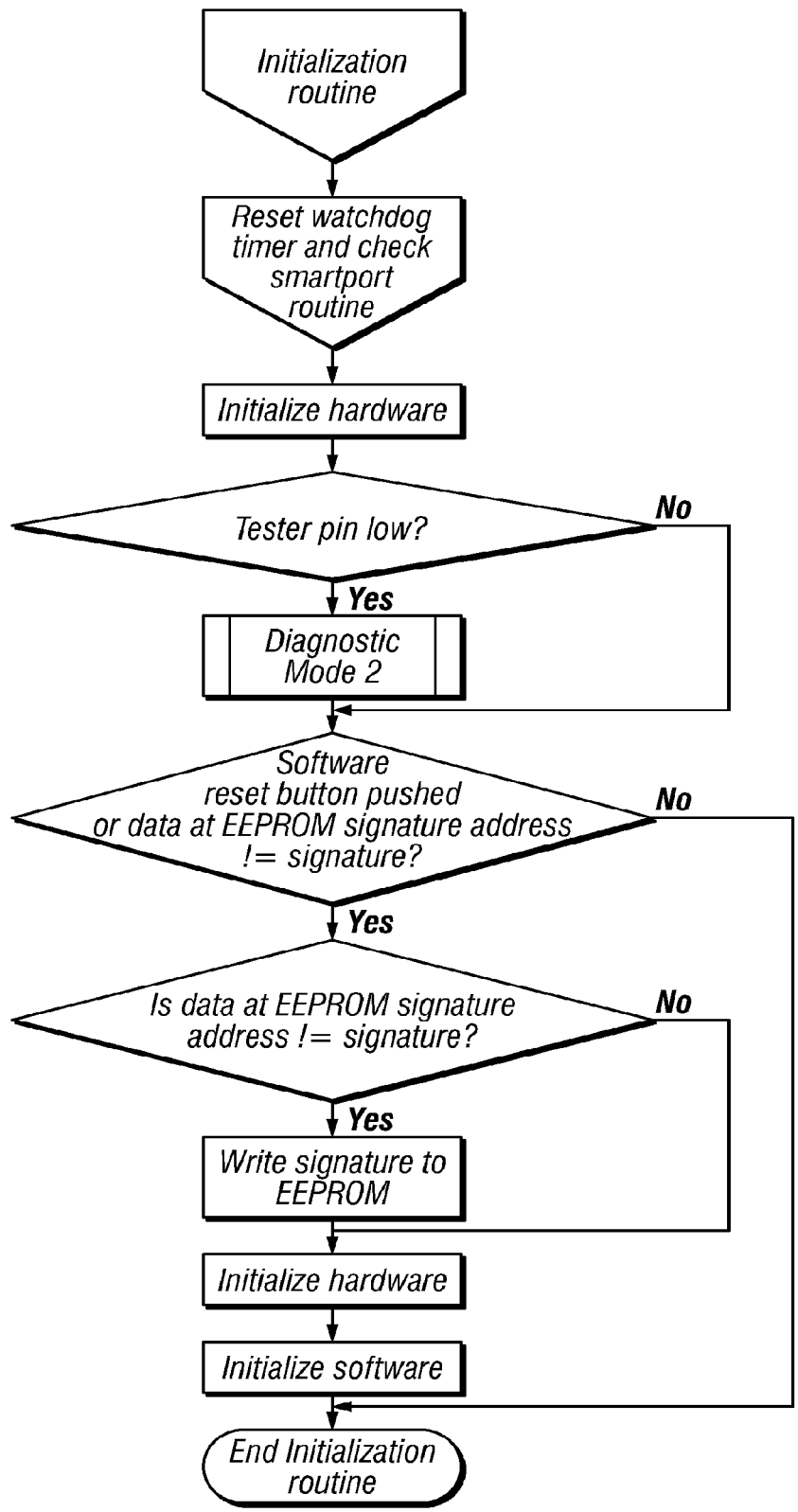
Figure 8C:
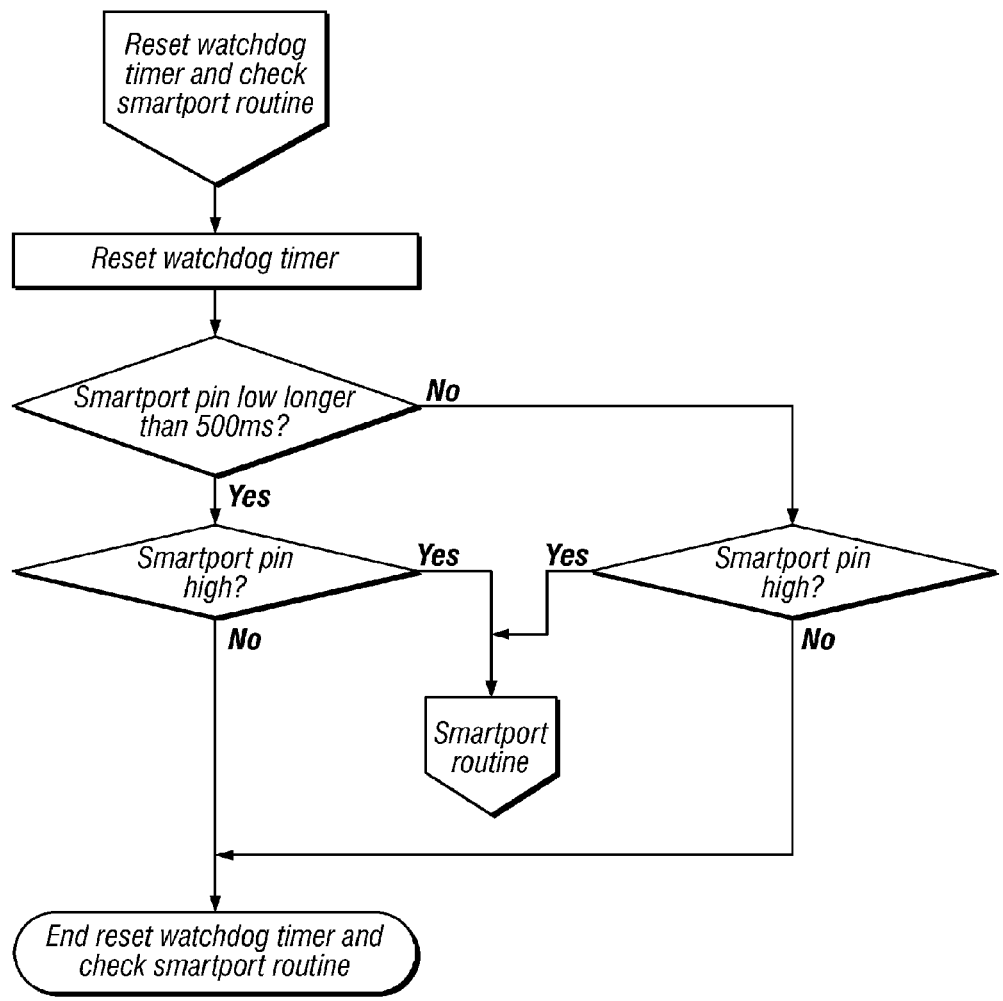
Figure 8D:
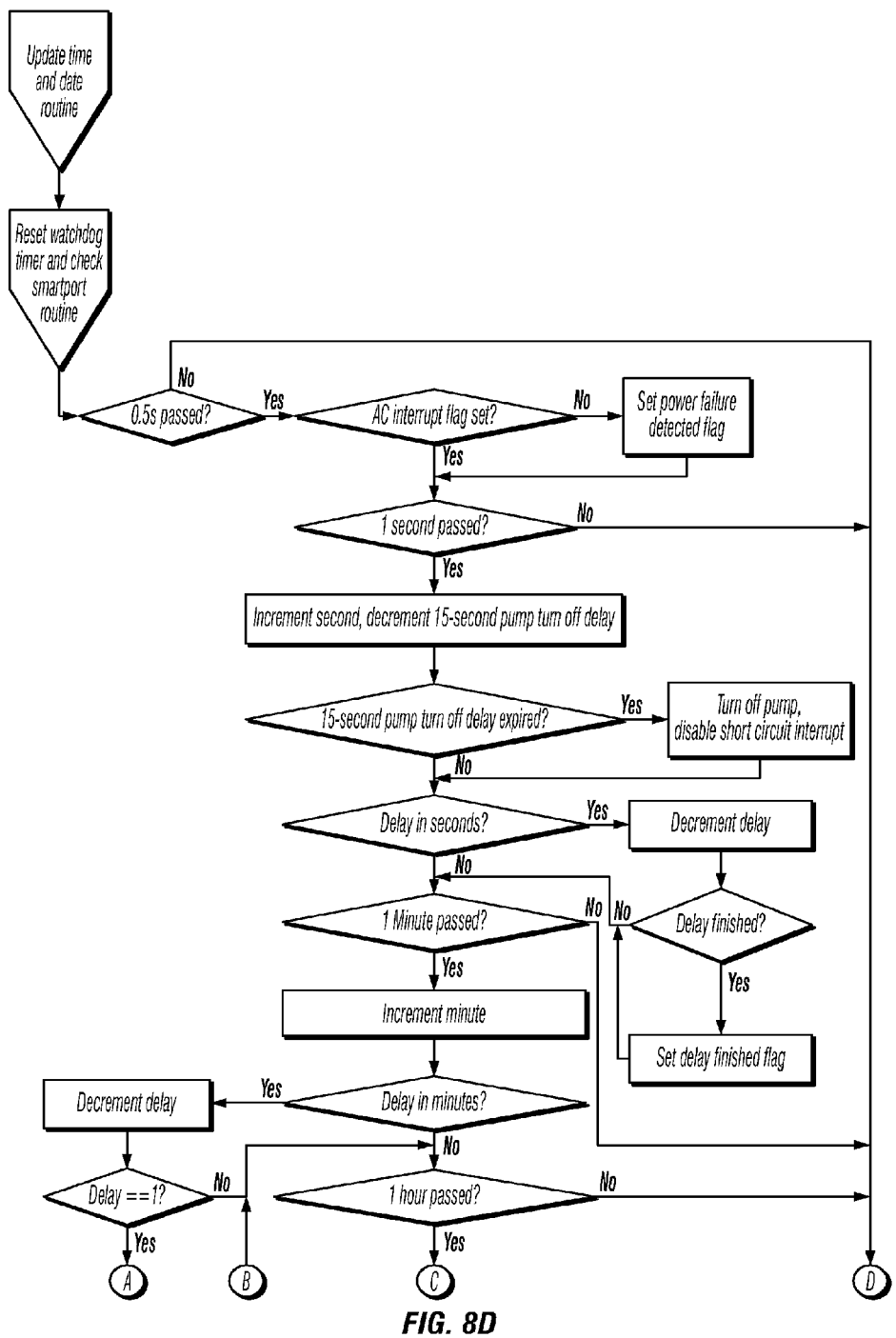
Figure 8D:
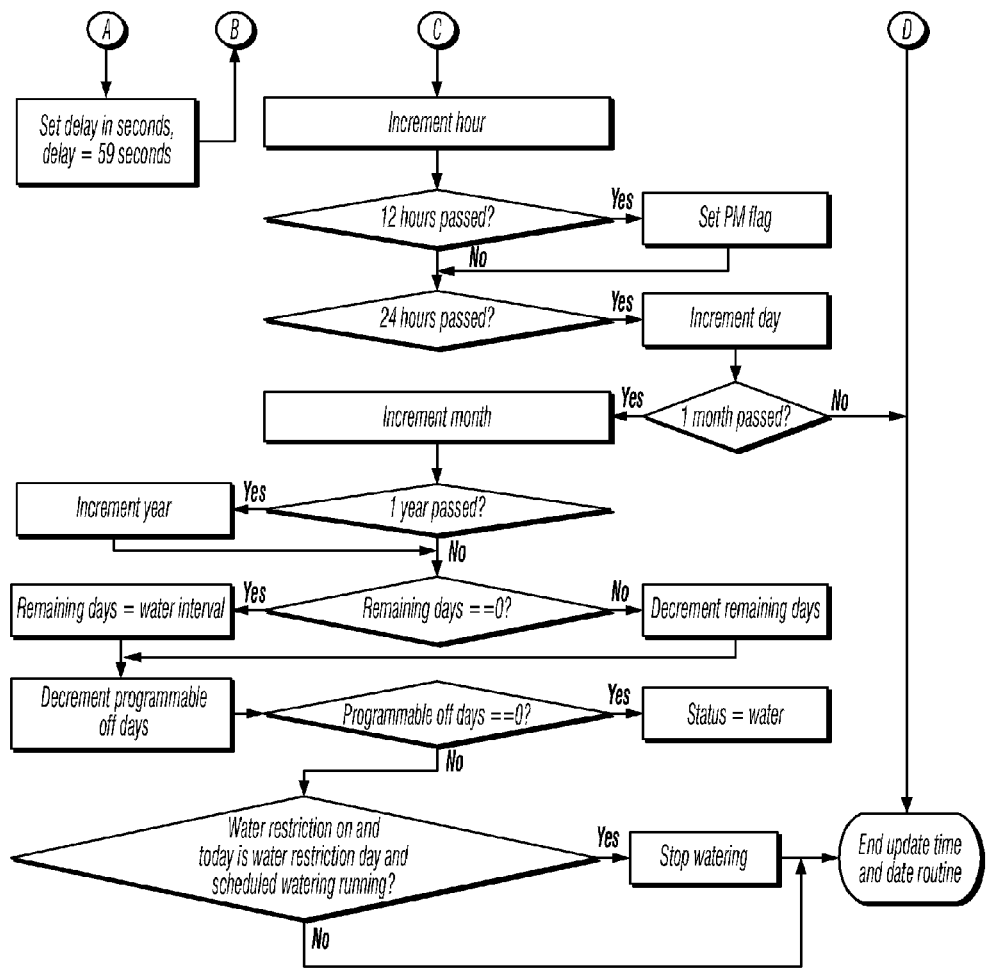
Figure 8E:
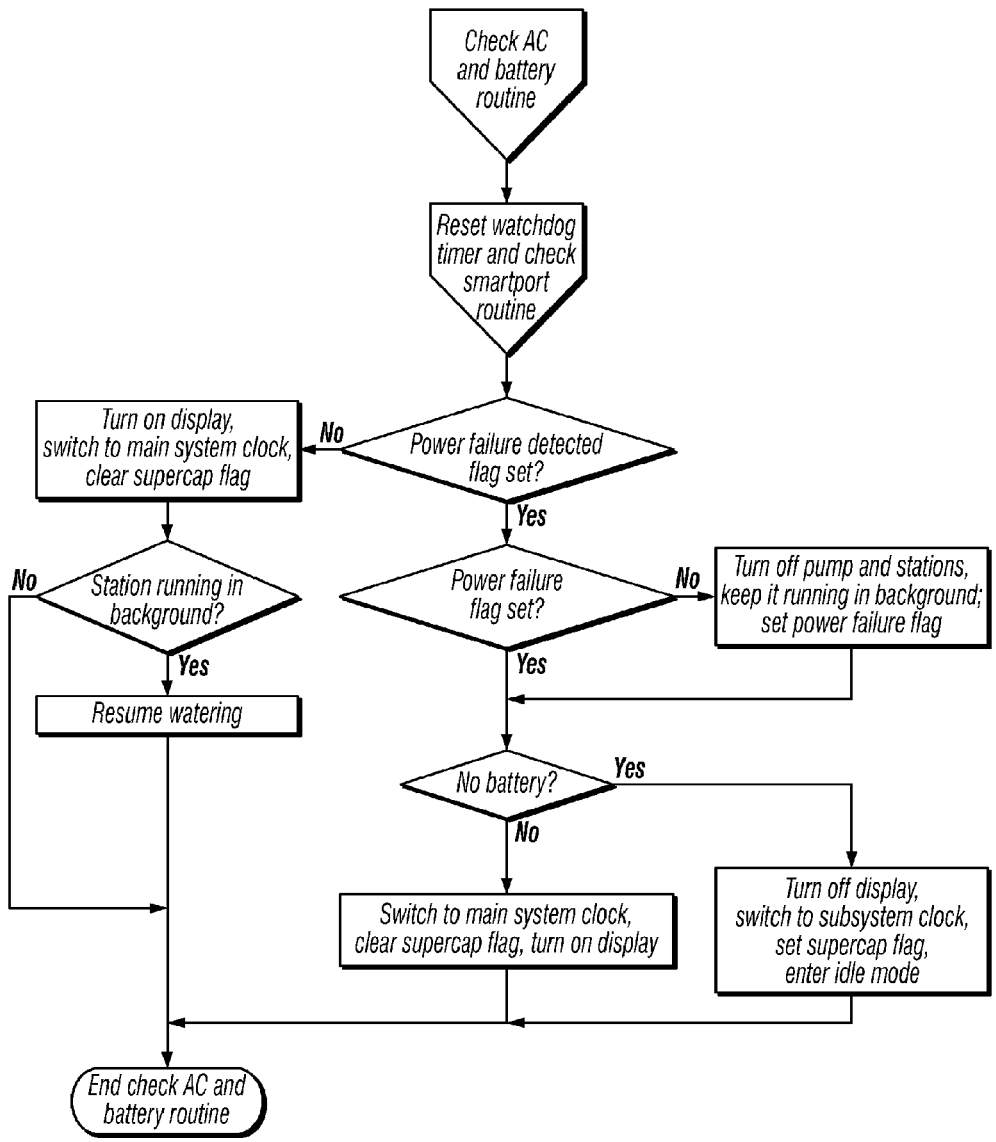
Figure 8F:
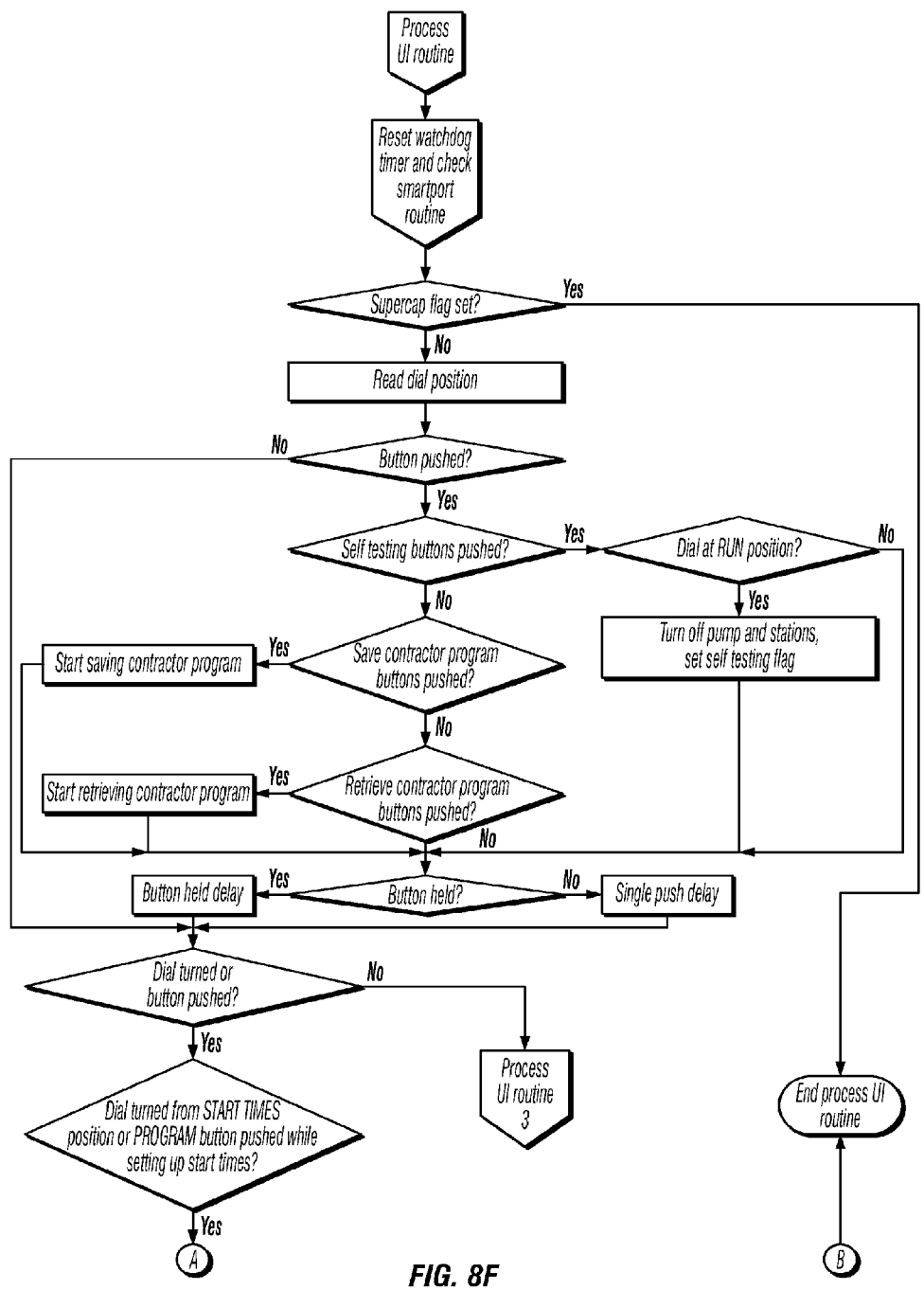
Figure 8F:
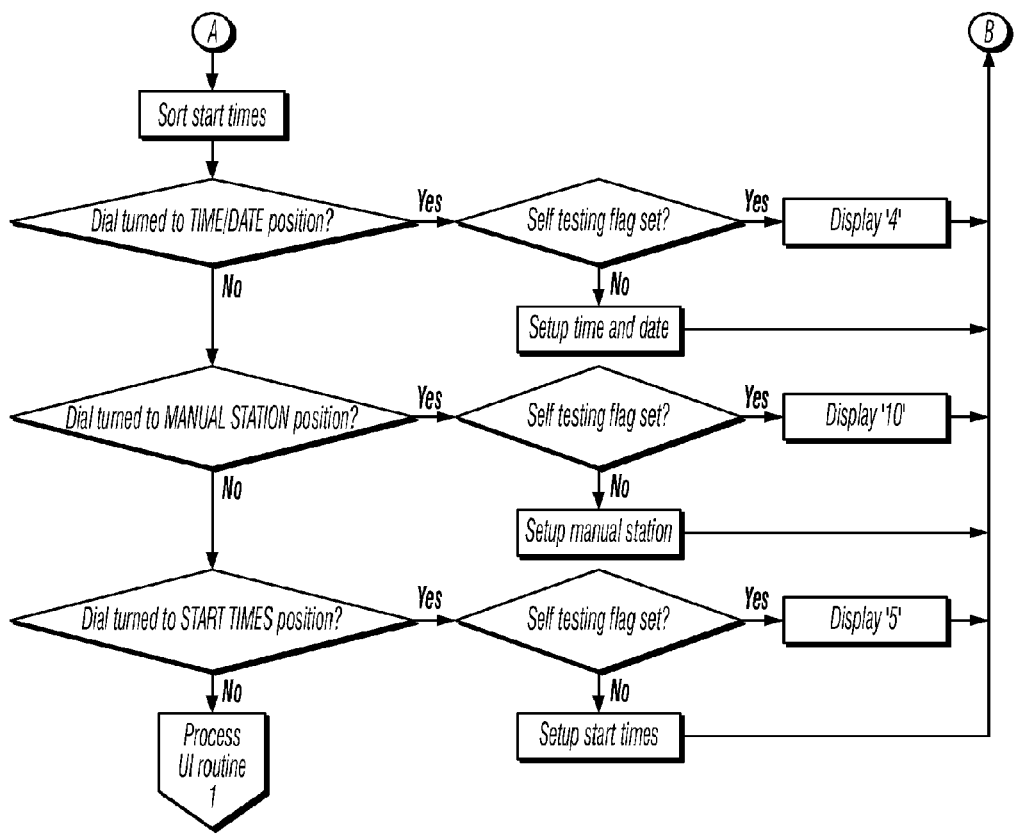
Figure 8G:
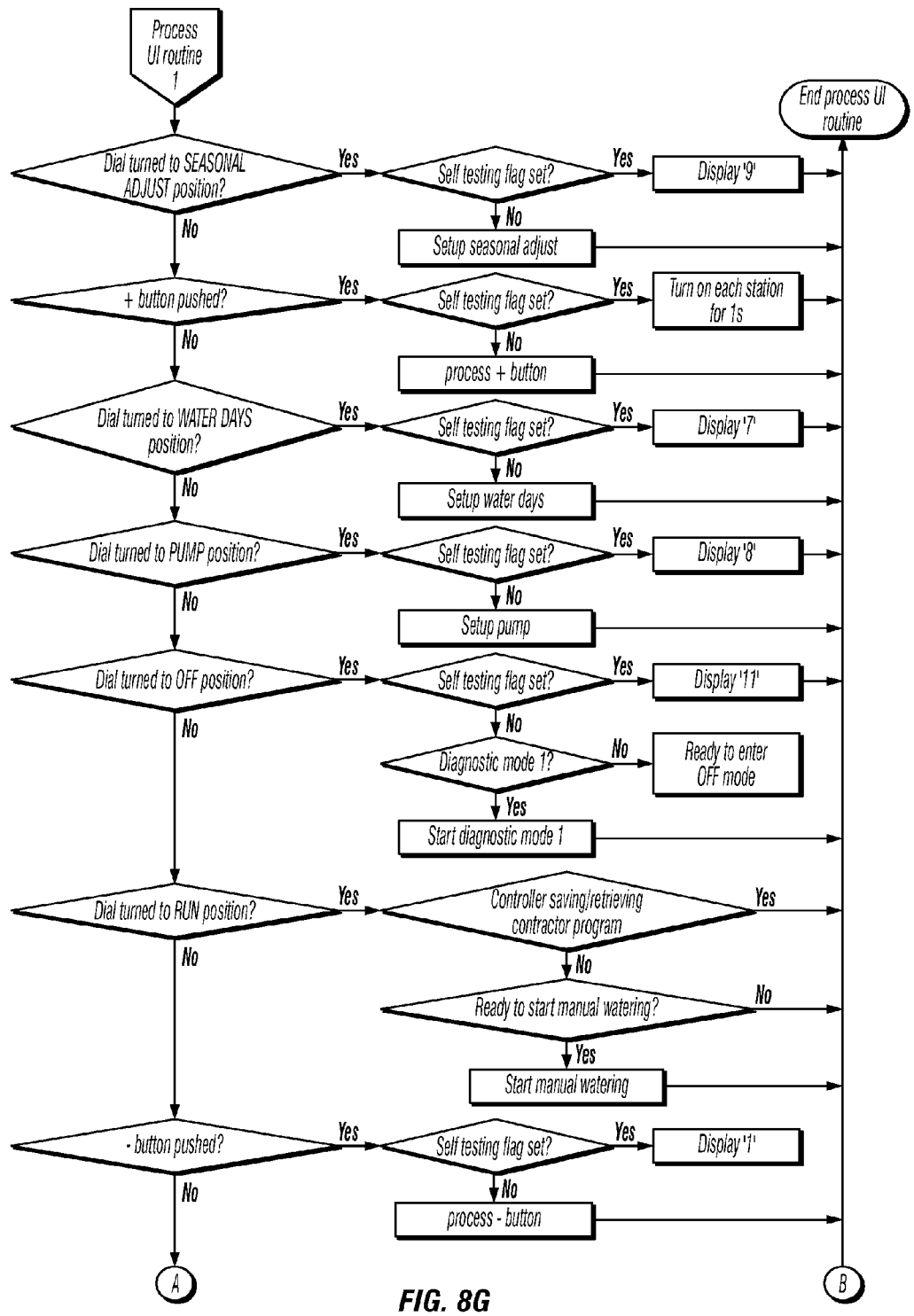
Figure 8G:
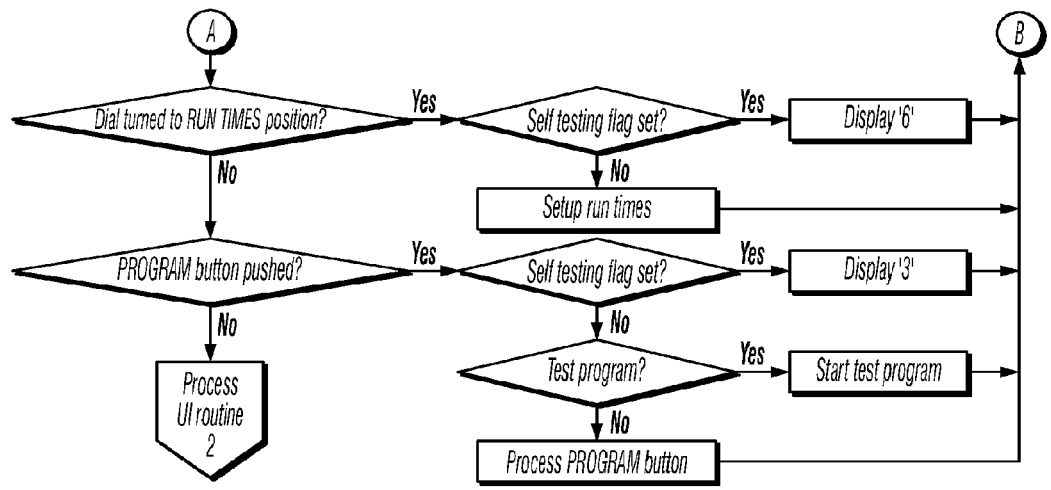
Figure 8H:
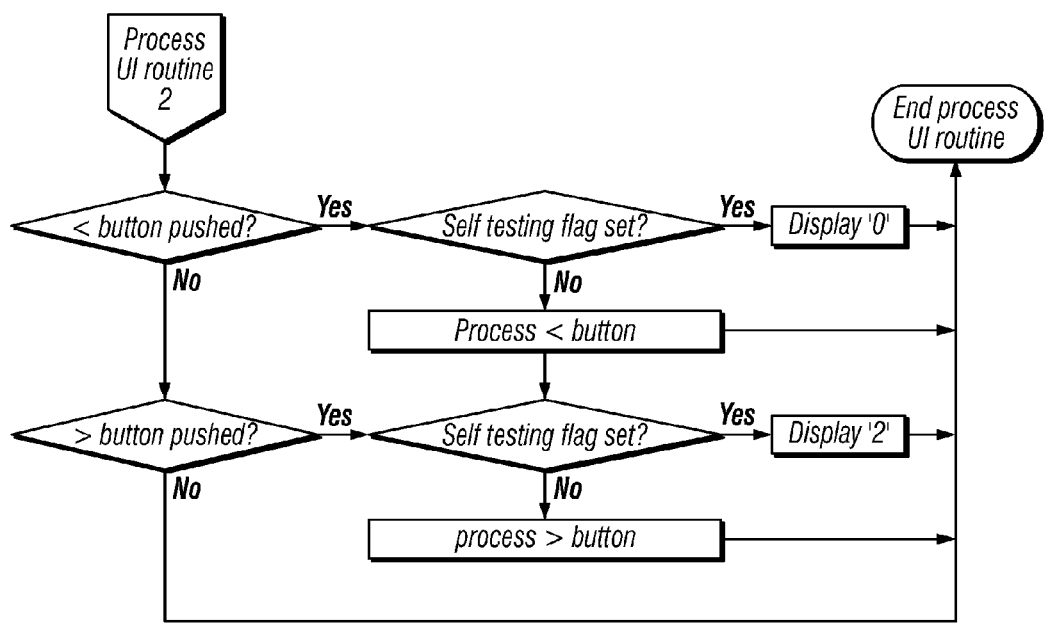
Figure 8I:
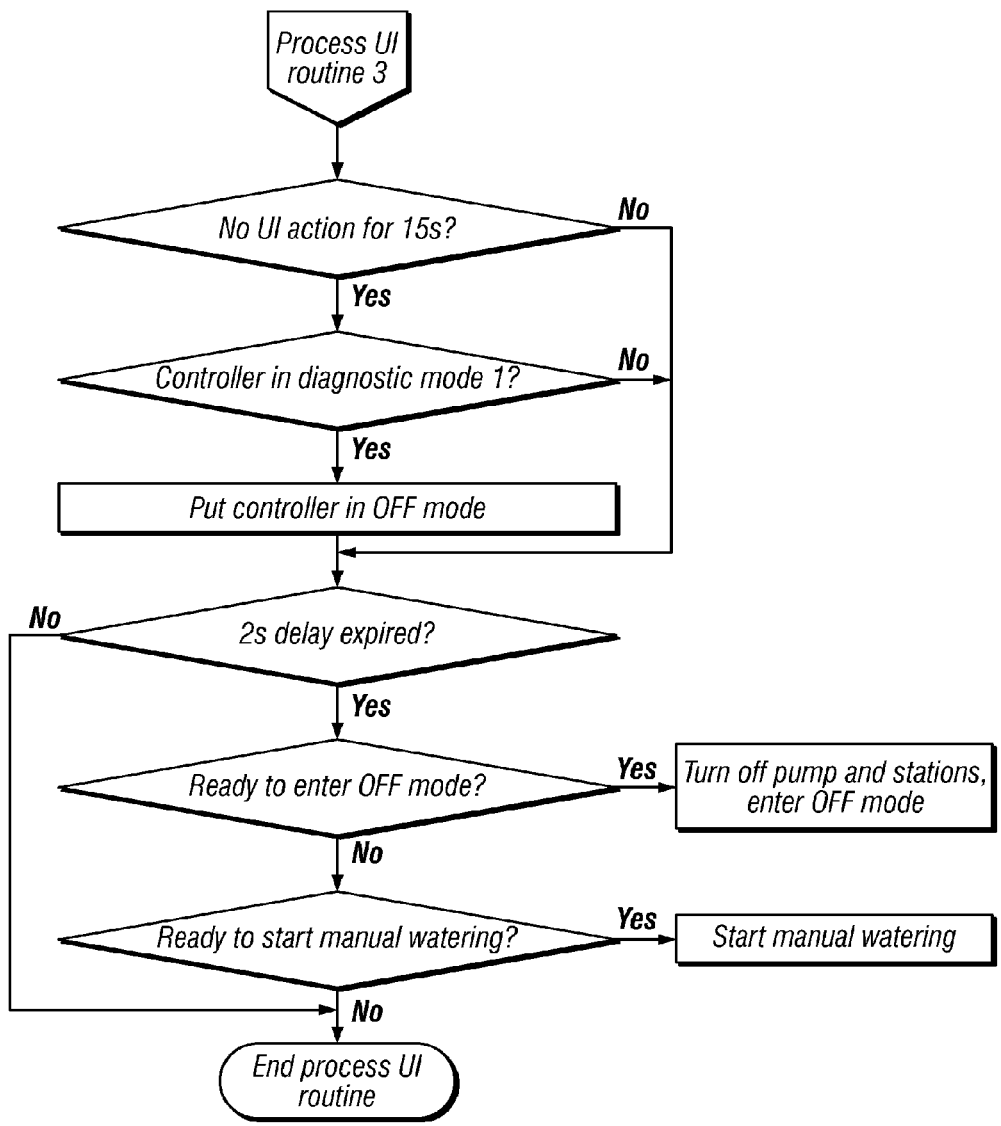
Figure 8J:
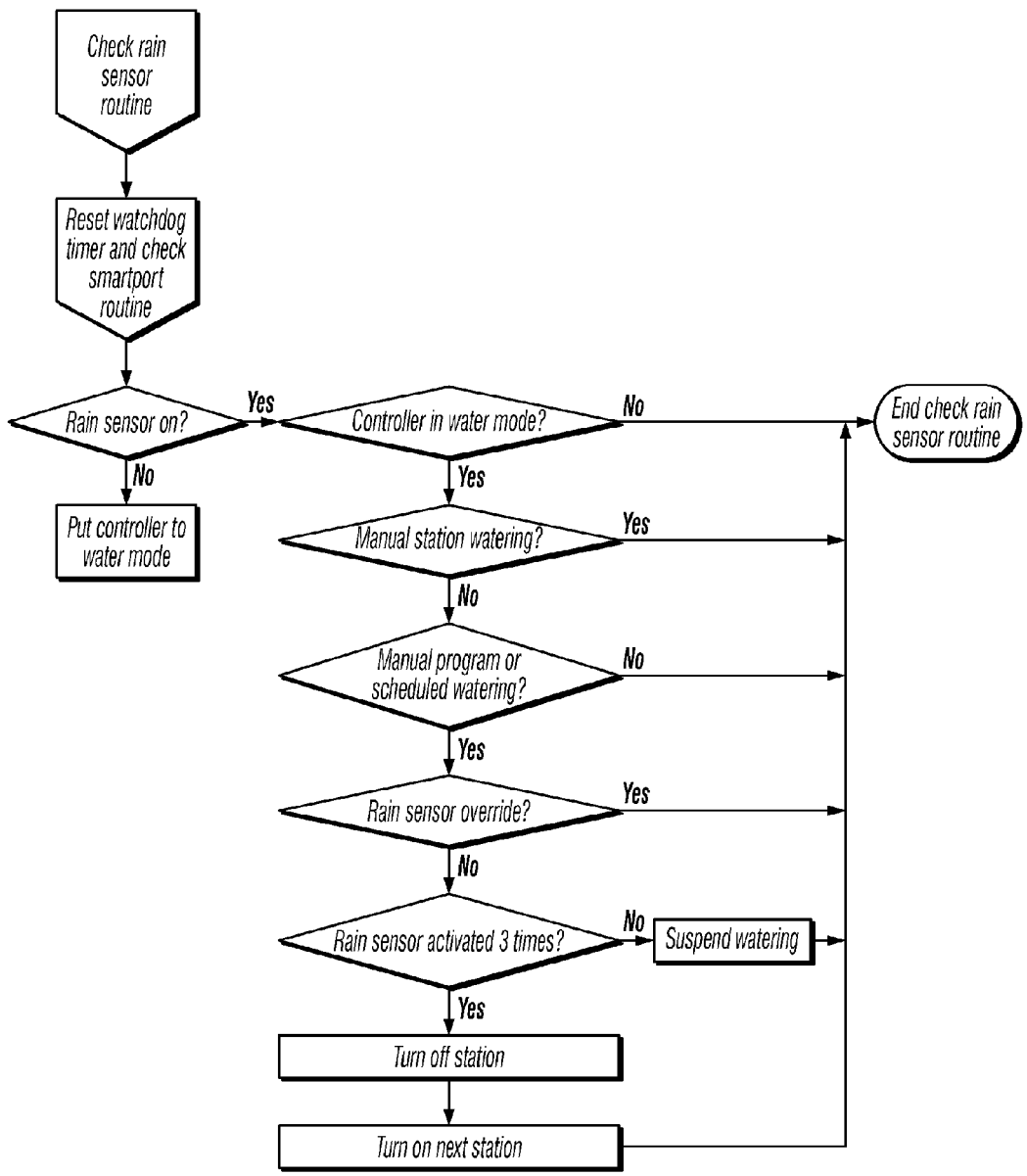
Figure 8K:
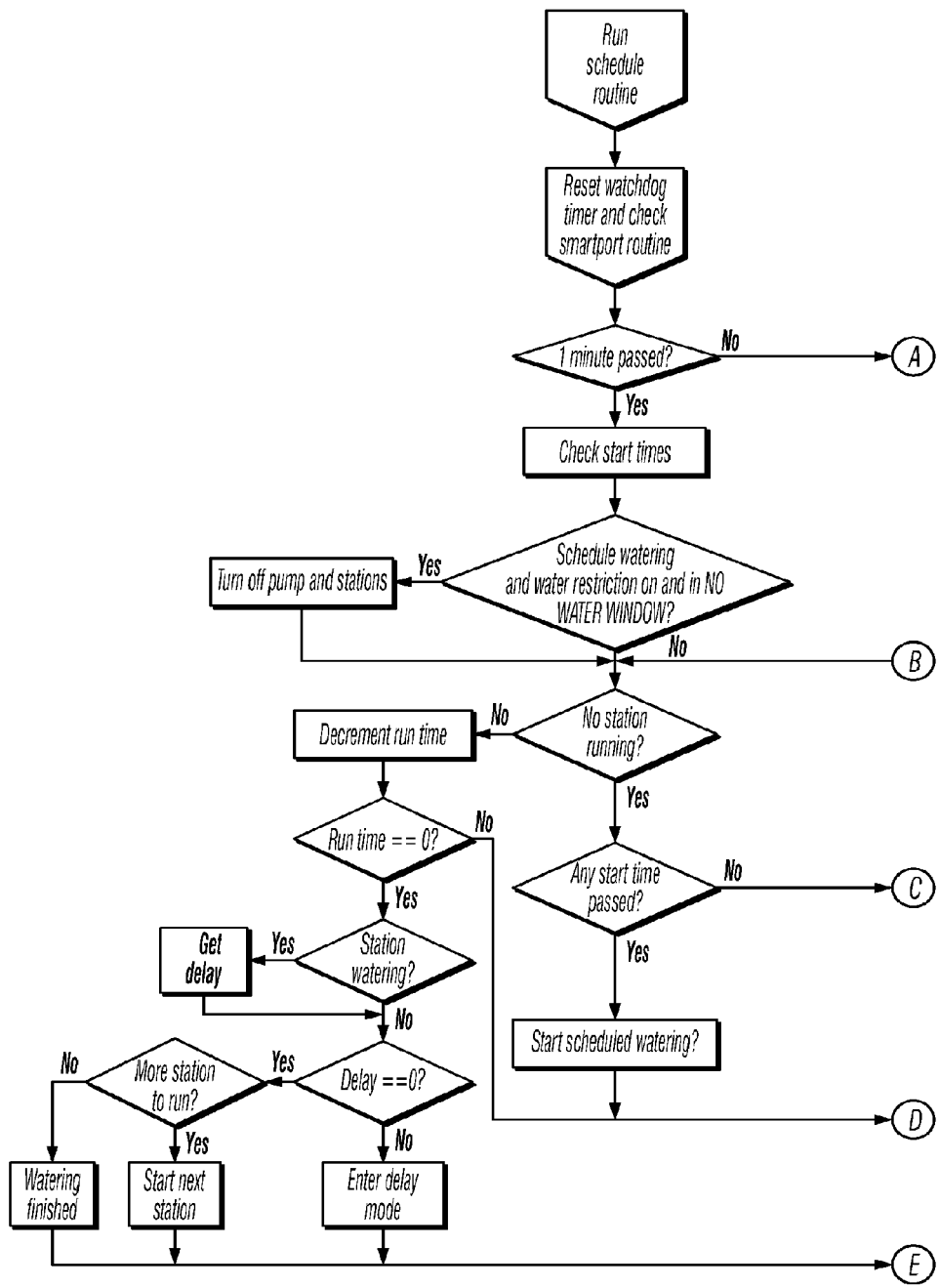
Figure 8K:
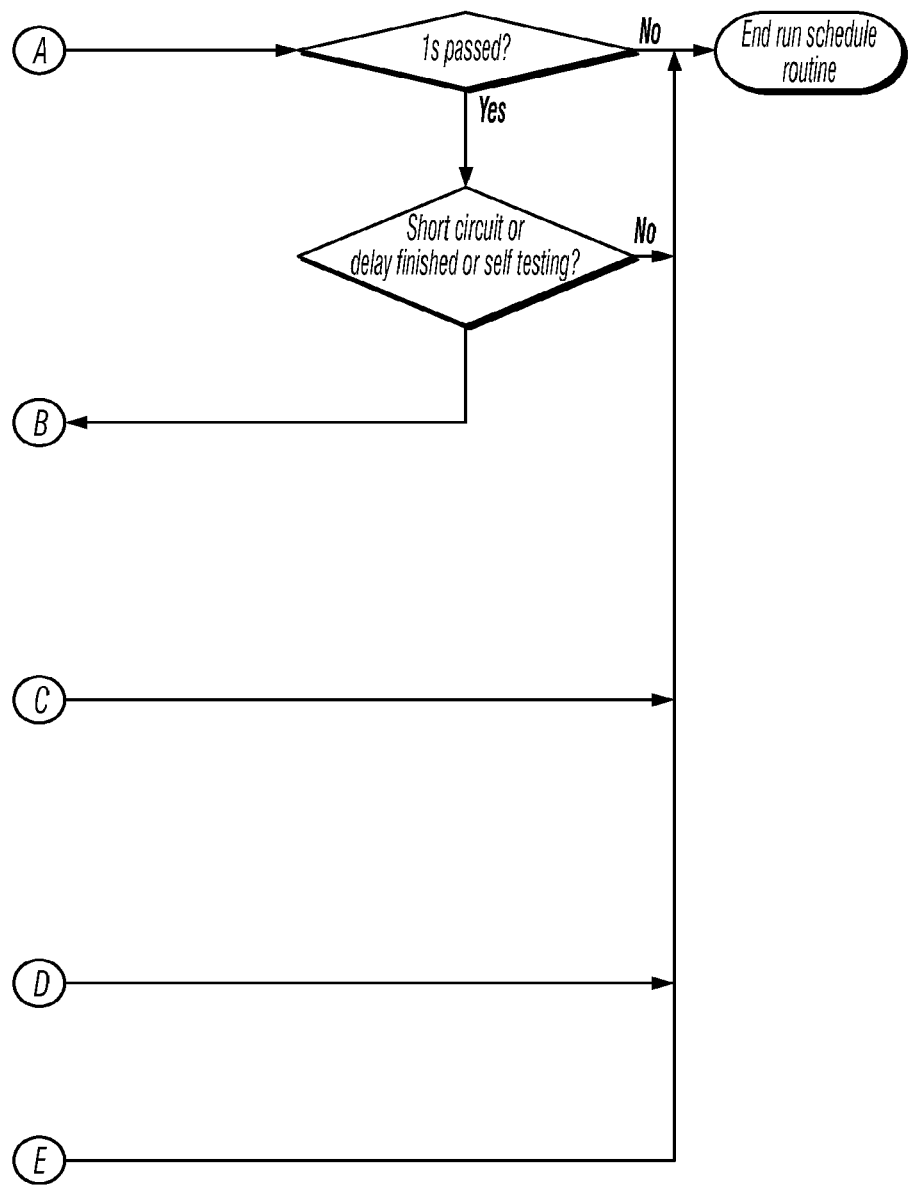
Figure 8L:
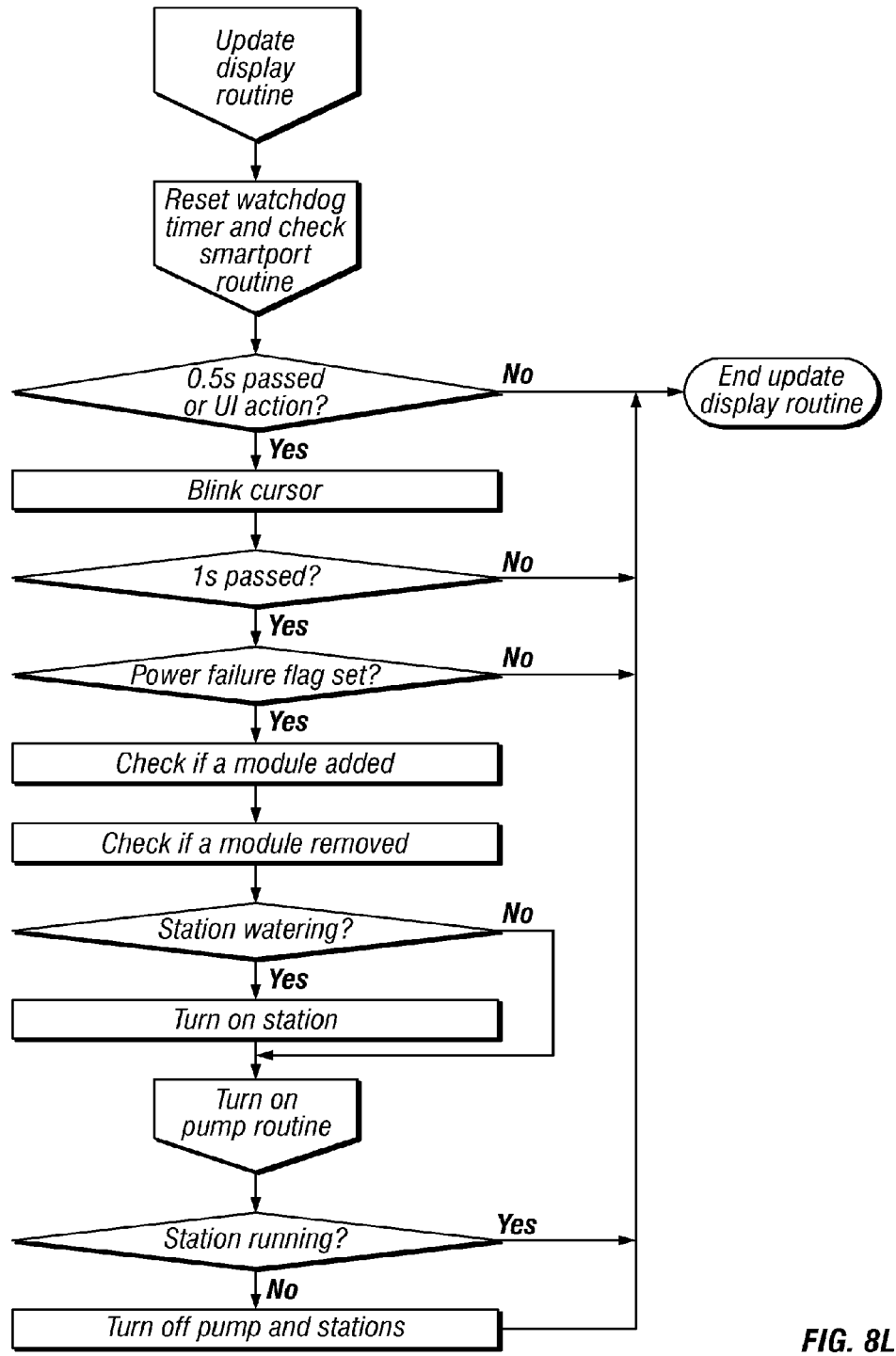
Figure 8M:
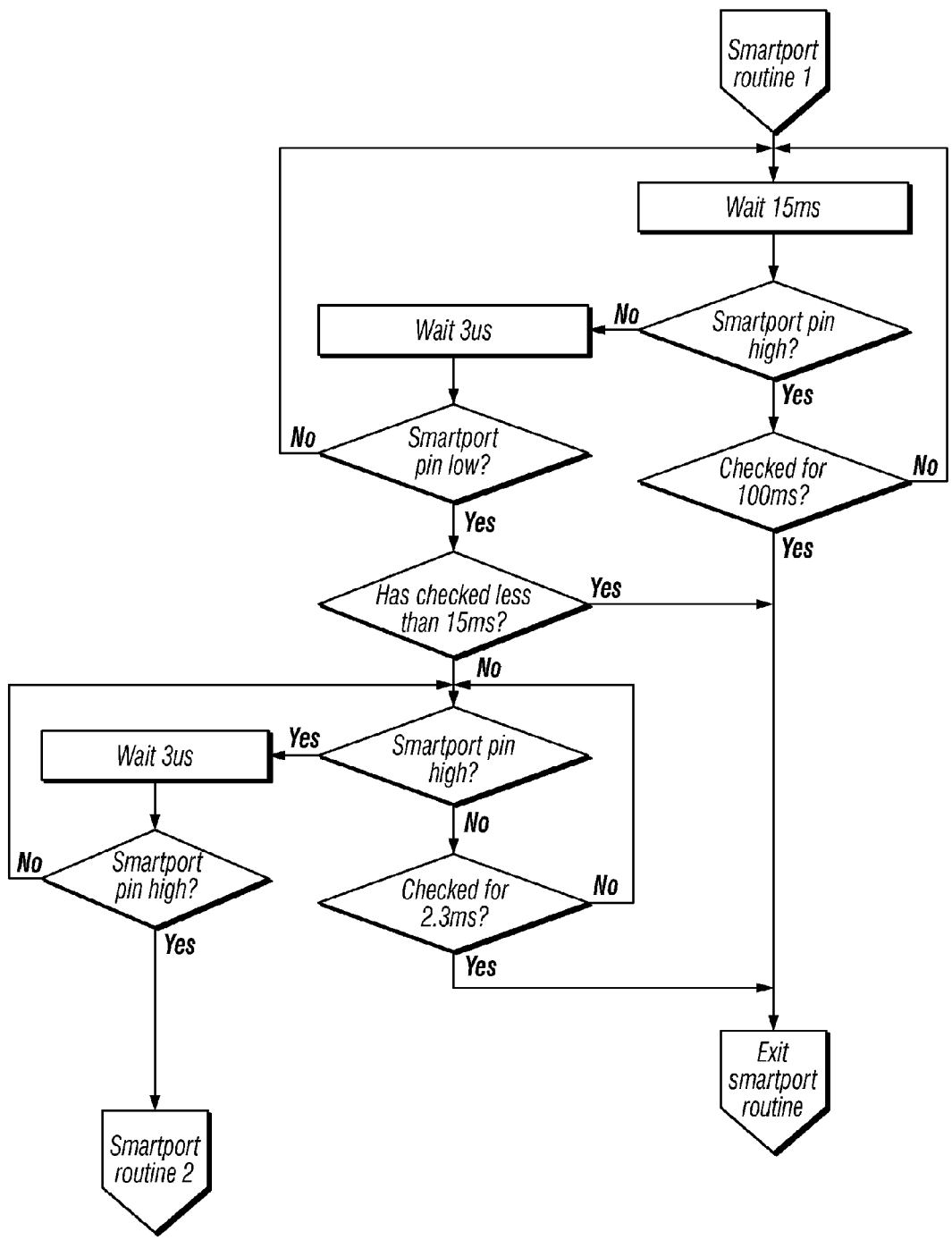
Figure 8N:
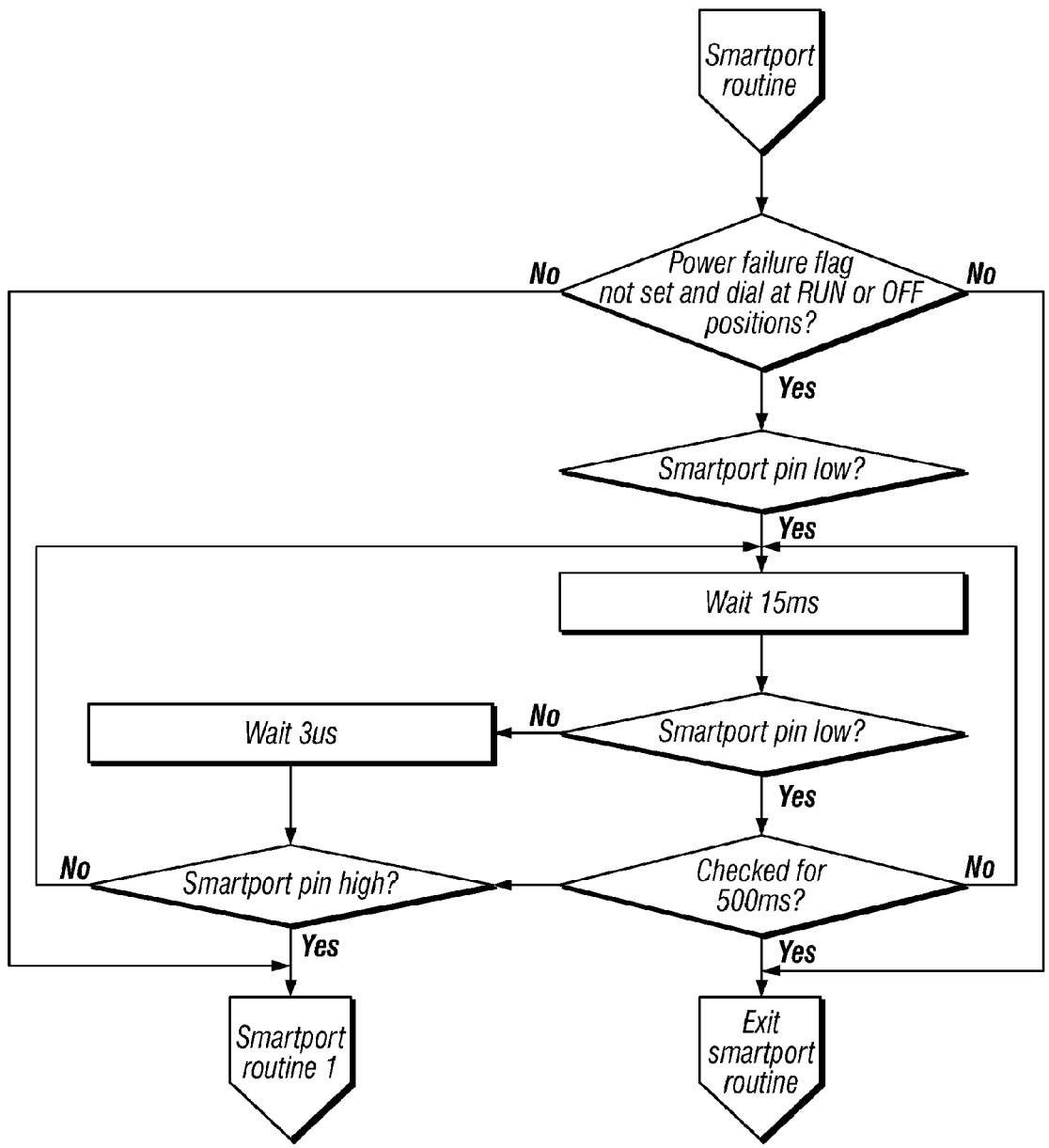
Figure 80:
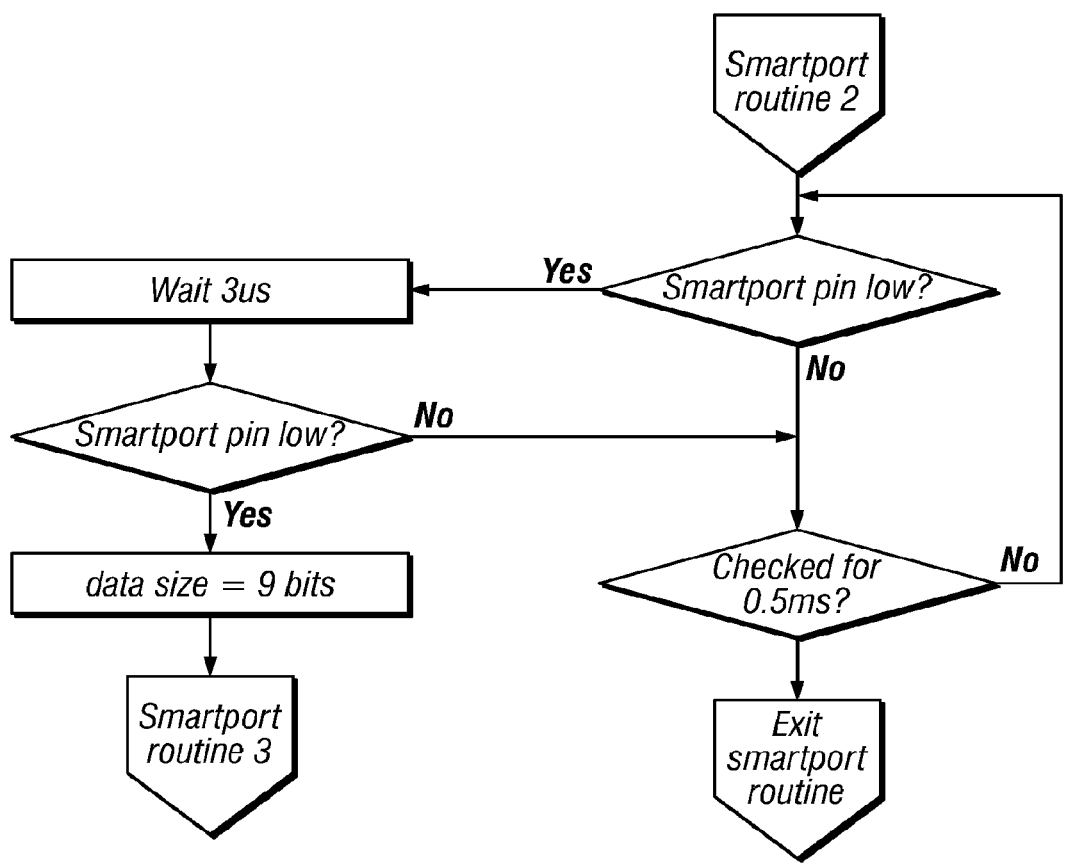
Figure 8P:
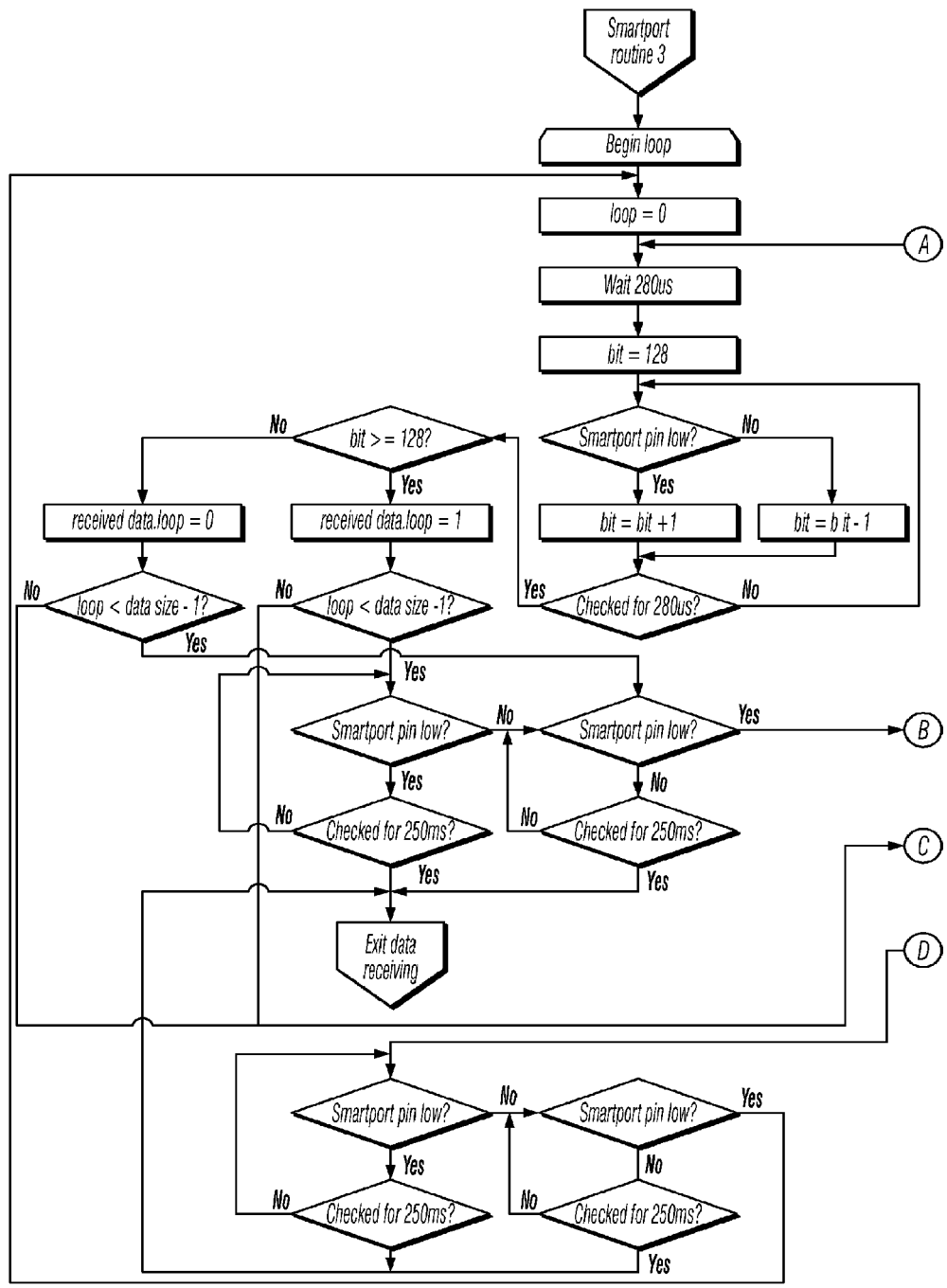
Figure 8P:
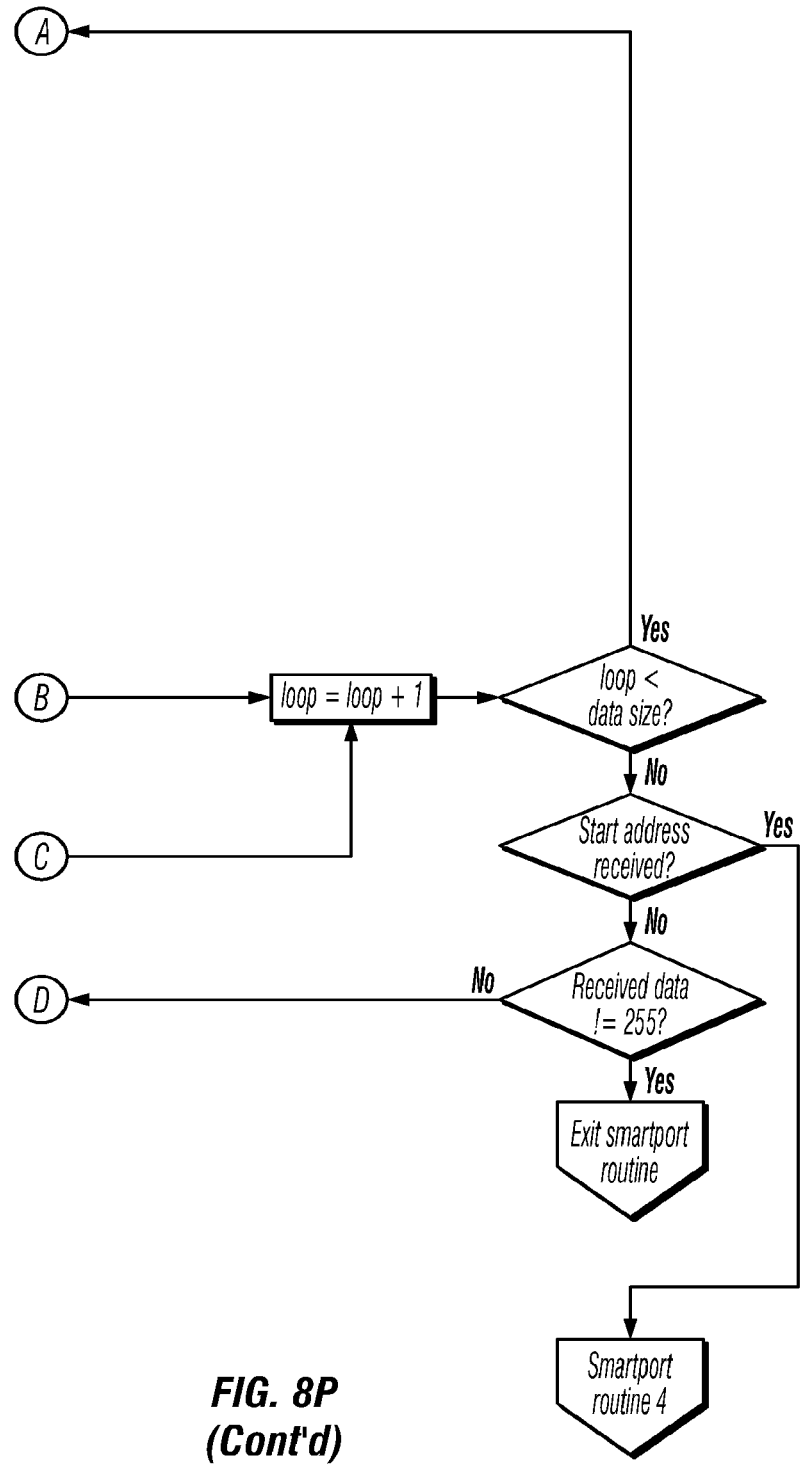
Figure 8Q:
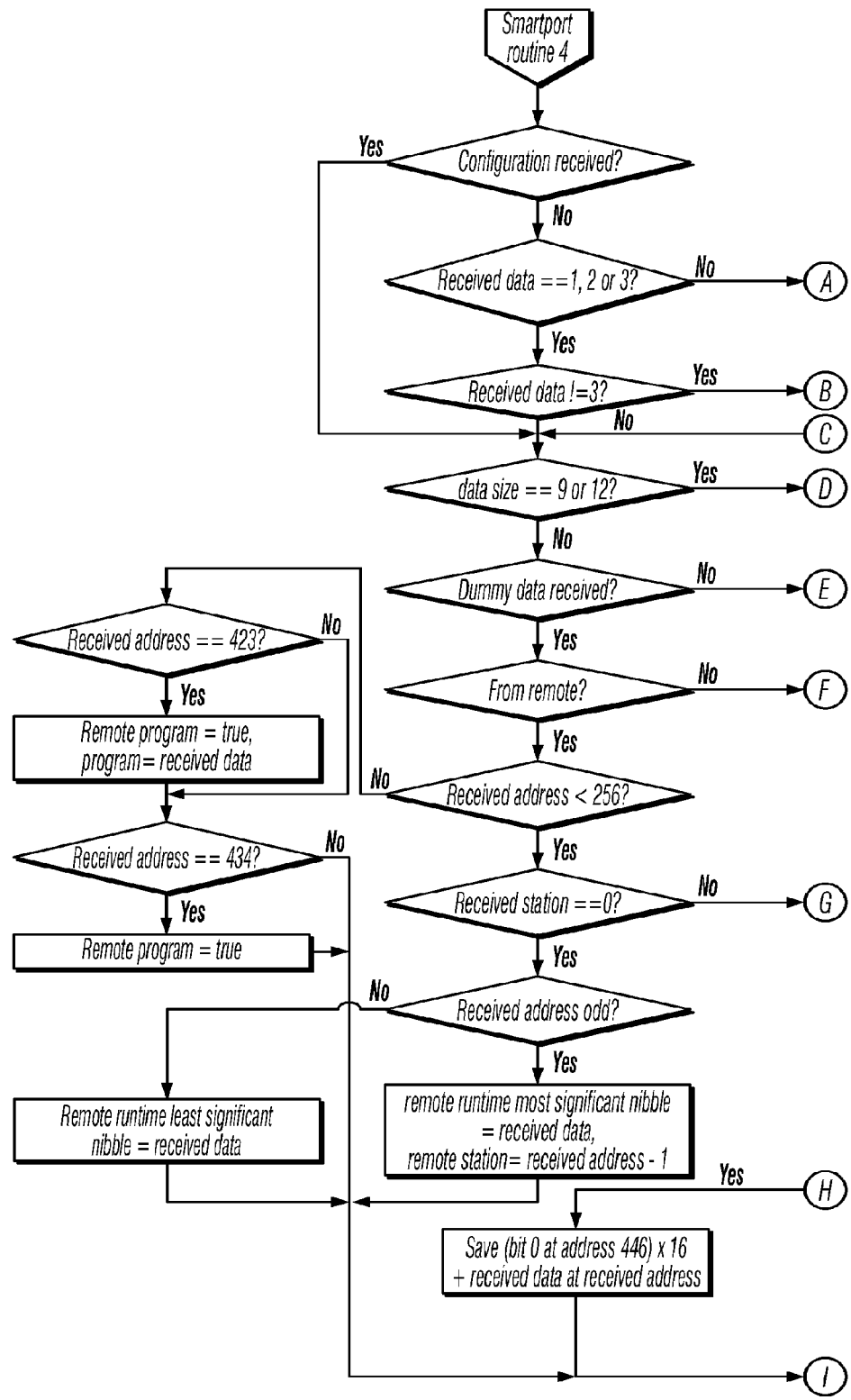
Figure 8Q:
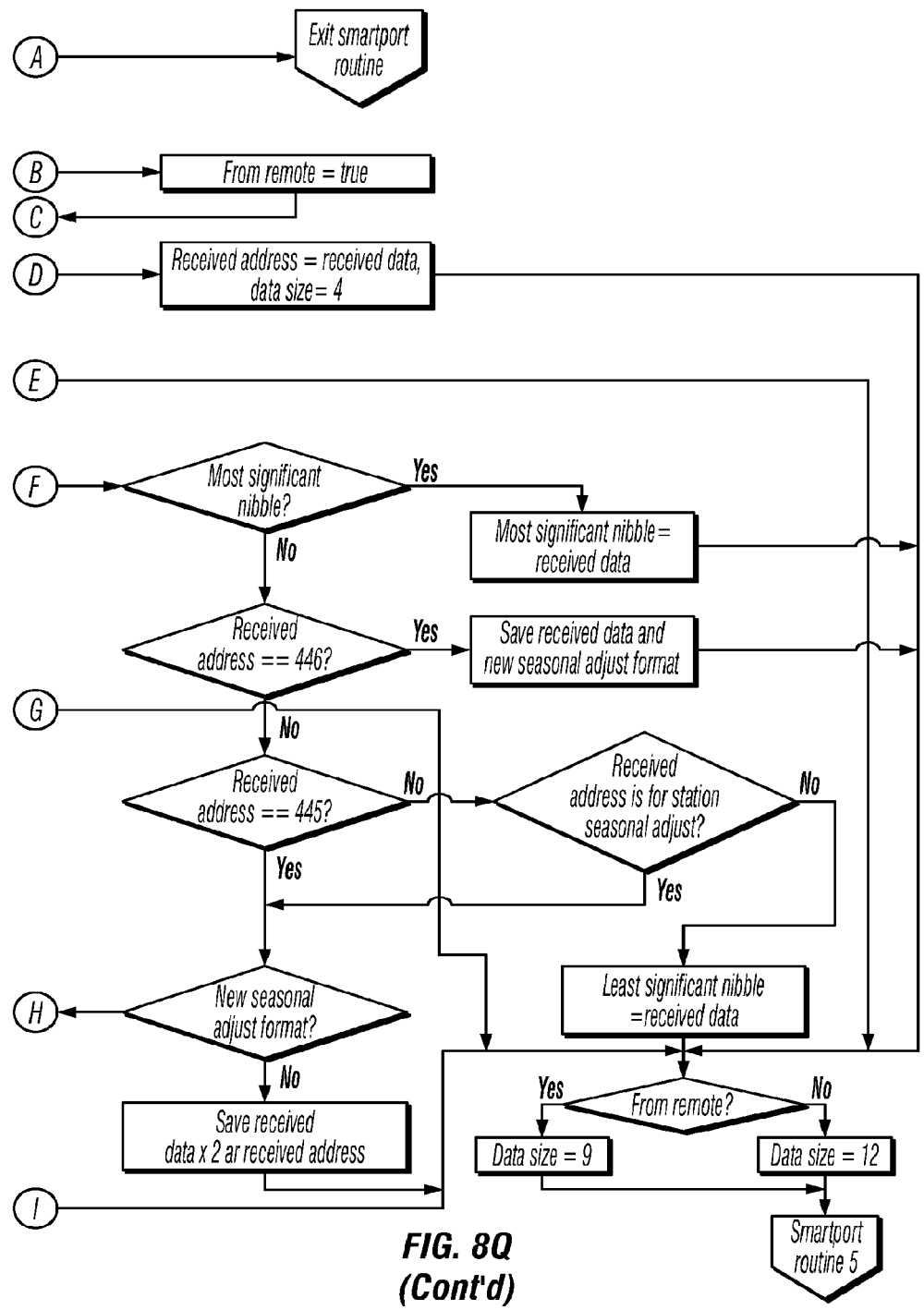
Figure 8R:
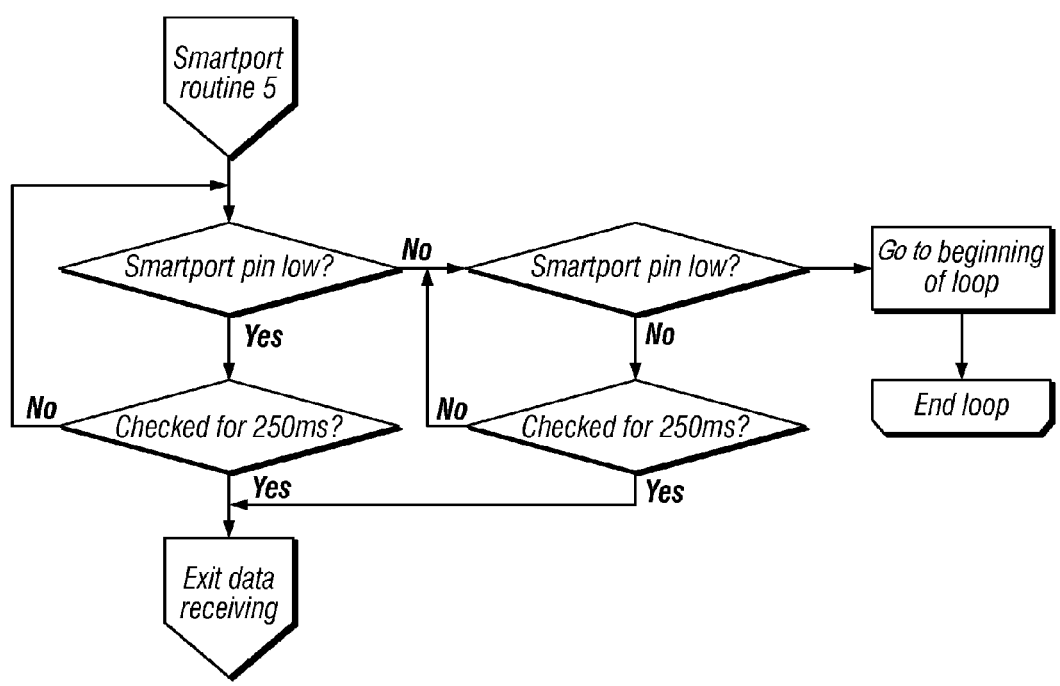
Figure 8S:
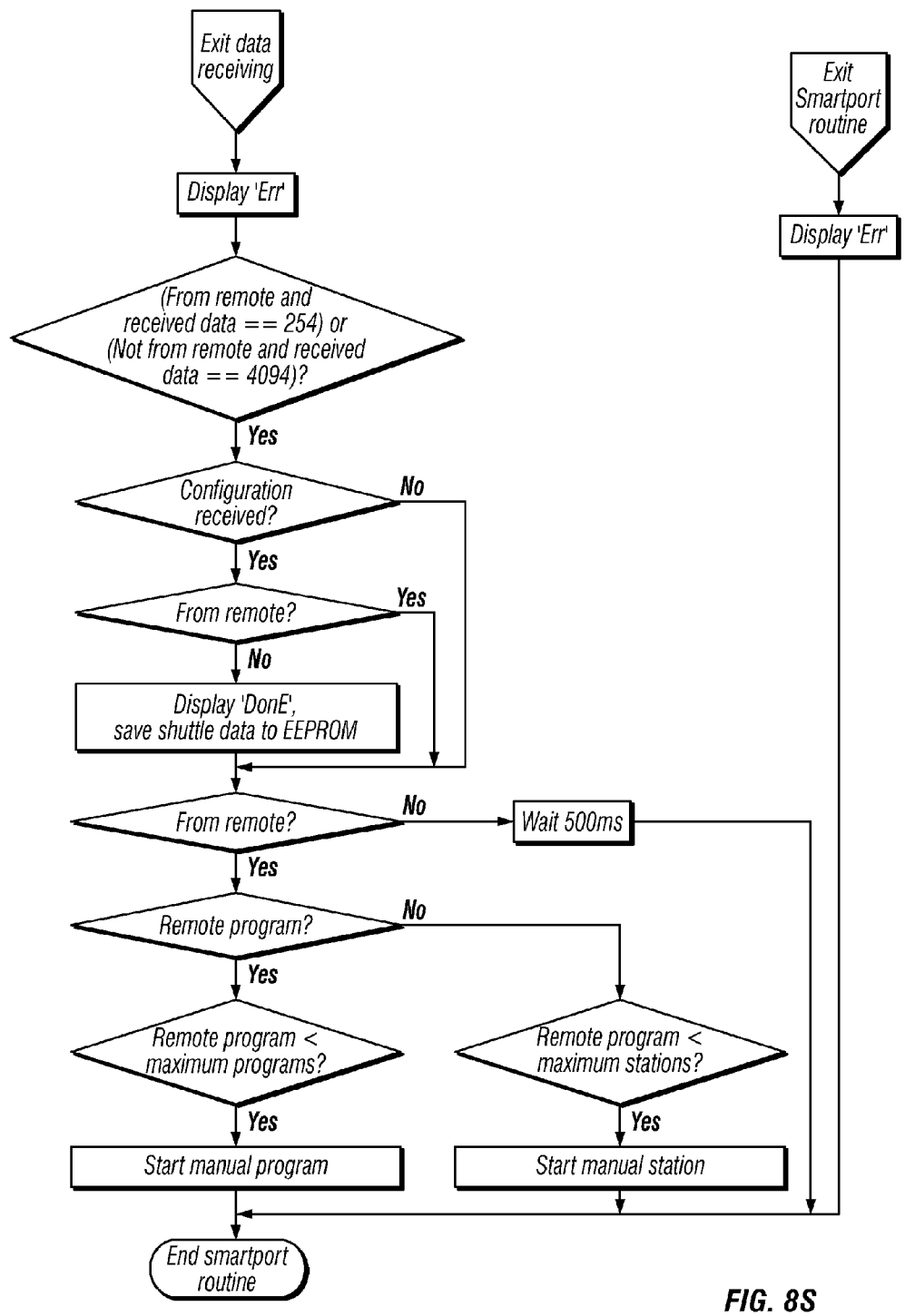
Figure 8T:
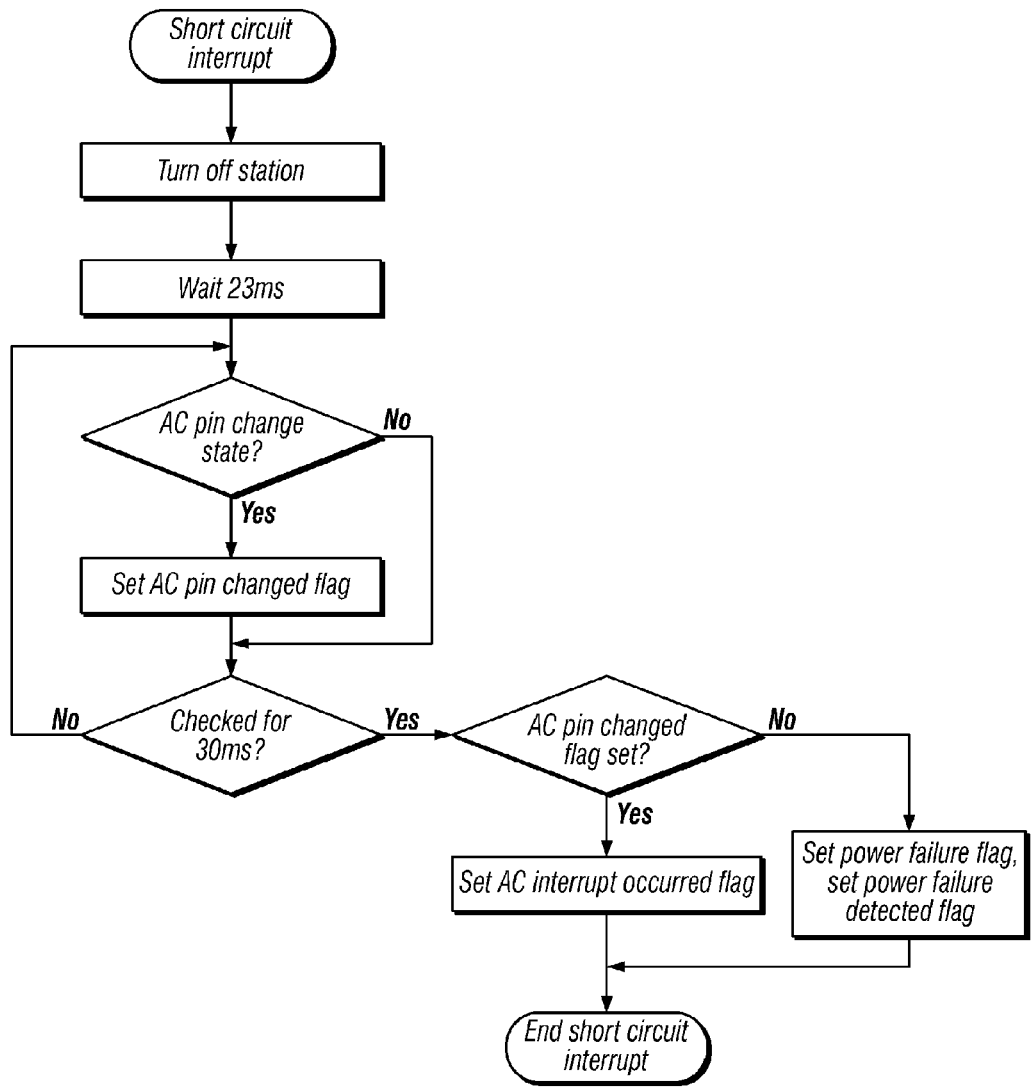
Figure 8U:
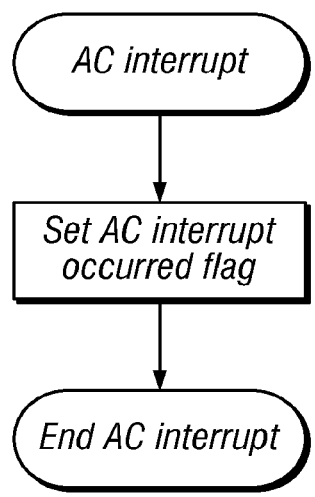
Figure 8V:
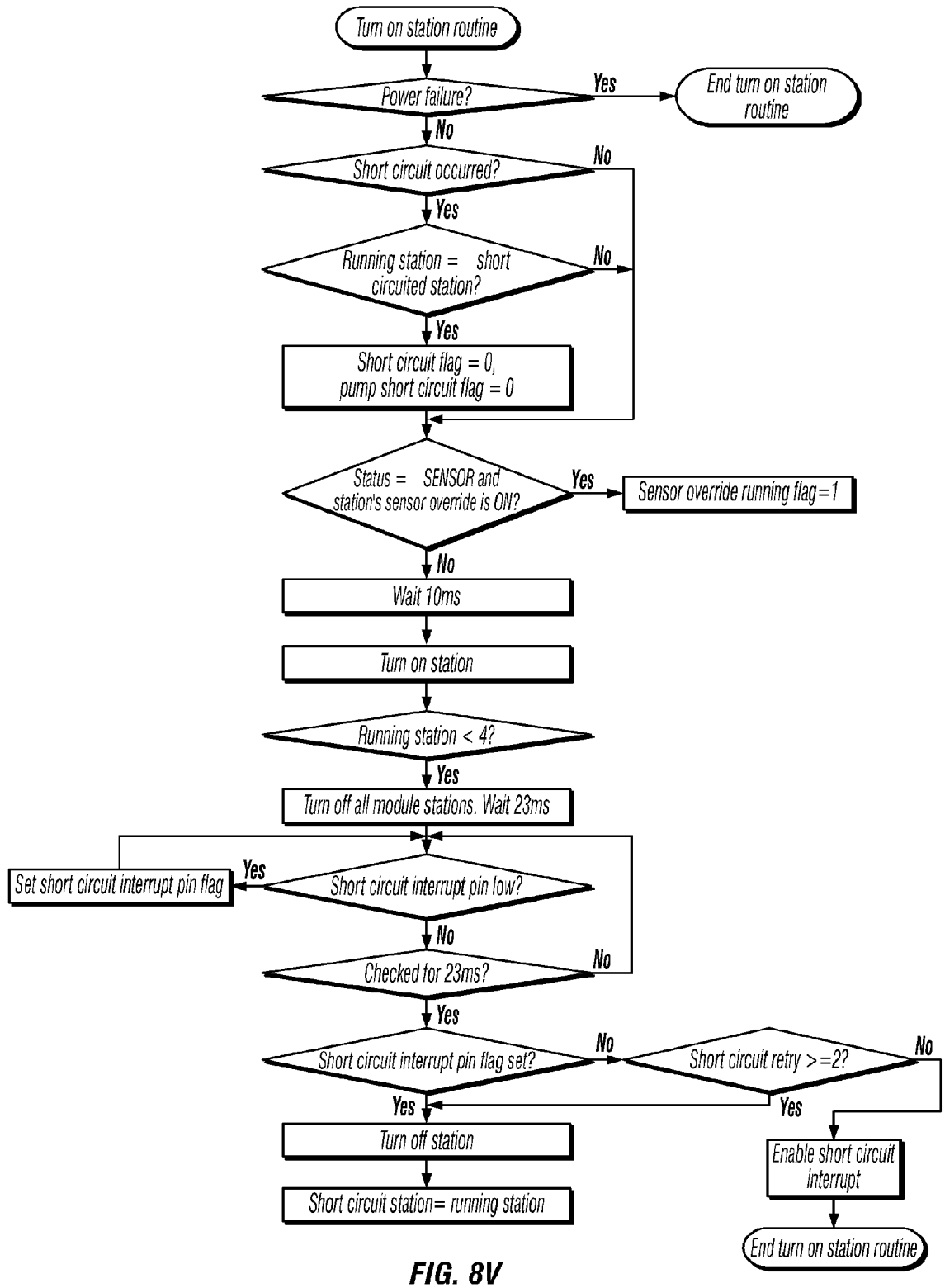
Figure 8W:
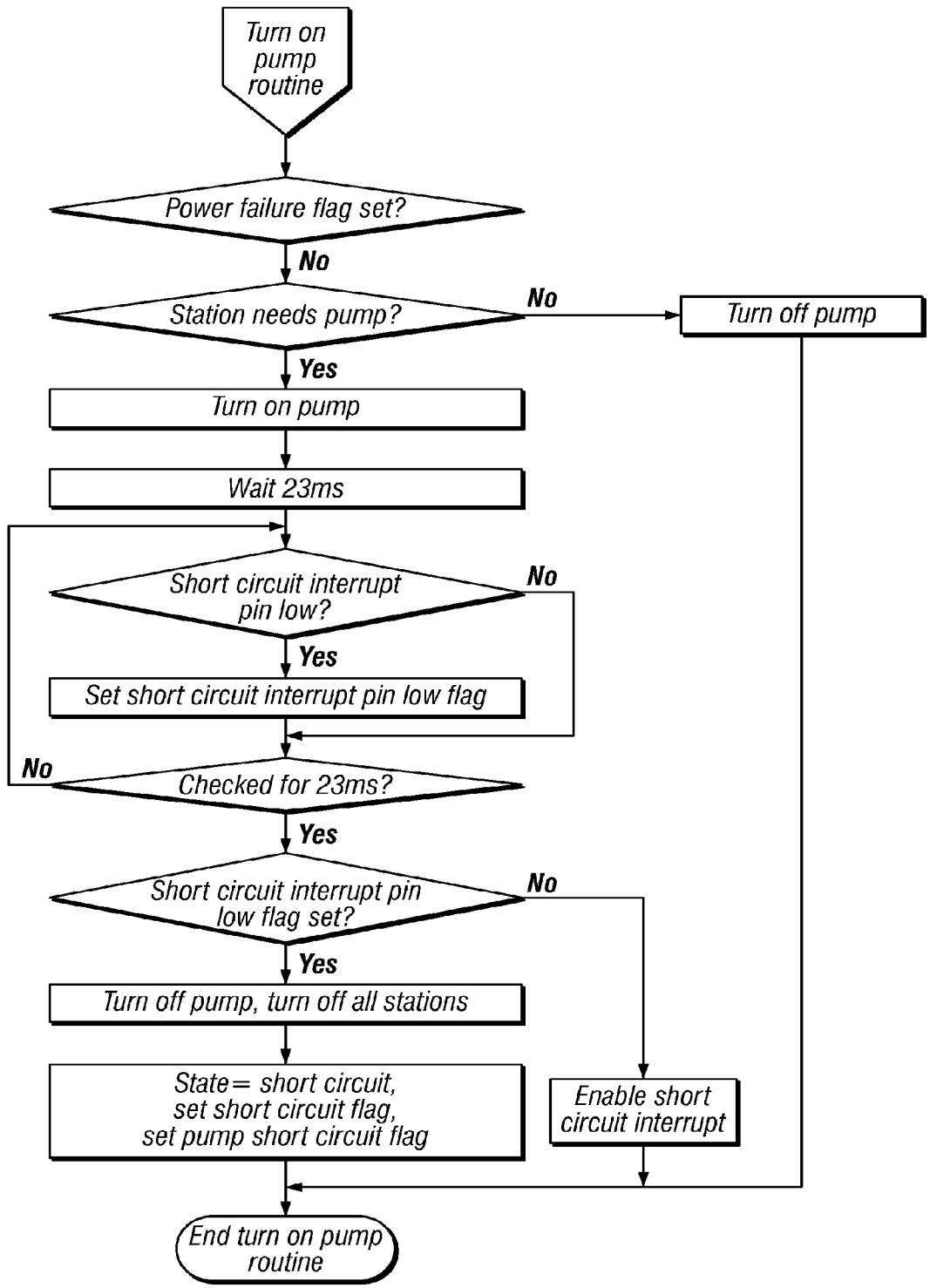
Figure 9:
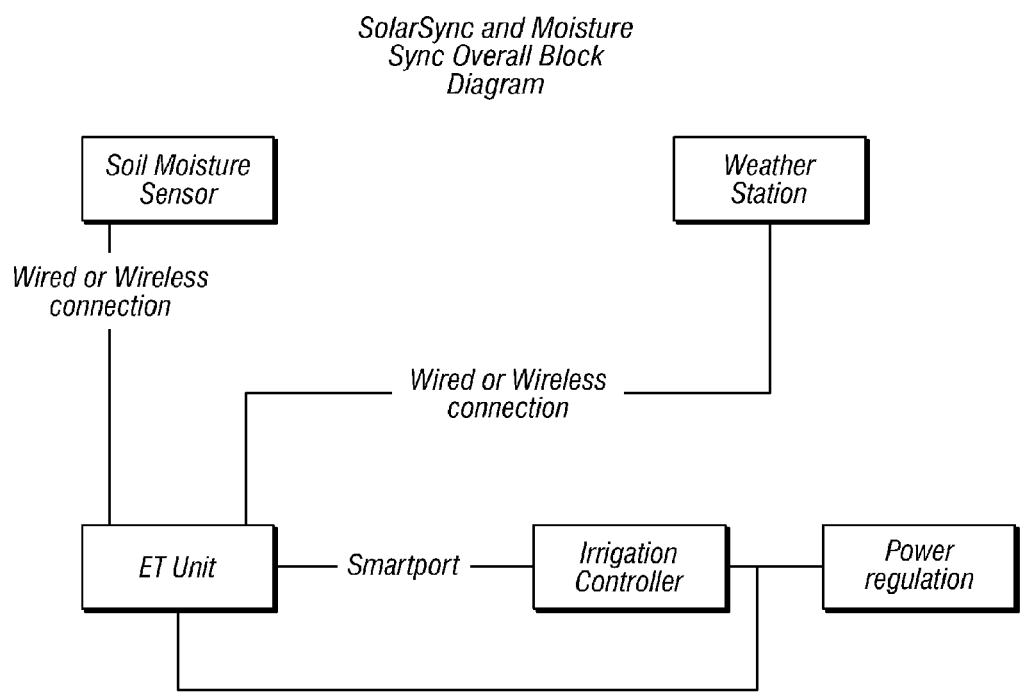
FIG. 9 is a block diagram illustrating the electronic portion of the ET unit and sensors of FIG. 1.

FIGS. 8A-8W are detailed flow diagrams illustrating the operation of the stand alone irrigation controller 12 of FIG. 2. Those skilled in the art of designing and programming irrigation controllers for residential and commercial applications will readily understand the logical flow and algorithms that permit the processor 40 to execute the watering program stored in the memory 42. This watering program enables the processor 40 to generate commands for selectively turning the plurality of valves ON and OFF in accordance with the selected or entered watering schedules. The watering program includes a seasonal adjustment feature that provides the capability for automatically modifying the watering schedules to thereby conserve water while maintaining plant health. By actuating one of the push buttons 32*c* or 32*d* the user can increase or decrease the run types for all stations by a selected scaling factor, such as ten percent, to account for seasonal variations in temperature and rainfall.

Figure 10:
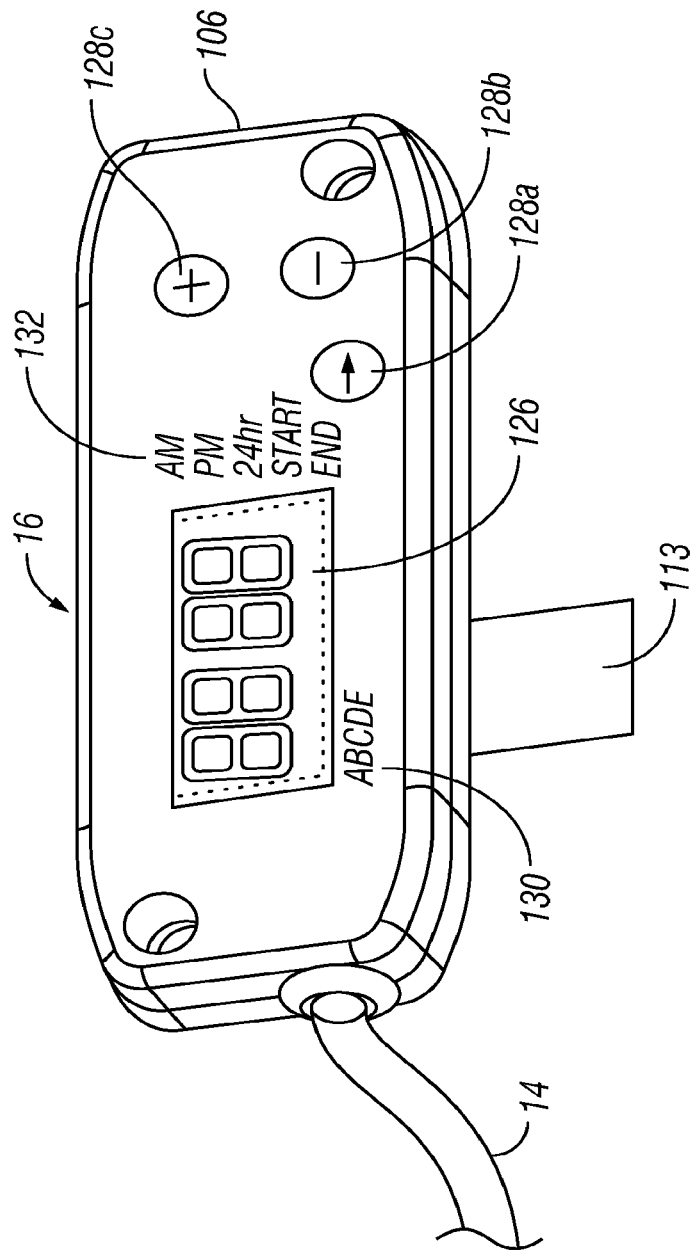
FIG. 10 is a perspective view of the stand alone ET unit of the system of FIG. 9.
Figure 11:
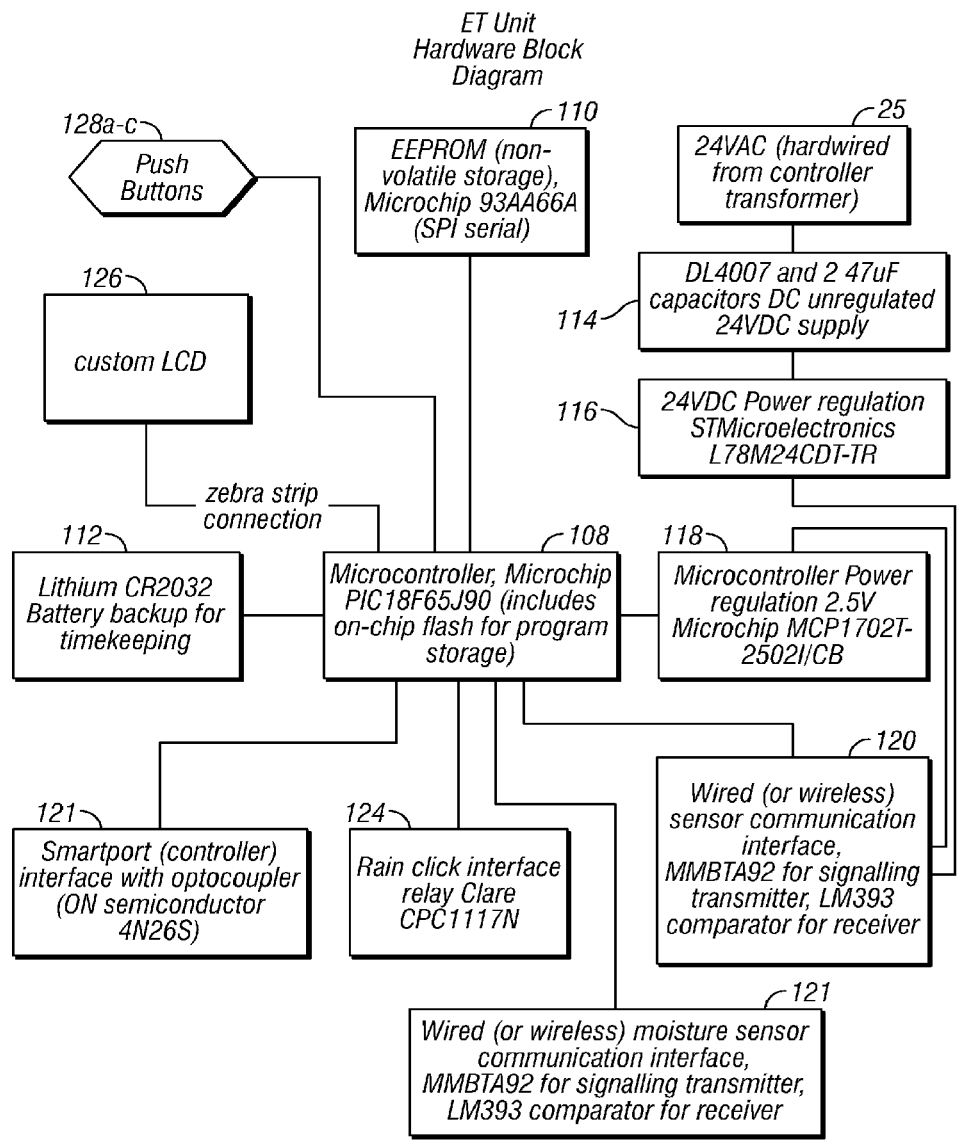
FIG. 11 is a block diagram illustrating the electronic portion of the stand alone ET unit of FIG. 10.
Figure 12A:
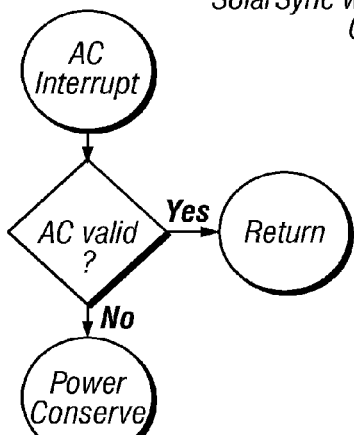
FIGS. 12A-12E are flow diagrams illustrating the operation of the stand alone ET unit of FIG. 9.
Figure 12B:
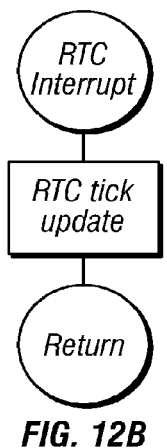
Figure 12C:
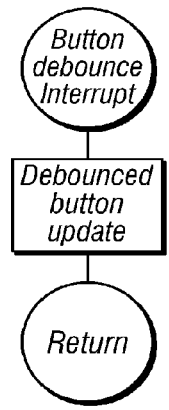
Figure 12D:
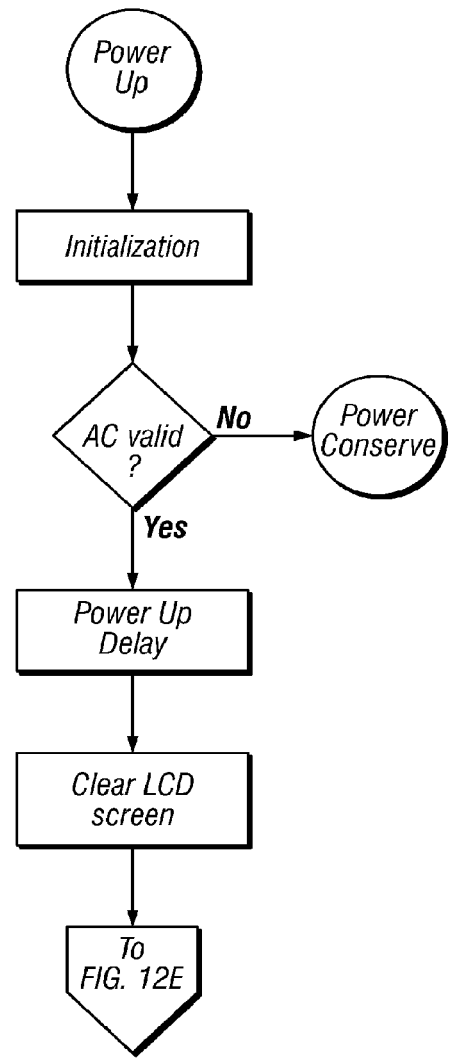
Figure 12E:
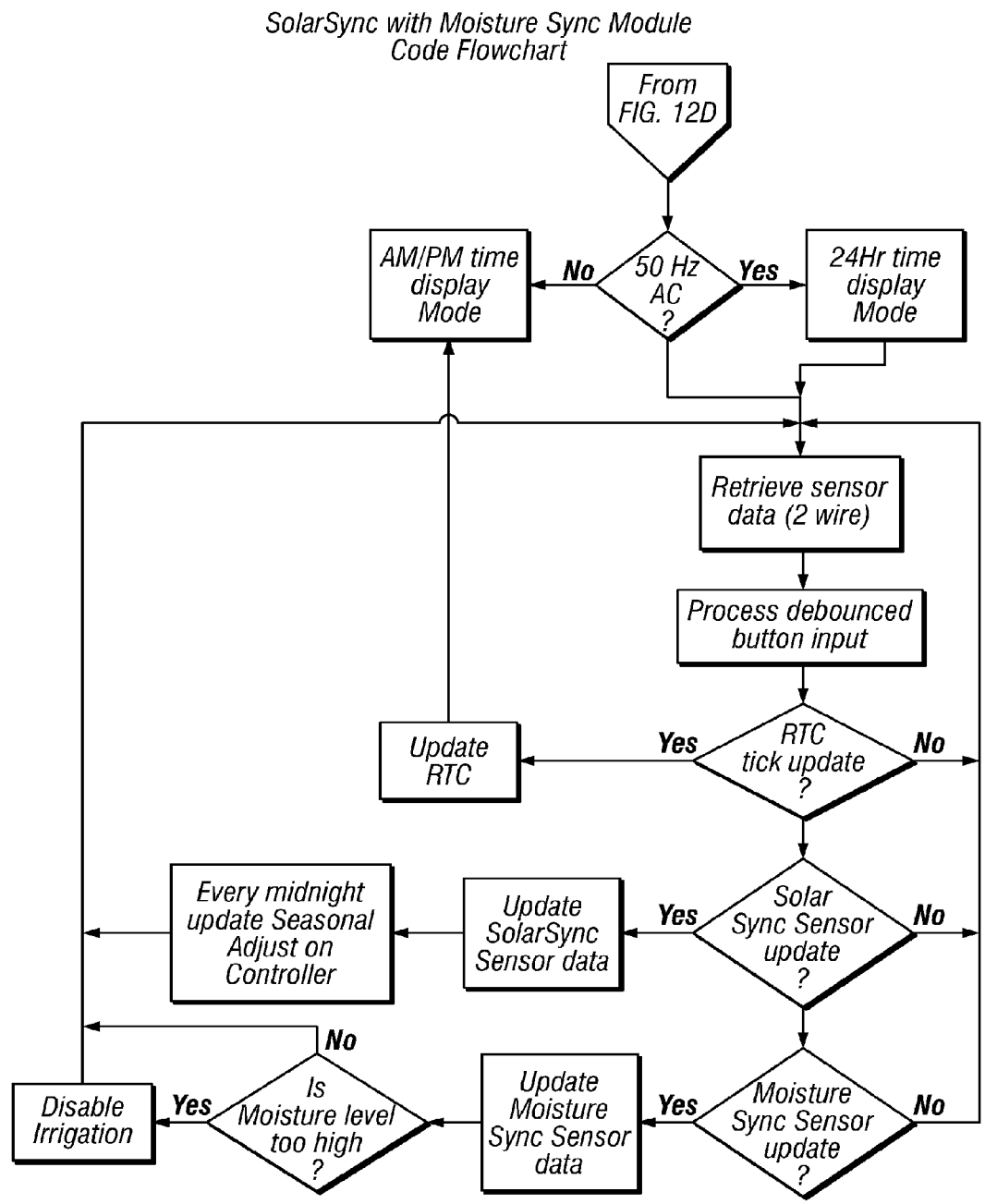

Referring to FIG. 10, the stand alone ET unit 16 includes a rectangular outer plastic housing 106 enclosing a printed circuit board (not illustrated) which supports the electronic circuit of the ET unit 16 that is illustrated in the block diagram of FIG. 11. A microcontroller 108 such as a Microchip PIC 18F65J90 processor executes firmware programming stored internally in the microcontroller 108 and can access external memory 110 such as an industry standard 93AA66A EEPROM memory. The microcontroller 108 can receive DC power from a lithium battery 112 such as an industry standard CR2032 battery, which allows accurate time keeping in the event of a power failure. Insulating strip 113 (FIG. 10) must be manually pulled out to establish an operative connection of the battery 112. External power for the ET unit 16 is supplied from the transformer 25 (FIG. 1) via the cable 14. The twenty-four volt AC power from the transformer 25 is supplied to a rectifier/filter circuit 114 (FIG. 11) which supplies twenty-four volt DC power to a power regulation circuit 116 which may be an ST Microelectronics L78M24CDT-TR regulator. Power from the power regulation circuit 116 is fed to a microcontroller power regulator 118 which may be a Microchip MCP 1702T-25021/CB regulator. Power from the power regulation circuit 116 is also fed to a wired or wireless sensor communications device 120 that may include, by way of example, an industry standard MMBTA92 for the signal transmitter and an industry standard LM393 comparator for the receiver. Power from the power regulation circuit 116 is also fed to a wired or wireless soil moisture sensor communications device 121 that may include, by way of example, an industry standard MMBTA92 for the signal transmitter and an industry standard LM393 comparator for the receiver.

The microcontroller 108 (FIG. 10) interfaces with the SmartPort (Trademark) connector of the irrigation controller 12 with a combination interface/optocoupler 122 which may be provided by an industry standard 4N26S device. The microcontroller 108 interfaces with the weather station illustrated in FIG. 13. An LCD display 126 is mounted in the housing 106. Three manually actuable controls in the form of push buttons 128*a-c* (FIG. 10) are mounted in the housing 106 for enabling the user to make selections when setting up and modifying the operation of the ET unit 16 in conjunction with information indicated on the display 126 which is facilitated by column and row indicia 130 and 132, respectively, affixed to the housing 106 adjacent the horizontal and vertical margins of the display 126. Row indicia 132 include, from top to bottom, AM, PM, 24 hr, START and END which are printed, painted, molded or otherwise applied to the outer plastic housing such as by a sticker. Column indicia 130 are illustrated diagrammatically as A-E in FIG. 10 due to space constraints in the drawing. A-E correspond, respectively, to TIME, TYPE, REGION, NO WATER and WATER+/− with associated icons which are printed, painted, molded or otherwise applied to the outer plastic housing 106 such as by a sticker.

FIGS. 12A-12E are flow diagrams illustrating the operation of the stand alone ET unit 16. A watering schedule typically includes inputted parameters such as start times, run times and days to water. The ET unit 16 can automatically set the seasonal adjustment of the irrigation controller 12 to reduce watering time, or increase watering times, depending on the weather conditions at the time. The ET unit 16 utilizes actual ET data as its basis for making the modifications to the watering schedules implemented by the irrigation controller 12. However, to simplify the system and reduce the costs, some of the ET parameters may be pre-programmed into the ET unit 16 as constants. These constants may be selected from a group of geographical areas to approximately assimilate the local conditions and estimate a maximum ET value. Other climatic factors are monitored on a daily basis and are the variables. The variables may include one or more pieces of environmental data such as temperature, humidity, solar radiation, wind, and rain. In the preferred embodiment of the present invention, the measured variables are temperature and solar radiation. The variables and any constants are used by the processor 108 to calculate an estimated ET value. This estimated ET value is then used by the ET unit 16 to automatically set the seasonal adjustment feature of the irrigation controller 12. The weather station 20 can also include a sensor that indicates a rain event. A rain event does not affect calculation of an estimated ET value. However, it does shut of the irrigation during, and for a period of time following, the rain event as a further conservation measure.

The user can modify the run and cycle times for individual stations in the usual manner in the irrigation controller 12. As an example, if one station is watering too much, but all of the other stations are watering the correct amount, the user can easily reduce the run time of that particular station and balance the system out. Then the ET unit 16 continues modifying the watering schedules executed by the irrigation controller 12 on a global basis as a percentage of run time, based on the calculated estimated ET value. Irrigation controllers can be used to control landscape lighting and other non-irrigation devices such as decorative water fountains. The controller 12 may have features in it such that the ET unit 16 only modifies the watering schedules of the irrigation controller 12.

One of the difficulties with conventional weather-based controllers is attributable to the difficulty of fine-tuning the weather data being received. The environmental sensors may not always be able to be placed in an optimum location on the irrigation site. As an example, a solar radiation sensor may be placed in an area that receives late afternoon shade. This will result in the calculation of an abnormally low estimated ET value. The entire irrigation site may receive too little water and the plant material may become stressed from too little water if the watering schedules are based on an abnormally low estimated ET. If a conventional ET based irrigation controller receives input from such an incorrectly located solar radiation sensor, the user can attempt to compensate by increasing the run times for each zone by modifying precipitation rates to compensate for the error. This is cumbersome and makes it difficult and frustrating for the user to adjust a conventional ET based irrigation controller for optimum watering.

An advantage of the present invention is the ability to globally modify the watering schedules of the stand alone irrigation controller 12 to compensate for this type of condition. If at any time the user realizes that the property is receiving too little water, the user can simply manually change an overall watering adjustment feature. The overall watering adjustment feature is implemented as a simple plus or minus control via actuation of an assigned pair of the push buttons 128a-c. This changes the reference point of the ET calculation either up or down. After this adjustment is made, the ET adjustment executed by the ET unit 16 references the new setting and then compensates for under watering that would otherwise occur. Likewise, if the overall watering is too much for the irrigation site, the user can simply adjust the overall watering adjustment feature down and create a new lower reference for the automatic ET based adjustments. The overall watering adjustment feature makes it easy for the user to fine-tune the system to the particular requirements of the irrigation site. The overall watering adjustment feature can be indicated by showing "global adjustment," or "more/less, water+/−," or similar naming conventions.

The overall watering adjustment feature of the ET unit 16 directly alters the station run times executed by the irrigation controller 12. This adjustment modifies the estimated maximum expected ET setting, which is a constant that is used in the calculating the seasonal adjust value. When the user makes overall watering adjustments by pressing plus or minus push buttons on the ET unit 16, this directly affects the ET value that is used to reset the seasonal adjustment in the host controller 12. In calculating the estimated ET, the microcontroller 108 in the ET unit 16 uses only select data points as variables (temperature and solar radiation) and uses other data points that may consist of pre-programmed constants, and/or data entered by the user that defines some one or more constants of the site. Estimated ET is calculated using the Penman-Monteith formula, taking into account geographical data for peak estimated summer ET.

Another feature provided by the ET 16 is an automatic shutdown feature for irrigation that overrides any scheduled run times. There are several times when this is important. A rain sensor in the weather station 20 can send signals to the ET unit representing the occurrence of a rain event. The ET unit 10 will then signal the irrigation controller 12 to shut down and suspend any watering, regardless of any scheduled irrigation running or not running at the time. As another example, during a freeze or near freeze condition, irrigation may produce ice that can be dangerous to people walking or vehicles diving by. Many cities therefore require that irrigation be automatically turned off in the event of a freeze condition. A temperature sensor in the weather station 20 can detect a freeze or near freeze condition and the ET unit 16 will signal the irrigation controller 12 to shut down, regardless of any scheduled irrigation running or not running at the time. As another example, if the user entered irrigation or scheduled irrigation puts too much water down for a selected root zone, this can create a hazardous condition due to water runoff and is also wasteful of water. A soil moisture sensor attached to the ET unit 10 can detect soil moisture levels and send signals to the ET unit representing the level of moisture 30 present in the soil. The ET unit 10 will then determine from these soil moisture levels and user preset limits to selectively inhibit, shut down and/or suspend any watering to prevent an overwatering condition. If the irrigation site experiences very heavy rainfall, and particularly if such rainfall persists for several days, the soil becomes saturated. However a hygroscopic rain sensor will dry out in two or three days, and the irrigation controller will resume executing its pre-programmed watering schedule. Often times the soil is still sufficiently most to support healthy plant growth and additional watering is not needed at this time. The use of a soil moisture sensor to inhibit watering under such circumstances is very advantageous in terms of conserving water.

The automatic shutdown feature of the ET unit 10 is also useful in geographic areas where watering agencies and municipalities impose restrictions that limit the times when irrigation can occur. The user is able to enter a no-water window into the ET unit 16, which consists of the times when irrigation is not allowed to take place. When a no-water window is entered by the user, the ET unit 16 will signal the irrigation controller 12 to shut down, regardless of any scheduled irrigation running or not running at the time. The ET unit 16 will then allow the irrigation controller 12 to return to its normal run mode after the selected no-water window time has elapsed. The irrigation controller 12 may have sensor input terminals, as in the case of the Pro-C irrigation controller, which can be used to shut down all watering on receipt of a shutdown command from the ET unit 16.

Figure 13A:
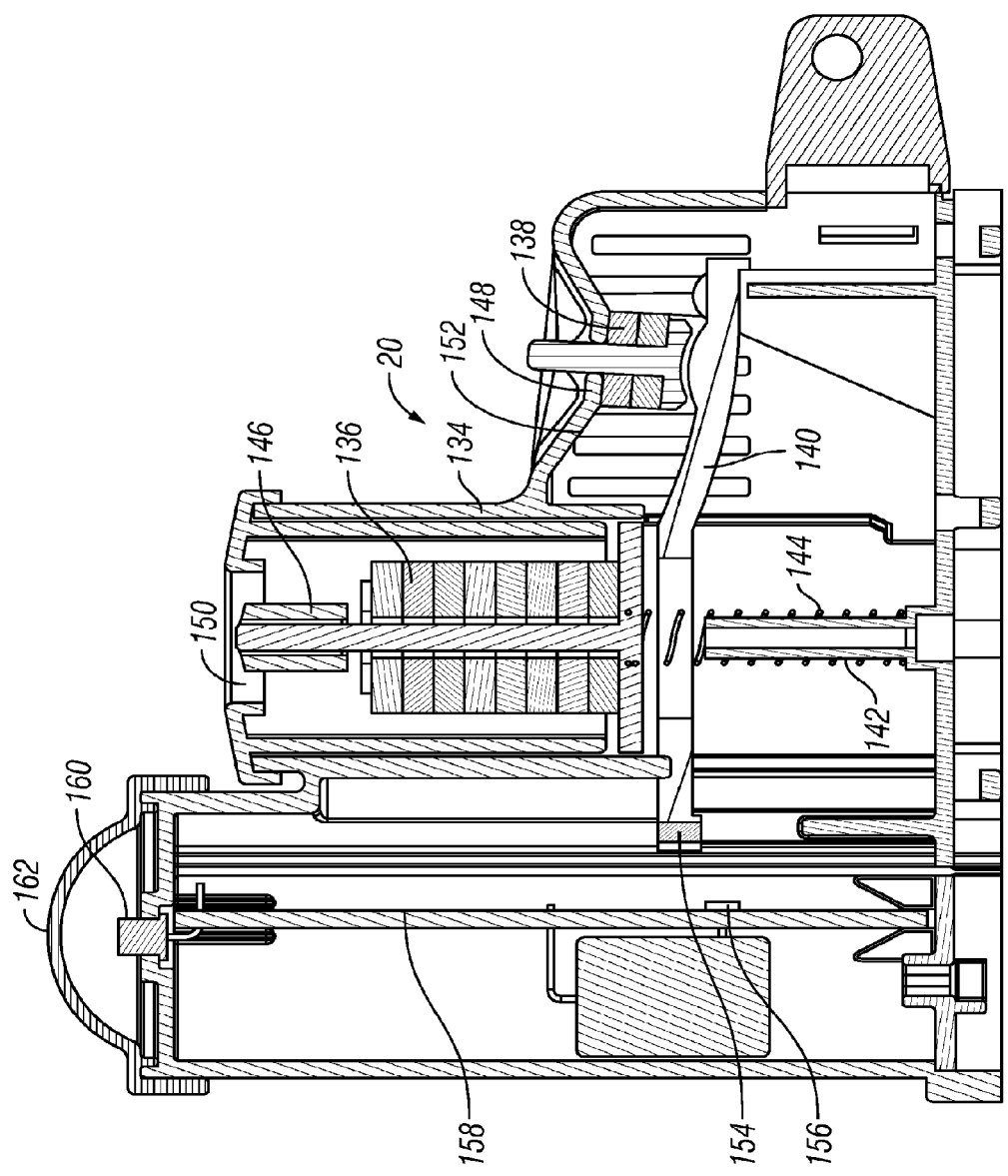
FIG. 13A is an enlarged vertical cross-section of the stand alone weather station of the system of FIG. 1.

FIG. 13A is an enlarged vertical cross-section of an embodiment of the stand alone weather station 20 of the system of FIG. 1. The compact and inexpensive weather station 20 measures solar radiation, ambient air temperature, and detects a rain event. The weather station is a one-piece unit that readily attaches to an exterior side of a building structure, a fence, or a rain gutter. The weather station 20 can be hard wired to the ET unit 16 via cable 18, or the communications between the weather station 20 and the ET unit 16 may take place via wireless communications link 24. The basic construction of the weather station 20 is similar to that disclosed in U.S. Pat. No. 6,570,109 granted May 27, 2003 to Paul A. Klinefelter et al. entitled QUICK SHUT-OFF EXTENDED RANGE HYDROSCOPIC RAIN SENSOR FOR IRRIGATION SYSTEMS, and U.S. Pat. No. 6,977,351 granted Dec. 20, 2005 to Peter J. Woytowitz entitled MOISTURE ABSORPTIVE RAIN SENSOR WITH SEALED POSITION SENSING ELEMENT FOR IRRIGATION WATERING PROGRAM INTERRUPT, the entire disclosures of both of which are incorporated herein by reference. Both of the aforementioned U.S. patents are assigned to Hunter Industries, Inc.

The weather station 20 (FIG. 13A) includes an outer injection molded plastic housing 134 that encloses a pair of moisture absorbing members in the form of a larger stack 136 of moisture absorbing hygroscopic discs and a smaller stack 138 of moisture absorbing hygroscopic discs. These discs are typically made of untreated wood fibers pressed together into a material that resembles cardboard in appearance. One suitable commercially available hygroscopic material is Kraft Press Board which is made from cellulose pulp.

The stacks 136 and 138 (FIG. 12A) of hygroscopic discs are supported on a common pivot arm 140 for vertical reciprocal motion relative to a vertical shaft 142 that extends through the arm 140. A coil spring 144 surrounds the shaft 142 and normally pushes the stack 136 upwardly against stop 146. A torsion spring 147 (FIG. 13B) associated with the pivot axis of the arm 140 lifts the arm 140 and the stack 138 upward to a fixed stop (not illustrated). When rain water enters the housing 134 (FIG. 13A) via aperture 150 and funnel 152 the hygroscopic discs of the stacks 136 and 138 absorb water and swell, pushing the arm 140 downwardly. A magnet 154 is mounted on one end of the arm 140. A stationary linear Hall effect sensor 156 mounted on a vertically mounted printed circuit board 158 generates a signal representative of the position of the magnet 154 that is proportional to the amount of rain water that has entered the weather station 20. The Hall effect sensor 156 may be provided by part number A1395SEHLT-T manufactured by Alegro. The small stack 138 absorbs water quickly via funnel 148 so that a rain event will be quickly detected. The large stack 136 dries out slowly so that the rain interrupt signal from the weather station 20 will not be terminated too quickly as the hydroscopic discs dry out. A solar radiation sensor 160 is mounted on one end of the printed circuit board 158 and receives solar radiation through a clear plastic dome 162 snap fit over the uppermost part of the housing 134. The solar radiation sensor 160 may be an industry standard PDB-C 131 photodiode with low current leakage.

The rain sensor including the stacks 136 and 138 of hygroscopic discs, magnet 154 and Hall effect sensor 156 is one form of environmental sensor that can be used to generate a signal representative of an environmental condition on a local irrigation site where the irrigation controller 12 is installed. The solar radiation sensor 160 is another form of environmental sensor that can generate another signal representative of another environmental condition on the irrigation site. Those skilled in the art will appreciate that various environmental sensors may be used on the site, alone or in combination, such as a rain sensor, a solar radiation sensor, a wind speed sensor, a humidity sensor, a freeze sensor, a temperature sensor, and so forth.

Figure 14:
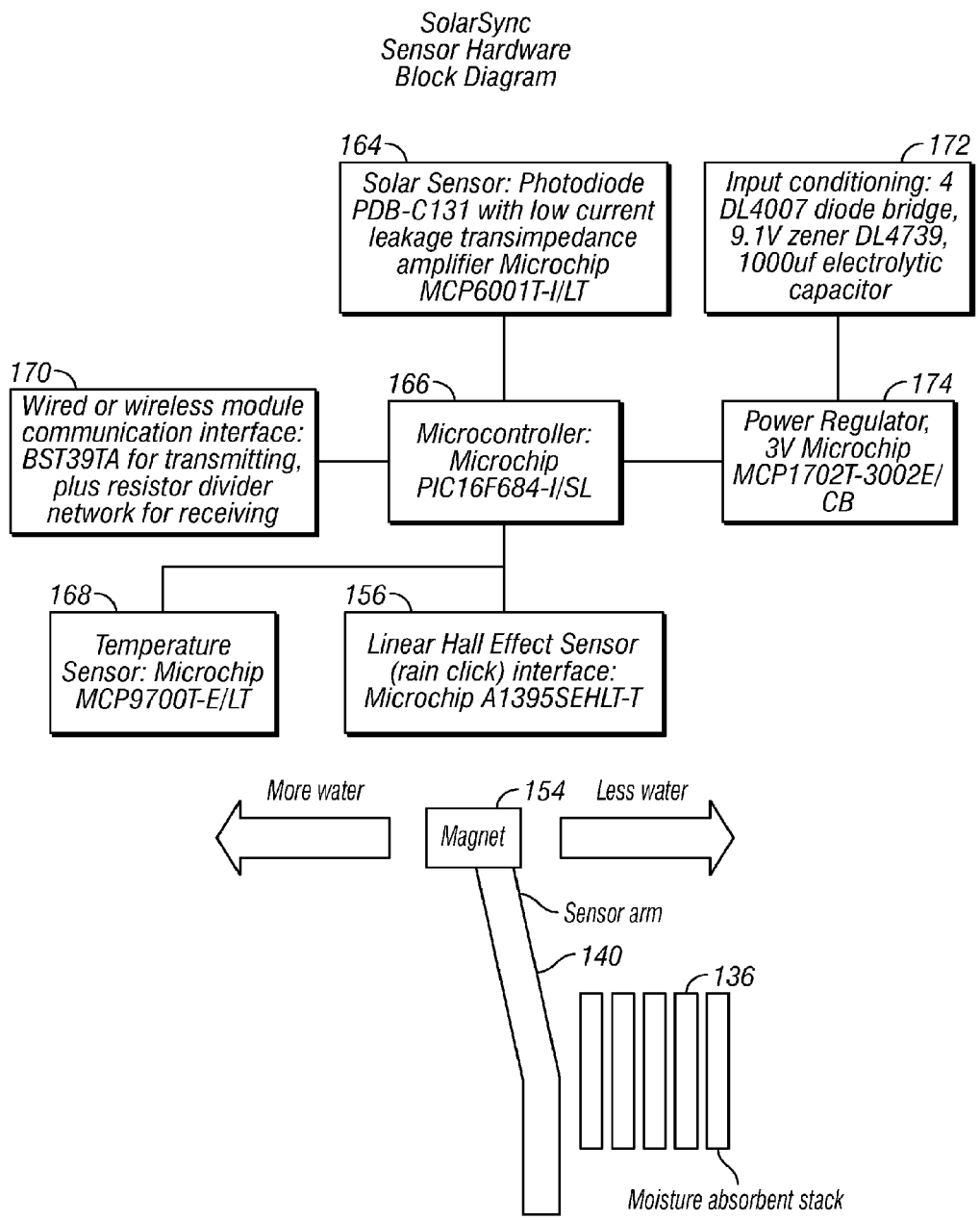
FIG. 14 is a block diagram illustrating the electronic portion of the stand alone weather station of FIG. 12.

FIG. 14 is a block diagram illustrating the electronic circuit of the stand alone weather station 20 that is mounted on the printed circuit board 158. The solar radiation sensor 160 which may comprise a PDB-C131 photodiode that is connected to a Microchip MCP6001T-I/LT transimpedance amplifier 164 that is in turn connected to a Microchip PIC-16F684-I/SL micro controller 166. A Microchip MCP9700T-E/LT temperature sensor 168 with an ND interface is also connected to the microcontroller 166. The microcontroller 166 also receives the output signal from the Hall effect sensor 156. The Hall effect sensor 156 may comprise a Microchip A1395SEHLT-T Hall effect sensor and interface circuit. The communications interface 170 between the microcontroller 166 and the ET unit 16 may be a hard wire interface, or more preferably, a wireless interface that may comprise a Microchip Technology RFPIC675 transmitter and a Maxim MAX1473 receiver. The transmitter sends signals representative of actual components of ET data across the irrigation site to the ET unit 16. Power for the hard wired weather station 20 is derived from the communications link to the ET unit 16 and is fed to an input conditioner 172 which feeds a Microchip MCPI702T-3002E/CB power regulator 174. The power regulator 174 supplies three volt DC power to the microcontroller 166. Power for a wireless weather station is supplied by a dedicated battery (not illustrated) installed within the weather station.

Figure 15:
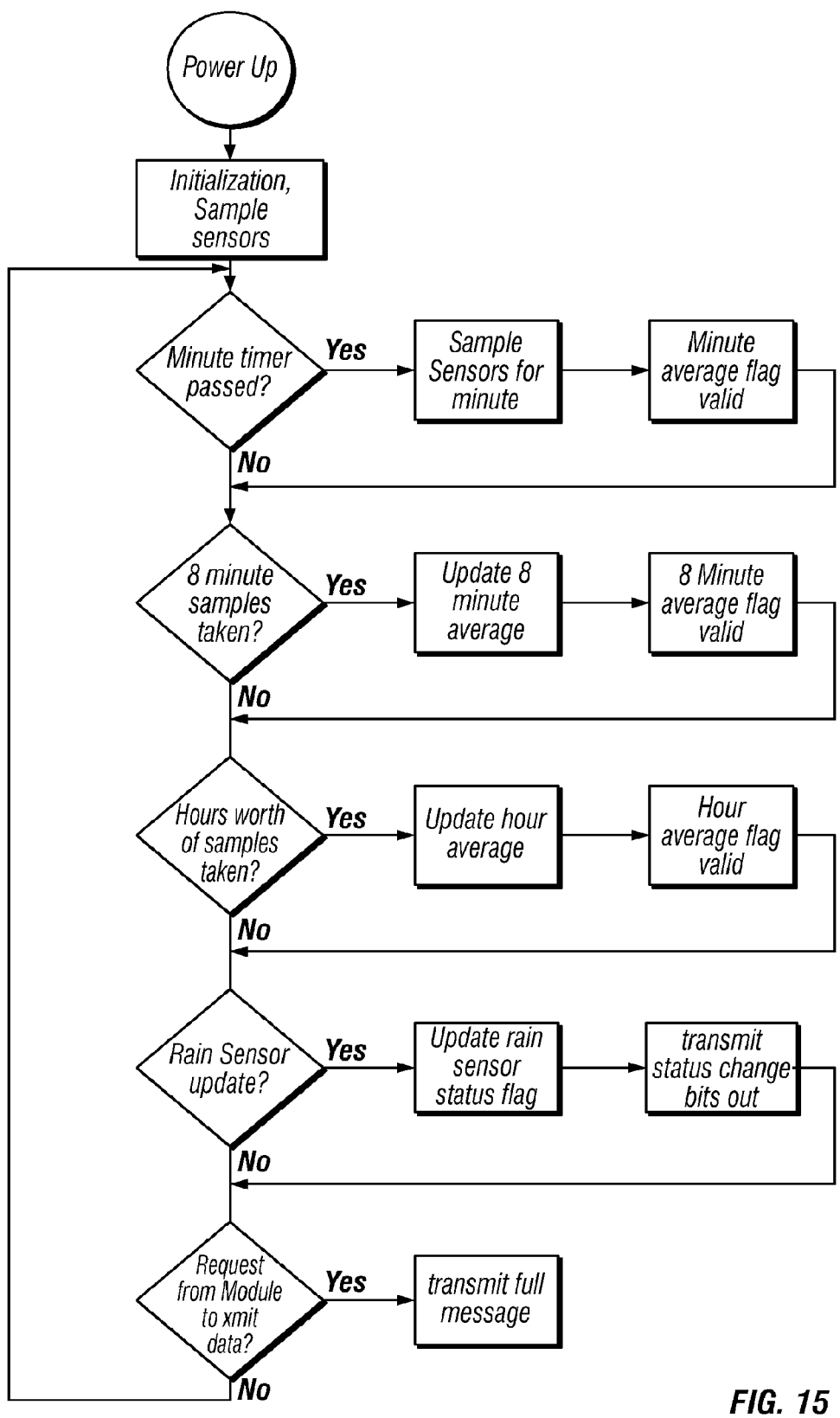
FIG. 15 is a flow diagram illustrating the operation of the stand alone weather station of FIG. 13A.

FIG. 15 is a flow diagram illustrating the operation of the stand alone weather station 20 of FIG. 13. Firmware executed by the micro controller 166 allows the weather station 20 to perform the logical operations illustrated in the flow diagram. These include periodic sampling of the outputs from the solar radiation sensor 162, temperature sensor 168 and Hall effect sensor 156, averaging readings, and responding to requests for sensor data that are periodically transmitted by the ET unit 16.

The basic construction of the soil moisture sensor 21 may be similar to that disclosed in U.S. Pat. No. 5,179,347 granted Jan. 12, 1993 to Alfred J. Hawkins entitled ELECTRICAL SENSOR FOR SENSING MOISTURE IN SOILS, the entire disclosure of which is incorporated herein by reference. The aforementioned U.S. patent is assigned to Irrometer Company, Inc., Riverside, Calif.

Figure 16:
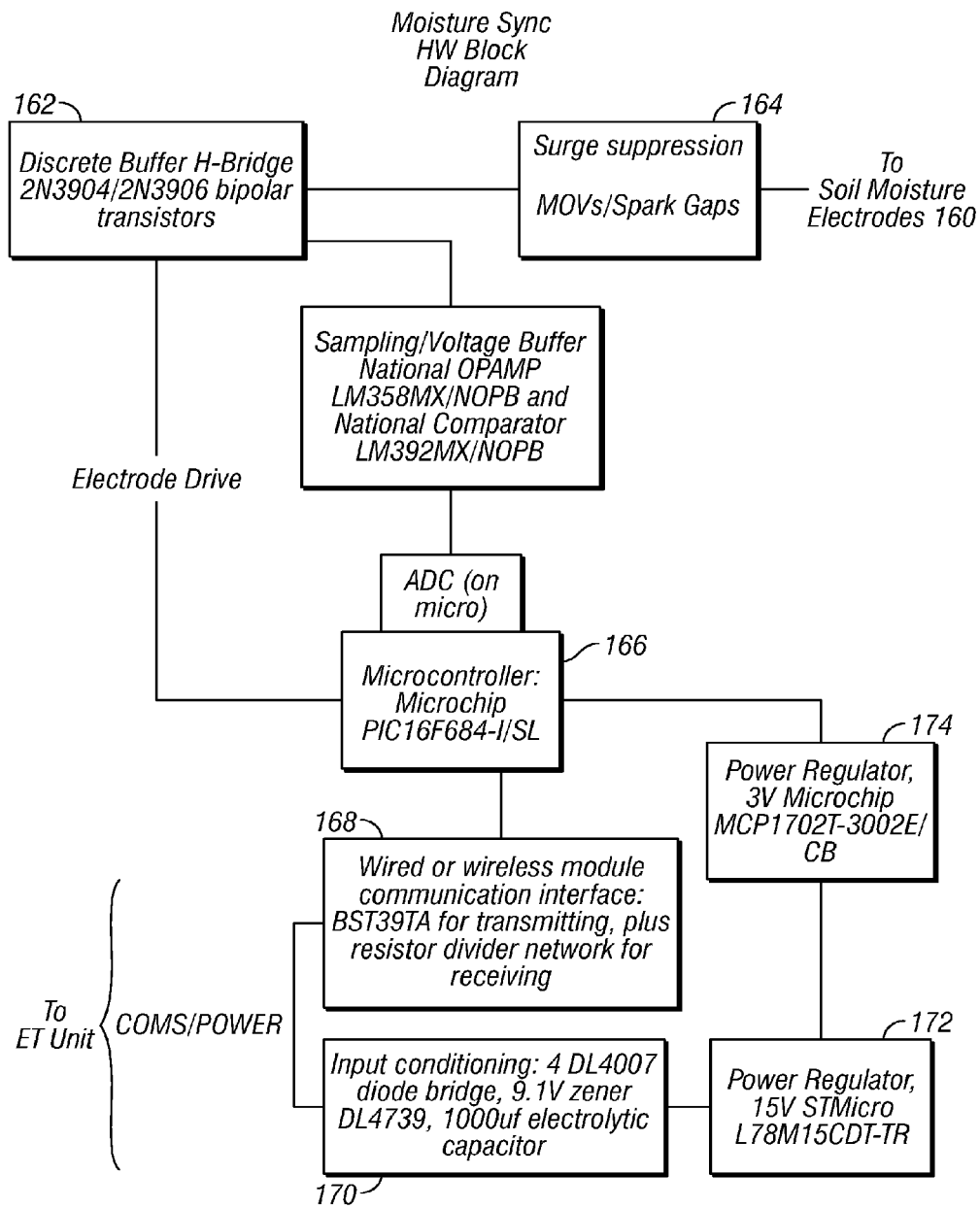
FIG. 16 is a block diagram of the electronic circuit connecting to the soil moisture sensor.

FIG. 16 is a block diagram illustrating the electronic circuit connecting to the stand alone soil moisture sensor 21. This functional block may be physically located within the ET unit 10. In the preferred embodiment, this functional block is located within a separate injection molded plastic housing that interfaces directly with the electrodes. The soil moisture sensor is resistance based and measures the current draw within the sensor from a constant voltage source. The soil moisture sensor electrodes 160 which are connected to cable 19 are in turn connected to a buffer 162. This buffer 162 may be an H-bridge buffer including industry standard 2N3904/3906 discrete bipolar transistors. The H-bridge is used to periodically switch polarities of the sensor wires. This is to prevent galvanic corrosion from occurring in the buried sections of the wire leading out to the electrodes.

A surge protection circuit 164 is also connected to the buffer that may consist of metal oxide varistors and on board spark gaps connected to each output of the H-bridge. The buffer 162 is in turn connected to a Microchip PIC18F684-I/SL microcontroller 166.

The communications interface 168 between the microcontroller 166 and the ET unit 10 may be a hard wire interface, or more preferably, a wireless interface that may comprise a Microchip Technology RFPIC675 transmitter and a Maxim MAX1473 receiver. The transmitter sends signals representative of actual components of soil moisture data within the soil at the root zone to the ET unit 10. Power for the hard wired soil moisture sensor 21 is derived from the communications link to the ET unit 10 and is fed to an input conditioner 170 which feeds a Microchip MCP1702T-3002E/CB power regulator 7. The power regulator 172 supplies 15 V DC power to the power regulator 174. Power regulator 174 supplies three volt DC power to the micro controller 166. When there is a wireless connection, power is supplied by a dedicated battery (not illustrated) installed within the soil moisture sensor.

Figure 17:
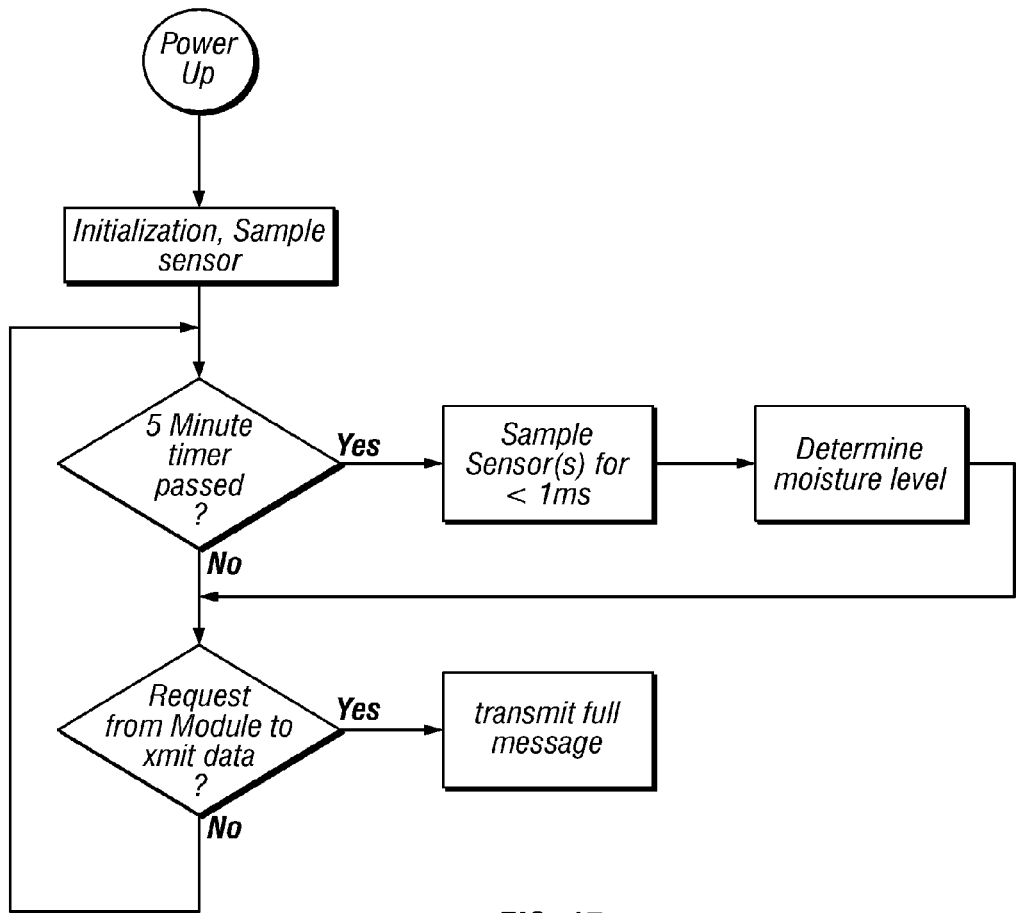
FIG. 17 is a flow diagram illustrating the operation of the soil moisture sensor.

FIG. 17 is a flow diagram illustrating the operation of the stand alone soil moisture sensor 21 of FIG. 1. Firmware executed by the microcontroller 166 allows the soil moisture sensor 21 to perform the logical operations illustrated in the flow diagram. These include periodic sampling of the output from the soil moisture sensor 21, switching H-bridge energizing polarities, and responding to requests for sensor data that are periodically transmitted by the ET unit 10.

The ET unit 16 of the present invention utilizes the watering program set up procedures that the installers, maintenance personnel and homeowners are already accustomed to using. Start times, station run times, and days-to-water are manually entered into the irrigation controller 12. The user also selects from one of a group of geographical regions in the ET unit 16. The ET unit 16 then automatically takes over setting of the seasonal adjustment feature of the irrigation controller 12 on a regular basis. Instead of a user changing that feature several times per year, the ET unit 16 sets that seasonal adjustment daily depending on current weather conditions gathered on site. Furthermore, the ET unit 16 shuts down any scheduled watering by the irrigation controller 12 in response to a rain event or a freeze event, and when there is a scheduled no-water window. Cost savings are achieved since only a small number of the weather parameters need to be measured. These variables are then used with pre-programmed constants to calculate an estimated ET value. This approach allows for cost savings since the stand alone weather station 20 need not have more than a solar radiation sensor, a temperature sensor and a rain sensor.

The present invention also provides a unique method of controlling a plurality of valves on an irrigation site. The method includes the steps of selecting and/or creating a watering schedule, storing the watering schedule and generating a signal representative of an environmental condition on an irrigation site. The method also includes the steps of calculating an estimated ET value based at least in part on the signal and selectively turning a plurality of valves located on the irrigation site ON and OFF in accordance with the watering schedule. The method further includes step of automatically modifying the watering schedule based on the estimated ET value using a seasonal adjust algorithm to thereby conserve water while maintaining the health of plants on the irrigation site. The method further includes the step of inhibiting watering if the moisture sensed by a soil moisture sensor is above a predetermined threshold. Optionally, the method of present invention may further include the step of inputting an overall watering adjustment and automatically modifying the watering schedule through the seasonal adjust algorithm based on the estimated ET value as increased or decreased by the inputted overall watering adjustment.

Figure 18:
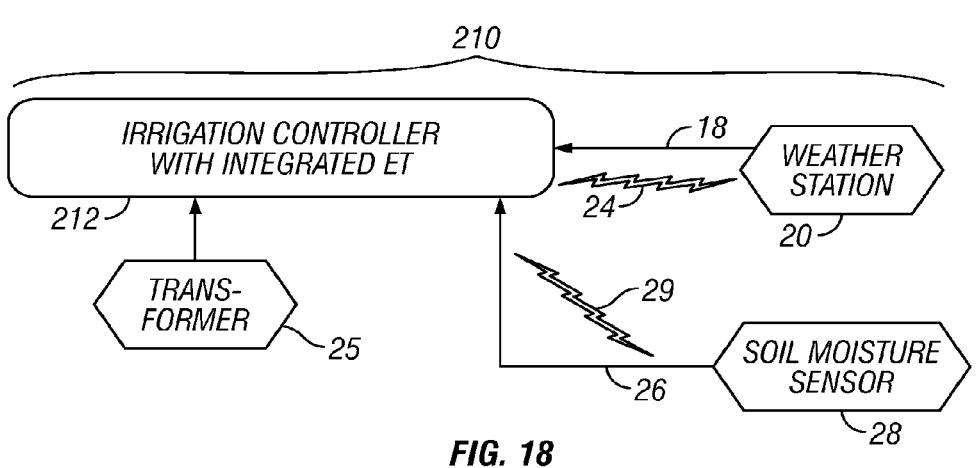
FIG. 18 is a simplified block diagram of an alternate irrigation system in accordance with a second embodiment of the present invention.

While an embodiment of an irrigation system comprising a stand alone ET unit connected to stand alone irrigation controller and linked to a separate stand alone weather station has been described in detail, persons skilled in the art will appreciate that the present invention can be modified in arrangement and detail. The calculated ET values may be down loaded to a controller that changes the irrigation schedule of each individual station rather than changing the seasonal adjust feature. The features and functionality described could be provided by combining the irrigation controller and the ET unit into a single integrated unit 212 (FIG. 18), in which case a single microcontroller may replace the microcontrollers 40 and 108. Alternatively, the ET unit could be packaged in an ET module designed for removable insertion into a receptacle in a stand alone irrigation controller. The receptacle may be on a housing, a backplane, or in a control panel of the irrigation controller. The module may be installed in the housing of the irrigation controller and hard wired to the control unit, or the electrical connections may be made through the receptacle. The soil moisture sensor 21 need not be the patented Hawkins type specifically identified herein. A wide variety of commercially available soil moisture sensors could be used that include electrodes, capacitive plates, expanding members, switches, energy degrading technology, and so forth. The moisture threshold setting may be an integral part of the soil moisture sensor. The sensor may supply a simple ON/OFF signal instead of a variable signal so there is no threshold setting at the controller. Examples of other soil moistures include United States Patent Application number 2008/0202220 of Schmidt entitled DEVICE FOR MEASURING THERMAL PROPERTIES IN A MEDIUM AND METHOD FOR DETERMINING THE MOISTURE CONTENT IN THE MEDIUM published Aug. 28, 2008; United States Patent Application number 2008/0202219 of Schmidt entitled DEVICE FOR USING WITH A SENSOR FOR IMPROVING ACCURACY, AND SENSOR WITH AN IMPROVED ACCURACY published Aug. 28, 2008; United States Patent Application number 2010/0277185 of Hughes entitled SOIL MOISTURE SENSOR published Nov. 4, 2010; United States Patent Application number 2010/0251807 of Morton entitled MOISTURE MONITORING DEVICE AND METHOD published Oct. 7, 2010. The entire disclosures of the aforementioned Schmidt, Hughes and Morton patent applications are hereby incorporated by reference. Therefore, the protection afforded the subject invention should only be limited in accordance with the scope of the following claims.

What is claimed is:

1. An irrigation system comprising:
   a stand alone weather station comprising a temperature sensor configured to detect ambient air temperature at an irrigation site and a solar radiation sensor configured to detect an amount of solar radiation at the irrigation site;
   a soil moisture sensor configured to detect a level of soil moisture at the irrigation site; and
   an irrigation controller operatively in communication with the soil moisture sensor and the stand alone weather station, the irrigation controller configured to enable a user to enter a watering schedule including a run time and to manually adjust the run time by a percentage, the irrigation controller comprising a computer processor, a memory storing programming implemented by the computer processor, and a plurality of switches operatively connected to the computer processor and configured to control a plurality of valves that deliver water to a plurality of sprinklers;
   wherein the computer processor is configured to adjust the run time by the percentage, calculate an evapotranspiration (ET) value based at least in part on the ambient air temperature and the amount of solar radiation, automatically increase or decrease the percentage in response to the ET value, operate, in response to the user-entered watering schedule, ones of the plurality of switches to control one or more of the plurality of valves, and automatically inhibit irrigation when the level of soil moisture is above a threshold.

2. The irrigation system of claim 1 further comprising a rain sensor configured to detect a rain event, and wherein the computer processor automatically inhibits the irrigation based at least in part on the rain event.

3. The irrigation system of claim 1 wherein the temperature sensor is further configured to detect a freeze event, and wherein the computer processor automatically inhibits the irrigation based at least in part on the freeze event.

4. The irrigation system of claim 1 wherein the irrigation controller is further configured to enable the user to enter a no water window, and the computer processor automatically inhibits the irrigation based at least in part on the no water window.

5. The irrigation system of claim 1 wherein the watering schedule is modified on a global basis based at least in part on the ET value.

6. The irrigation system of claim 1 wherein the computer processor is further configured to calculate the ET value based at least in part on the amount of solar radiation, the ambient air temperature, and at least one constant.

7. The irrigation system of claim 6 wherein the at least one constant comprises a reference point.

8. The irrigation system of claim 7 wherein the irrigation controller is further configured to enable the user to modify the reference point.

9. An irrigation system comprising:
a temperature sensor configured to generate a first signal representative of ambient air temperature;
a soil moisture sensor configured to generate a second signal representative of a soil moisture level;
a solar radiation sensor configured to generate a signal representative of an amount of solar radiation;
a rain sensor configured to detect a rain event, and
a computer processor operatively connected to a plurality of user inputs that enable a user to enter a watering schedule including a run time and to manually adjust the run time by a percentage, the computer processor further operatively connected to a memory storing the watering schedule and programming that is implemented by the computer processor; and
a plurality of switches operatively connected to the computer processor and configured to control a plurality of valves that deliver water to a plurality of sprinklers;
the computer processor configured to adjust the run time by the percentage, calculate an evapotranspiration (ET) value based at least in part on the ambient air temperature and the amount of solar radiation, automatically increase or decrease the percentage in response to the ET value, and operate, in response to the user-entered watering schedule, ones of the plurality of switches to control one or more of the plurality of valves; and
the computer processor further configured to automatically inhibit irrigation when the soil moisture level is above a threshold, when the rain event is detected, or when the ambient air temperature is at or near freezing.

10. A method of controlling a plurality of valves on an irrigation site, the method comprising:
receiving a first signal representative of ambient air temperature at an irrigation site;
detecting when the ambient air temperature is at or near freezing;
receiving a second signal representative of a soil moisture level at the irrigation site;
receiving a third signal representative of an amount of solar radiation at the irrigation site;
detecting a rain event;
receiving from a plurality of user inputs a watering schedule including a run time and a percentage by which to adjust the run time;
adjusting the run time by the percentage;
calculating an evapotranspiration (ET) value based at least in part on the ambient air temperature and the amount of solar radiation;
automatically increasing or decreasing the percentage in response to the ET value;
operating, in response to the user-entered watering schedule, ones of a plurality of switches to control one or more of a plurality of valves that deliver water to a plurality of sprinklers; and
automatically inhibiting irrigation when the soil moisture level is above a threshold, when the rain event is detected, or when the ambient air temperature is at or near freezing.

11. The irrigation system of claim 6 wherein the at least one constant comprises an estimate of a maximum ET value.

12. The irrigation system of claim 11 wherein the computer processor is further configured to estimate the maximum ET value based at least in part on one or more constants selected from a group of geographical areas to approximately simulate local conditions of the irrigation site.

13. The irrigation system of claim 1 wherein computer processor is further configured to calculate the ET value based at least in part on a measure of humidity from a humidity sensor and a measurement of wind speed from a wind speed sensor.

14. The irrigation system of claim 9 wherein the plurality of user inputs further enable the user to enter a no water window, and the computer processor is further configured automatically inhibit the irrigation based at least in part on the no water window.

15. The irrigation system of claim 9 wherein the watering schedule is modified on a global basis based at least in part on the ET value.

16. The irrigation system of claim 9 wherein the computer processor is further configured to calculate the ET value based at least in part on the amount of solar radiation, the ambient air temperature, and at least one constant.

17. The irrigation system of claim 16 wherein the at least one constant comprises a reference point.

18. The irrigation system of claim 17 wherein the plurality of user inputs is further configured to enable the user to manually modify the reference point, and the computer processor is further configured to adjust the run time based at least in part on the modified reference point.

19. The method of claim 10 further comprising calculating the ET value based at least in part on the amount of solar radiation, the ambient air temperature, and at least one constant.

20. The method of claim 19 wherein the at least one constant comprises a reference point.

* * * * *

UNITED STATES PATENT AND TRADEMARK OFFICE
CERTIFICATE OF CORRECTION

| | | |
|---|---|---|
| PATENT NO. | : 9,781,887 B2 | Page 1 of 1 |
| APPLICATION NO. | : 14/581222 | |
| DATED | : October 10, 2017 | |
| INVENTOR(S) | : Peter John Woytowitz | |

It is certified that error appears in the above-identified patent and that said Letters Patent is hereby corrected as shown below:

Sheet 26 of 46 (FIG. 8P) at Line 10 (approx.), Change "b it" to --bit--.

In Column 1 at Line 35, Change "Pro C®" to --Pro-C®--.

In Column 4 at Line 45, Change "FORRE" to --FOR RE--.

In Column 8 at Line 14, Change "MCPI0I-450" to --MCP101-450--.

In Column 9 at Line 12, Change ""from" to --from--.

In Column 9 at Line 40, Change "PIC 18F65J90" to --PIC18F65J90--.

In Column 10 at Line 22, Change "WATER+/-" to --WATER +/- --.

In Column 11 at Line 39, Change "water+/-,"" to --water +/-,"--.

In Column 13 at Line 25, Change "Alegro." to --Allegro.--.

In Column 13 at Line 55, Change "ND" to --A/D--.

In Column 18 at Line 33 (approx.), In Claim 14, after "configured" insert --to--.

Signed and Sealed this
Twentieth Day of March, 2018

Andrei Iancu
*Director of the United States Patent and Trademark Office*